US011710860B2

(12) United States Patent
Nakano et al.

(10) Patent No.: US 11,710,860 B2
(45) Date of Patent: Jul. 25, 2023

(54) BATTERY PACK AND ELECTRICAL APPARATUS USING BATTERY PACK

(71) Applicant: Koki Holdings Co., Ltd., Tokyo (JP)

(72) Inventors: Yasushi Nakano, Ibaraki (JP); Satoshi Yamaguchi, Ibaraki (JP); Hiroyuki Hanawa, Ibaraki (JP); Kazuhiko Funabashi, Ibaraki (JP); Tomomasa Nishikawa, Ibaraki (JP); Shota Kanno, Ibaraki (JP); Toshio Mizoguchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 152 days.

(21) Appl. No.: 16/627,750

(22) PCT Filed: Jul. 24, 2018

(86) PCT No.: PCT/JP2018/027698
§ 371 (c)(1),
(2) Date: Dec. 30, 2019

(87) PCT Pub. No.: WO2019/022072
PCT Pub. Date: Jan. 31, 2019

(65) Prior Publication Data
US 2020/0127339 A1  Apr. 23, 2020

(30) Foreign Application Priority Data

Jul. 24, 2017  (JP) .................... 2017-142779

(51) Int. Cl.
*H02J 7/00* (2006.01)
*H01M 10/44* (2006.01)
(Continued)

(52) U.S. Cl.
CPC ........... *H01M 10/44* (2013.01); *H01M 10/48* (2013.01); *H01M 50/213* (2021.01);
(Continued)

(58) Field of Classification Search
USPC ................................ 320/132, 134, 135, 150
See application file for complete search history.

(56) References Cited

U.S. PATENT DOCUMENTS 6,903,534 B2 * 6/2005 Minamiura ......... H01M 10/633
320/150
2008/0150488 A1  6/2008 Lu et al.
(Continued)

FOREIGN PATENT DOCUMENTS

CN   101916983   12/2010
CN   102280911   12/2011
(Continued)

OTHER PUBLICATIONS

"Search Report of Europe Counterpart Application", dated Jan. 26, 2021, pp. 1-9.
(Continued)

*Primary Examiner* — Brian Ngo
(74) *Attorney, Agent, or Firm* — JCIPRNET

(57) ABSTRACT

A battery pack which has cell units in which top-side and bottom-side battery cells are connected in series, and is capable of switching the connection state of the cell units, wherein a control unit monitors voltage imbalances between the plurality of cell units, and also monitors whether or not a cell unit contact failure has occurred. In order to stop a charging/discharging when a contact failure occurs, a signal (abnormality stoppage signal or charging stoppage signal) for stopping discharge is produced and outputted to the electrical device body-side.

20 Claims, 20 Drawing Sheets

(51) Int. Cl.
*H01M 10/48* (2006.01)
*H01M 50/247* (2021.01)
*H01M 50/244* (2021.01)
*H01M 50/269* (2021.01)
*H01M 50/569* (2021.01)
*H01M 50/213* (2021.01)

(52) U.S. Cl.
CPC ....... *H01M 50/244* (2021.01); *H01M 50/247* (2021.01); *H01M 50/269* (2021.01); *H01M 50/569* (2021.01); *H02J 7/0016* (2013.01)

(56) References Cited

U.S. PATENT DOCUMENTS

| | | | |
|---|---|---|---|
| 2010/0085014 A1 | 4/2010 | Saeki et al. | |
| 2013/0033793 A1* | 2/2013 | Takeda | G01R 31/396 361/91.4 |
| 2014/0009857 A1 | 1/2014 | Suzuki | |
| 2014/0287278 A1 | 9/2014 | Despesse | |
| 2016/0056655 A1 | 2/2016 | Kaneda et al. | |

FOREIGN PATENT DOCUMENTS

| | | | | |
|---|---|---|---|---|
| CN | 102859835 A | * | 1/2013 | .......... H01M 10/482 |
| CN | 102959824 | | 3/2013 | |
| CN | 103532179 | | 1/2014 | |
| CN | 103545889 | | 1/2014 | |
| CN | 103782413 A | * | 5/2014 | .............. B60L 58/19 |
| CN | 104779661 | | 7/2015 | |
| CN | 104836261 | | 8/2015 | |
| CN | 105830275 A | * | 8/2016 | .......... H01M 10/482 |
| CN | 106415915 | | 2/2017 | |
| CN | 106463947 | | 2/2017 | |
| JP | S6424370 | | 1/1989 | |
| JP | H06140081 | | 5/1994 | |
| JP | H1027630 | | 1/1998 | |
| JP | 2004056978 A | * | 2/2004 | ........ H01M 10/4257 |
| JP | 2009189095 | | 8/2009 | |
| JP | 2010063259 A | * | 3/2010 | .......... G01R 31/396 |
| JP | 2013071219 | | 4/2013 | |
| JP | 2013191564 A | * | 9/2013 | ........ H01M 10/4207 |
| JP | 2014017954 | | 1/2014 | |
| JP | 2014147158 | | 8/2014 | |
| JP | 2014225950 | | 12/2014 | |
| JP | 2016046917 | | 4/2016 | |
| KR | 20170139614 A | * | 12/2017 | .............. H02M 7/06 |
| WO | WO-2010103816 A1 | * | 9/2010 | .......... H02J 7/00304 |
| WO | WO-2012053426 A1 | * | 4/2012 | .............. B60L 58/12 |
| WO | 2015182515 | | 12/2015 | |

OTHER PUBLICATIONS

"Office Action of Australia Counterpart Application", dated Dec. 3, 2020, pp. 1-5.
"International Search Report (Form PCT/ISA/210) of PCT/JP2018/027698", dated Oct. 16, 2018, with English translation thereof, pp. 1-8.
"Office Action of Canada Counterpart Application" dated Nov. 16, 2021, p. 1-p. 5.
"Office Action of China Counterpart Application" with English translation thereof, dated Dec. 16, 2021, p. 1-p. 27.
"Office Action of China Counterpart Application" with English translation thereof, dated Sep. 2, 2022, p. 1-p. 19.
"Decision on Rejection of China Counterpart Application", dated Apr. 7, 2023, with English translation thereof, pp. 1-20.

* cited by examiner

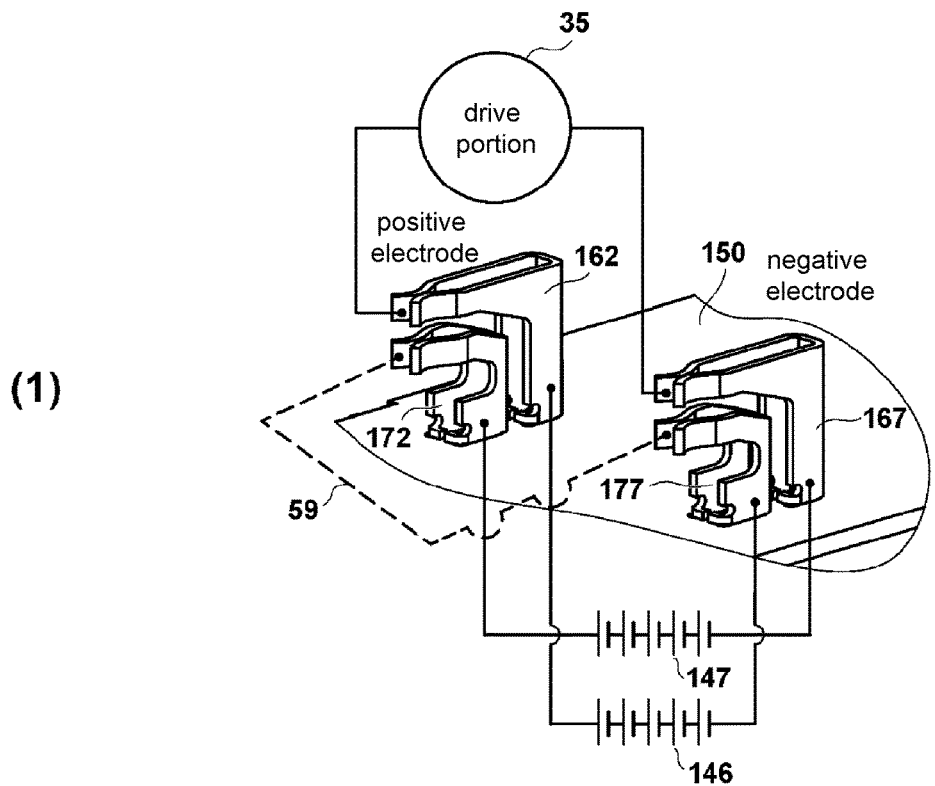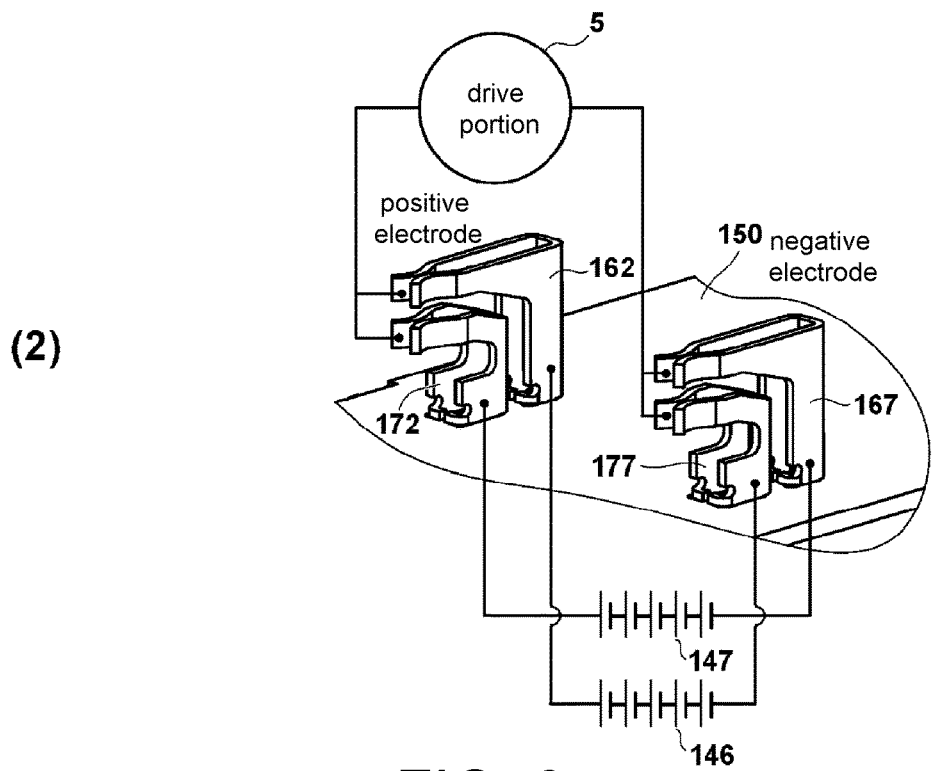
FIG. 8

| mode no. | determination condition | | | | determination result | operation |
|---|---|---|---|---|---|---|
| | system detection | voltage balance between cell set A and cell set B viewed from control unit | connection state signal A | connection state signal B | | |
| 1 | L (present) | within ±0.5 V (A≒B) | H | H | series-connection (36 V)/normality | stand-by |
| 2 | L (present) | 1 V or higher A>B | H | H | series-connection (36 V)/abnormality in cell set voltage balance(A>B) | • turn on discharging means A, discharge cell set A, and adjust voltage balance<br>cancel when voltage imbalance within ±0.5 V is detected<br>temporarily cancel when discharging current is detected |
| 3 | L (present) | 1 V or higher A<B | H | H | series-connection (36 V)/abnormality in cell set voltage balance(A<B) | • turn on discharging means B, discharge cell set B, and adjust voltage balance<br>cancel when voltage imbalance within ±0.5 V is detected<br>temporarily cancel when discharging current is detected |
| 4 | L (present) | 0V (A=B) | H | L | parallel-connection (18 V)/normality | stand-by |
| 5 | L (present) | 1 V or higher A>B | H | L | parallel-connection (18 V)/normality in negative terminal contact/abnormality in positive terminal contact | ■ stop charging/discharging, and cancel when system detection H (absent) is detected<br>■ turn on discharging means A, discharge cell set A, and adjust voltage balance<br>cancel when voltage imbalance within ±0.5 V is detected<br>temporarily cancel when discharging current is detected |
| 6 | L (present) | 1 V or higher A<B | H | L | parallel-connection (18 V)/normality in negative terminal contact/abnormality in positive terminal contact | ■ stop charging/discharging, and cancel when system detection H (absent) is detected<br>■ turn on discharging means B, discharge cell set B, and adjust voltage balance<br>cancel when voltage imbalance within ±0.5 V is detected<br>temporarily cancel when discharging current is detected |
| 7 | L (present) | 0V (A=B) | L | H | parallel-connection (18 V)/normality in negative terminal contact/abnormality in positive terminal contact | cancel when charging/discharging stop and system detection H (absent) is detected |
| 8 | L (present) | 0V (A=B) | L | L | parallel-connection (18 V)/normality in negative terminal contact/abnormality in positive terminal contact | cancel when charging/discharging stop and system detection H (absent) is detected |
| 9 | H (absent) | within ±0.5 V (A≒B) | H | L | non-connection/normality | stand-by |
| 10 | H (absent) | 1 V or higher A>B | H | L | non-connection/abnormality in cell set voltage balance (A>B) | • turn on discharging means A, discharge cell set A, and adjust voltage balance<br>cancel when voltage imbalance within ±0.5 V is detected<br>temporarily cancel when discharging current is detected |
| 11 | H (absent) | 1 V or higher A<B | H | L | non-connection/abnormality in cell set voltage balance (A<B) | • turn on discharging means B, discharge cell set B, and adjust voltage balance<br>cancel when voltage imbalance within ±0.5 V is detected<br>temporarily cancel when discharging current is detected |

FIG. 17

BATTERY PACK AND ELECTRICAL APPARATUS USING BATTERY PACK

CROSS-REFERENCE TO RELATED APPLICATION

This application is a 371 application of the International PCT application serial no. PCT/JP2018/027698, filed on Jul. 24, 2018, which claims the priority benefits of Japan Patent Application No. 2017-142779, filed on Jul. 24, 2017. The entirety of each of the above-mentioned patent applications is hereby incorporated by reference herein and made a part of this specification.

TECHNICAL FIELD

The present disclosure relates to an electrical apparatus such as a motor or lighting having a load, and a battery pack supplying power to such an electrical apparatus.

BACKGROUND ART

Electrical apparatuses such as power tools are driven by battery packs using secondary batteries such as lithium ion batteries, and therefore cordless electrical apparatuses have been devised. For example, a battery pack accommodating a plurality of secondary battery cells is used in handheld power tools in which a tip tool is driven by a motor, and the motor is driven by electric energy stored in the battery pack. The battery pack is configured to be attachable to and detachable from a power tool main body. When a voltage drops due to discharging, the battery pack is detached from the power tool main body and is charged using an external charging device.

Cordless power tools and electrical apparatuses need to maintain a predetermined operation time and to maintain a predetermined output, and therefore higher outputs and higher voltages have been achieved as performance of secondary batteries has improved. In addition, as electrical apparatuses using battery packs as a power source have been developed, battery packs using various voltages have become commercialized. In general, battery packs have a fixed output voltage. However, Patent Literature 1 proposes a power source device for an electrical apparatus, in which a plurality of battery units are provided inside a housing accommodating batteries and which can select an output in series-connection or an output in parallel-connection using a connection means so that the device can support devices using different voltages.

CITATION LIST

Patent Literature

[Patent Literature 1]
Japanese Patent Laid-Open No. 2014-17954

SUMMARY OF INVENTION

Technical Problem

When a plurality of battery units (cell units) are provided inside a battery pack, there is a possibility of voltage imbalance occurring between the cell units. For example, if a control unit is provided on only one cell unit side, power consumption of the cell units is not the same, and there is a possibility of power consumption imbalance occurring between the cell units. In addition, when a contact failure occurs in connection terminals of the battery pack and connection terminals of an electrical apparatus main body, there is a possibility of voltage imbalance occurring between the cell units. In addition, it is troublesome for a user to prepare a plurality of kinds of battery packs when using a plurality of electrical apparatuses, and therefore it is desired to realize a convenient battery pack that supports electrical apparatuses using different voltages by switching the voltage. Furthermore, instead of a power source device that is separate from an electrical apparatus main body as in Patent Literature 1, it has been desired to realize voltage switchable battery packs that can be easily mounted in electrical apparatuses.

The present disclosure has been made in consideration of the foregoing background, and an object of the present disclosure is to favorably adjust voltage balance between a plurality of cell units in a battery pack in which a connection state of the plurality of cell units is switchable. Another object of the present disclosure is to favorably maintain voltage balance between a plurality of cell units in a battery pack capable of switching an output voltage so that it can be shared between electrical apparatuses using different voltages, and an electrical apparatus using the battery pack. Another object of the present disclosure is to detect a contact failure with device side terminals of an electrical apparatus main body in a battery pack in which a connection state of a plurality of cell units is switchable and to be able to notify a worker of a contact failure that has occurred. Another object of the present disclosure is to stop charging or discharging when a contact failure with device side terminals of an electrical apparatus main body has occurred.

Solution to Problem

The following is description of representative features of the disclosure disclosed in this application. According to a feature of the present disclosure, there is provided a battery pack including a plurality of battery cells that is constituted of a plurality of cell units connected in series, and a plurality of connection terminals. A connection state of the plurality of cell units is switchable. The battery pack includes a microcomputer that stops a charging/discharging or outputs a signal for stopping a charging/discharging to an electrical apparatus main body side when a voltage imbalance between the plurality of cell units or a contact failure of the cell units occurs. In addition, a protection circuit that is provided for each cell unit and monitors voltages of the battery cells is provided, and the microcomputer is connected to the protection circuit and monitors load states of the battery cells. For example, the microcomputer detects a connection state between the connection terminals and device side terminals of the electrical apparatus main body in which the battery pack is mounted, and when there is a cell unit that is not charged or discharged due to a contact failure between the connection terminals and the device side terminals, the microcomputer stops the charging/discharging or outputs a signal for stopping the charging/discharging. In addition, the microcomputer monitors temperatures of the plurality of cell units, and when a difference between the temperatures of the cell units becomes equal to or larger than a threshold value, the microcomputer determines that a contact failure of the connection terminal has occurred and stops the charging/discharging. Moreover, when a difference between charging currents flowing in the plurality of cell units becomes equal to or larger than a threshold value, the microcomputer determines that a contact failure of the terminal has occurred and stops the charging. For example, the microcomputer monitors a charging current flowing in one cell unit at a time of a parallel-connection state, and when the charging current becomes equal to or larger than a predetermined value, the microcomputer determines that a contact failure of the terminal has occurred and stops the charging.

According to another feature of the present disclosure, there is provided a battery pack including a system detection circuit that detects whether the battery pack is mounted in an electrical apparatus main body or an external charging device in order to detect a contact failure between the device side terminals of the electrical apparatus main body in which the battery pack is mounted and the connection terminals, and first and second voltage detection circuits that detect a potential with respect to a lower potential side ground of each of the plurality of cell units in order to detect a contact failure between the device side terminals of the electrical apparatus main body in which the battery pack is mounted and the connection terminals. In addition, the battery pack includes a connection state detection circuit that detects the presence or absence of a contact failure in any of positive electrode terminals or negative electrode terminals in the battery pack by comparing negative side potentials of the plurality of cell units. The microcomputer determines whether or not there is a cell unit that is not charged or discharged due to a contact failure between the connection terminals and the device side terminals using outputs of the system detection circuit and the first and second voltage detection circuits.

According to still another feature of the present disclosure, an LD terminal of the battery pack is connected to a ground via a switching element, and the microcomputer causes the switching element to be in a conducting state by controlling a gate signal of the switching element, such that the LD terminal is subjected to grounding to the ground to stop operation of the electrical apparatus main body in which the battery pack is mounted. A thermistor and a switching element are connected to a part between an LS terminal and the ground, and when the microcomputer controls the gate signal of the switching element, the LS terminal of the battery pack blocks transmission of an output of the thermistor and sends out a high signal instead from the LS terminal to stop operation of an external charging device to which the battery pack is connected.

According to still another feature of the present disclosure, there is provided an electrical apparatus including a battery pack that has a plurality of cell units which are able to be connected to each other, a device main body that has a load device to which power is supplied from the battery pack, and a control unit that controls power supplied from the battery pack to the load device. The control unit stops or limits supply of power from the battery pack to the load device or issues a notification of occurrence of an abnormality when an abnormality has occurred in connection between the plurality of cell units. The control unit may be provided on the battery pack side, may be accommodated on the device main body side, or may be provided on both sides. The control unit detects a voltage of each of the plurality of cell units, and when a difference between the voltages becomes equal to or larger than a predetermined value, the control unit determines that an abnormality has occurred in connection between the plurality of cell units.

According to still another feature of the present disclosure, the battery pack includes a first cell unit that has a plurality of battery cells connected to each other in series, a second cell unit that has a plurality of battery cells connected to each other in series, and a control unit that is connected to the first and second cell units. The first cell unit and the second cell unit are configured to be able to be selectively switched to at least two connection states of a parallel-connection state, a series-connection state, and a blockage state. The control unit is configured to be able to detect a connection state of any of the first and second cell units. The battery pack has a connection state detection circuit that is connected to a positive electrode side of the first cell unit, a negative electrode side of the first cell unit, a positive electrode side of the second cell unit, a negative electrode side of the second cell unit, and the control unit. The control unit and the connection state detection circuit are configured to detect connection states of the first and second cell units by comparing at least two potentials of a potential on the positive electrode side of the first cell unit, a potential on the negative electrode side of the first cell unit, a potential on the positive electrode side of the second cell unit, and a potential on the negative electrode side of the second cell unit. In addition, the control unit stops charging/discharging or outputs a signal for stopping charging/discharging, or adjusts voltage balance between the first cell unit and the second cell unit based on an abnormality state corresponding to the connection states of the first cell unit and the second cell unit. Here, when the abnormality state is voltage imbalance between the first cell unit and the second cell unit, the control unit adjusts voltage balance between the first cell unit and the second cell unit regardless of the connection state. In addition, when the abnormality state is a contact failure of terminals of the first cell unit and the second cell unit while the first cell unit and the second cell unit are in the parallel-connection state, the control unit stops charging/discharging or outputs a signal for stopping charging/discharging. When an electrical apparatus main body is operated while voltage balance of the first cell unit and the second cell unit is adjusted in a state where the battery pack is connected to the electrical apparatus main body, the control unit stops operation of balance adjustment.

Advantageous Effects of Invention

According to the present disclosure, since a contact state of the connection terminals and the device side terminals can be monitored by the control unit of the battery pack, when an abnormality in voltage balance caused by a contact failure of terminal portions between a plurality of cell units is detected, it is possible to immediately stop charging or discharging. Moreover, since the voltages of the cell units can be adjusted using a discharging means, the battery pack can be maintained in a state in which a voltage difference between the cell units is small, and therefore it is possible to realize the battery pack having a long life-span and high reliability. In addition, since an appropriate output voltage can be automatically obtained by only mounting the battery pack in the electrical apparatus main body without depending on a mechanical switching mechanism for switching the output voltage, the battery pack can be shared between electrical apparatuses using different voltages.

BRIEF DESCRIPTION OF DRAWINGS

FIG. 8 is a view for describing a connection situation between an electrical apparatus main body and the power terminals of the battery pack 100, (1) of FIG. 8 illustrates a connection circuit in a state where the battery pack 100 is connected to a power tool main body 30 of the present example, and (2) of FIG. 8 illustrates a connection circuit in a state where the battery pack 100 is connected to the power tool main body 1 in the related art.

Figure 9:
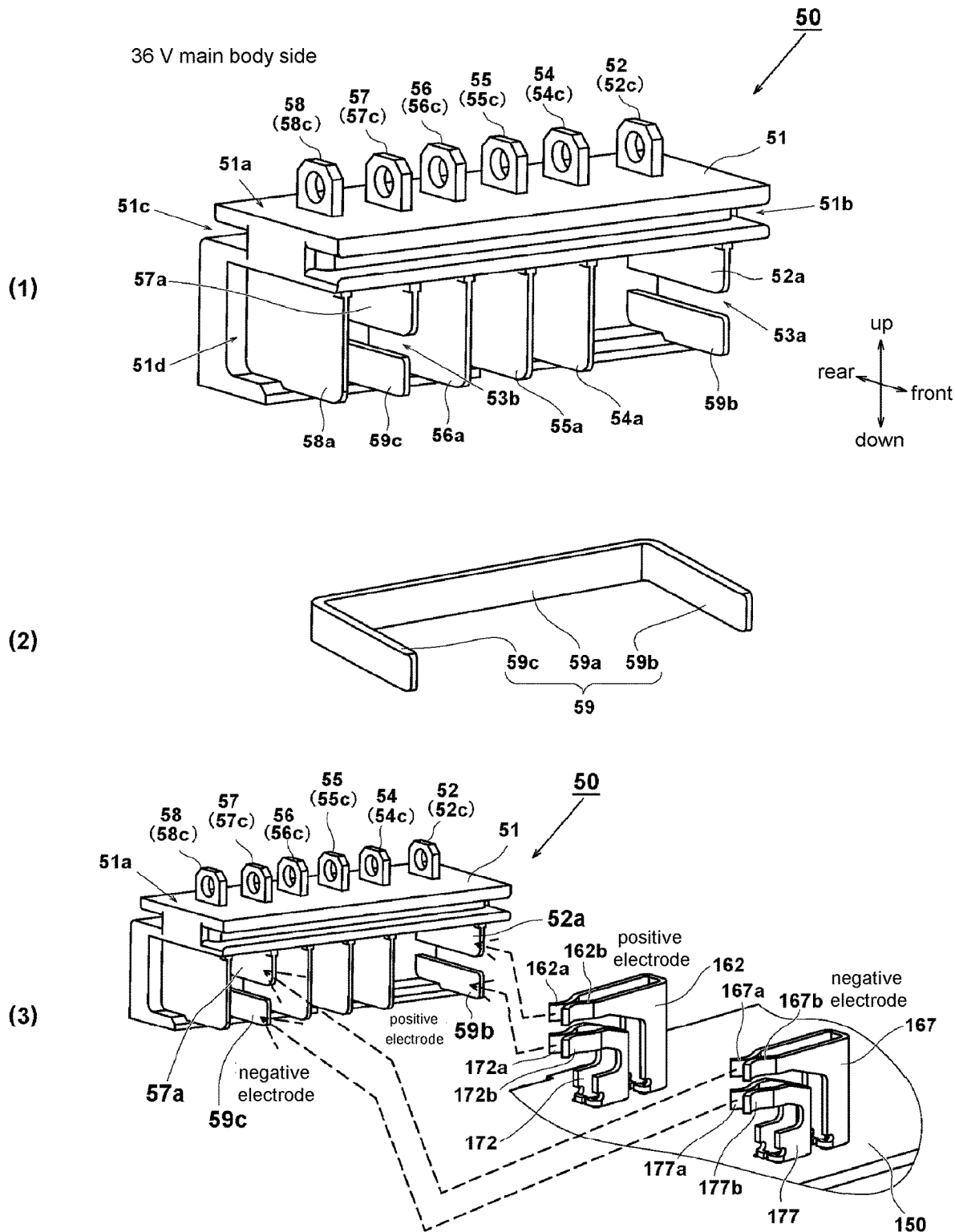

(1) of FIG. 9 is a perspective view of a terminal portion 50 of the power tool main body 30 of the present example, (2) of FIG. 9 is a perspective view of a single body of a short bar 59, and (3) of FIG. 9 is a view illustrating a method of connecting the terminal portion 50 and the power terminals of the battery pack 100.

Figure 10:
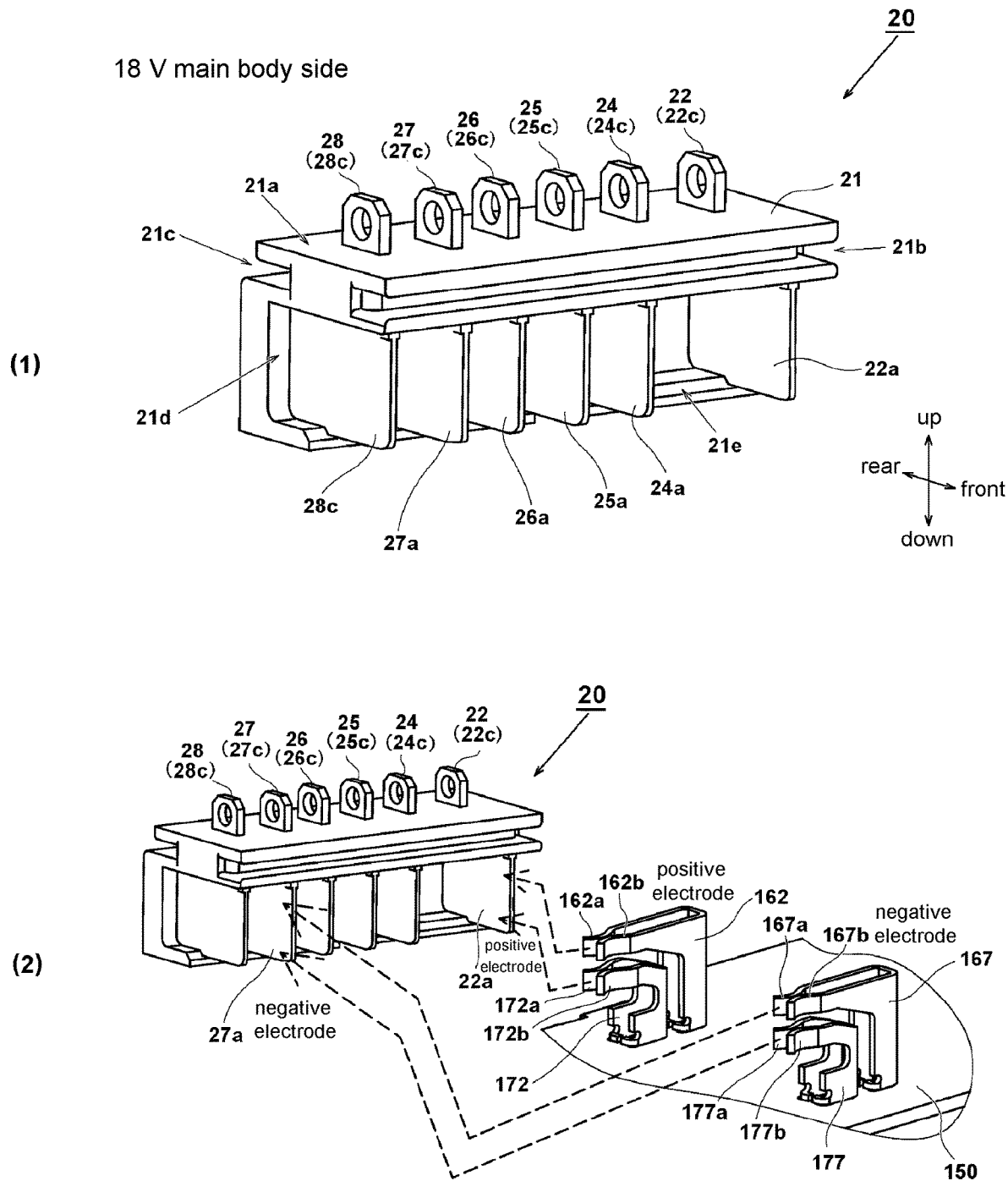

(1) of FIG. 10 is a perspective view of a terminal portion 20 of the power tool main body 1 in the related art, and (2) of FIG. 10 is a view illustrating a connection situation of the terminal portion 20 and the power terminals of the battery pack 100.

Figure 11:
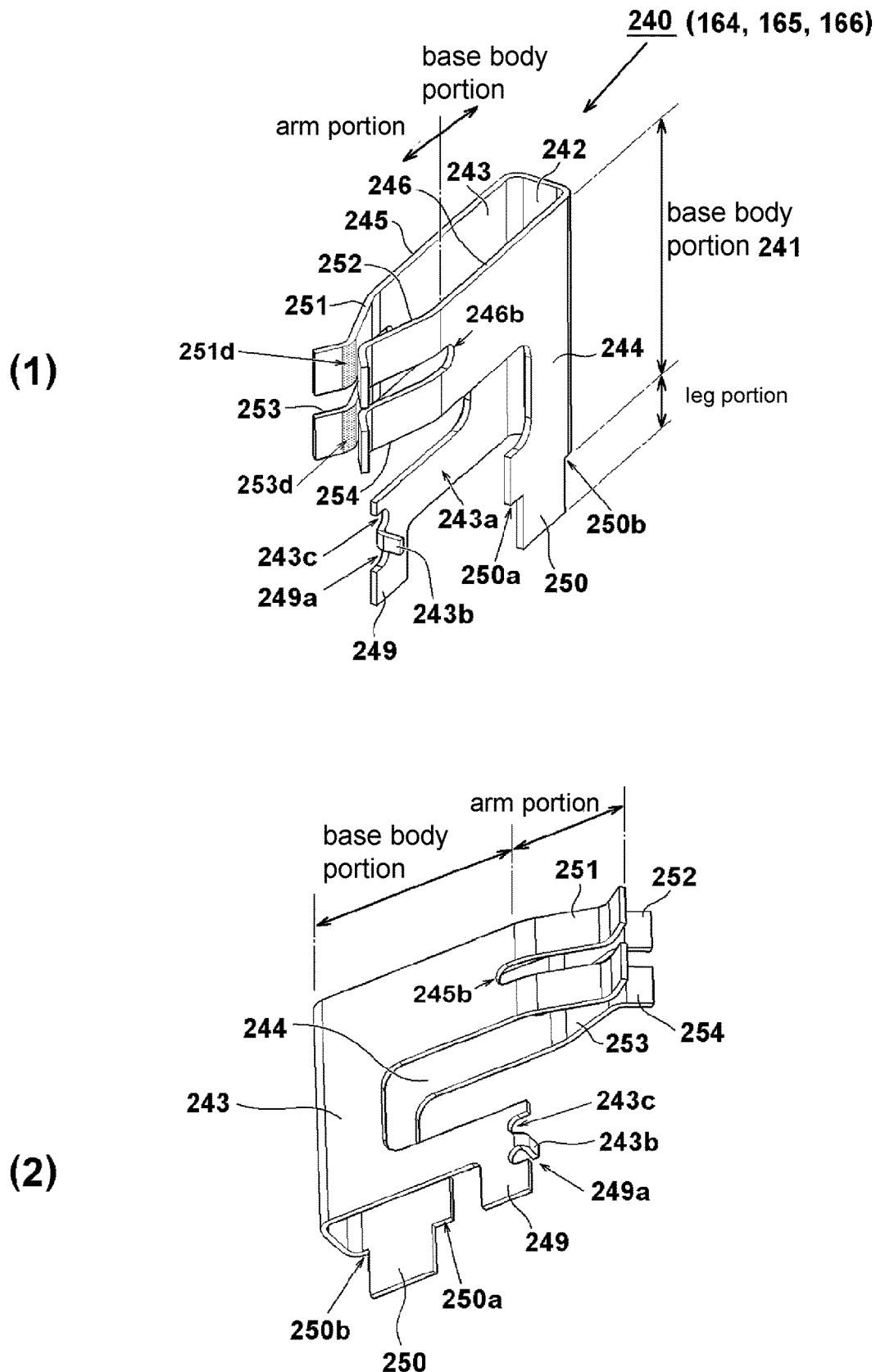

FIG. 11 is a view illustrating a shape of a single body of a signal terminal component 240 of the present example, (1) of FIG. 11 is a perspective view viewed from above on the front left side, and (2) of FIG. 11 is a perspective view viewed from below on the front right side.

Figure 12:
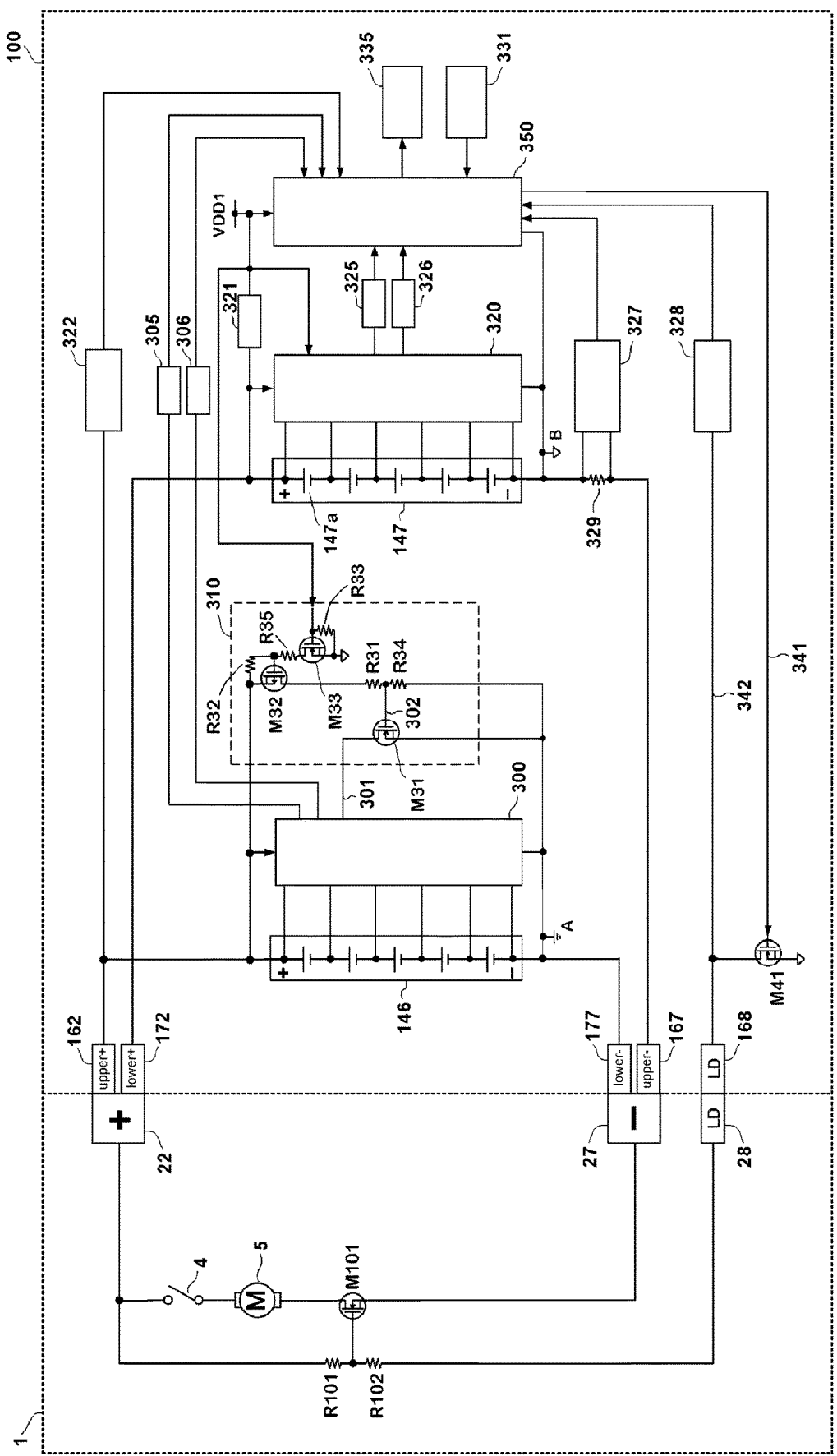

FIG. 12 is a circuit diagram illustrating a state where the battery pack 100 of the present example is connected to the power tool main body 1 in the related art.

Figure 13:
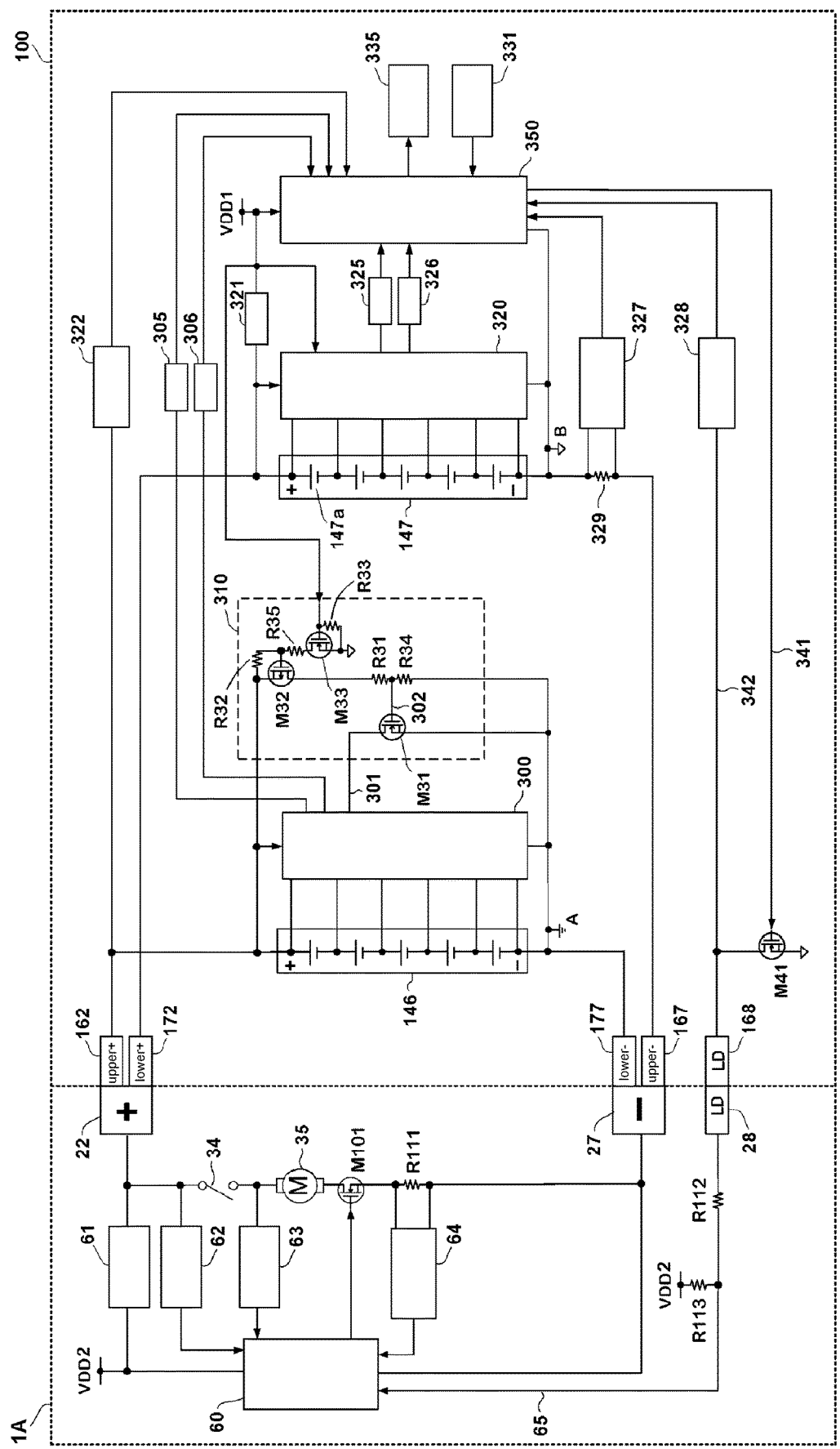

FIG. 13 is a circuit diagram illustrating a state where the battery pack 100 of the present example is connected to a power tool main body 1A in the related art.

Figure 14:
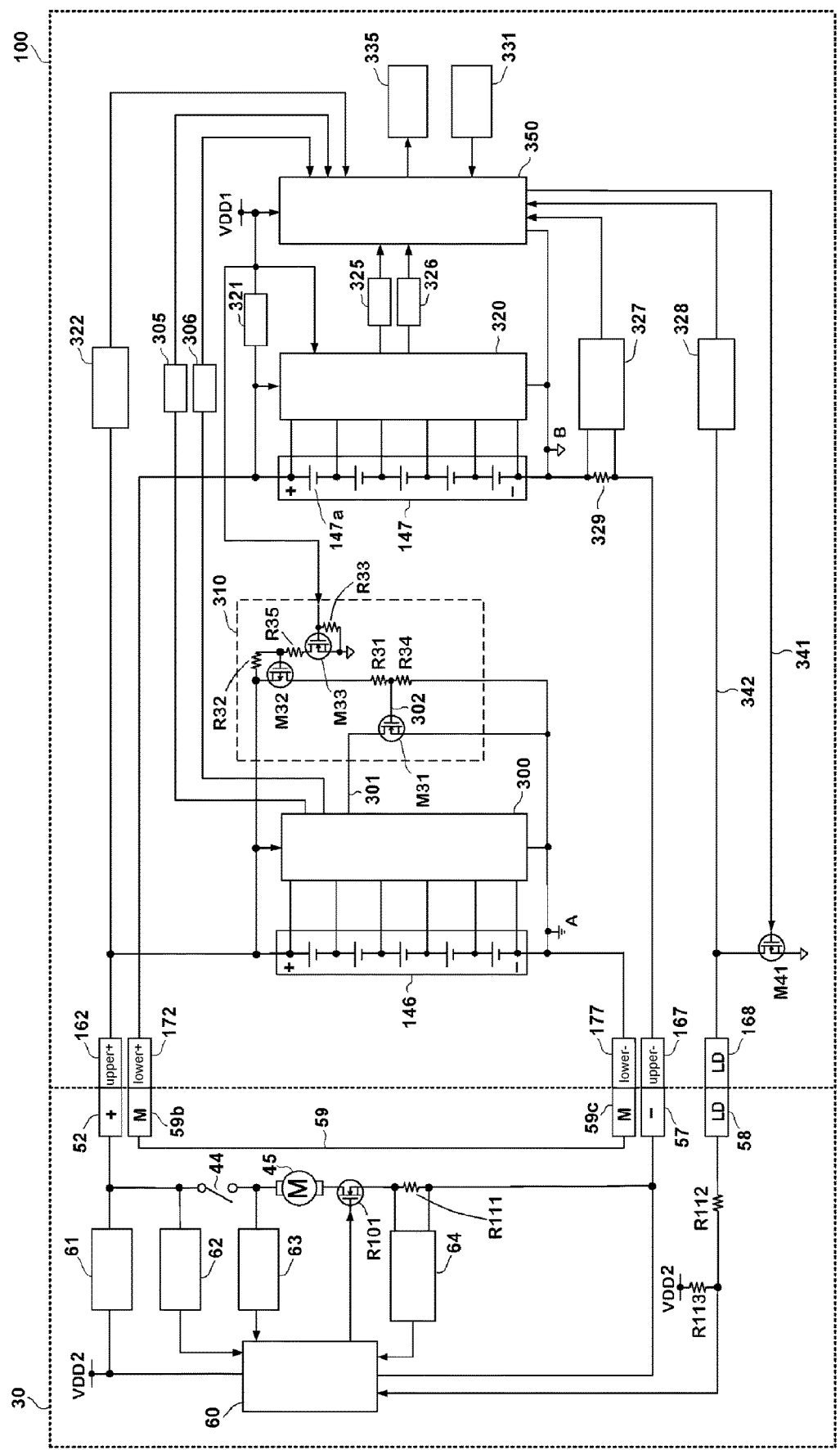

FIG. 14 is a circuit diagram of the battery pack 100 of the present example and is a view illustrating a state where the battery pack 100 is connected to a 36 V power tool main body 30.

Figure 15:
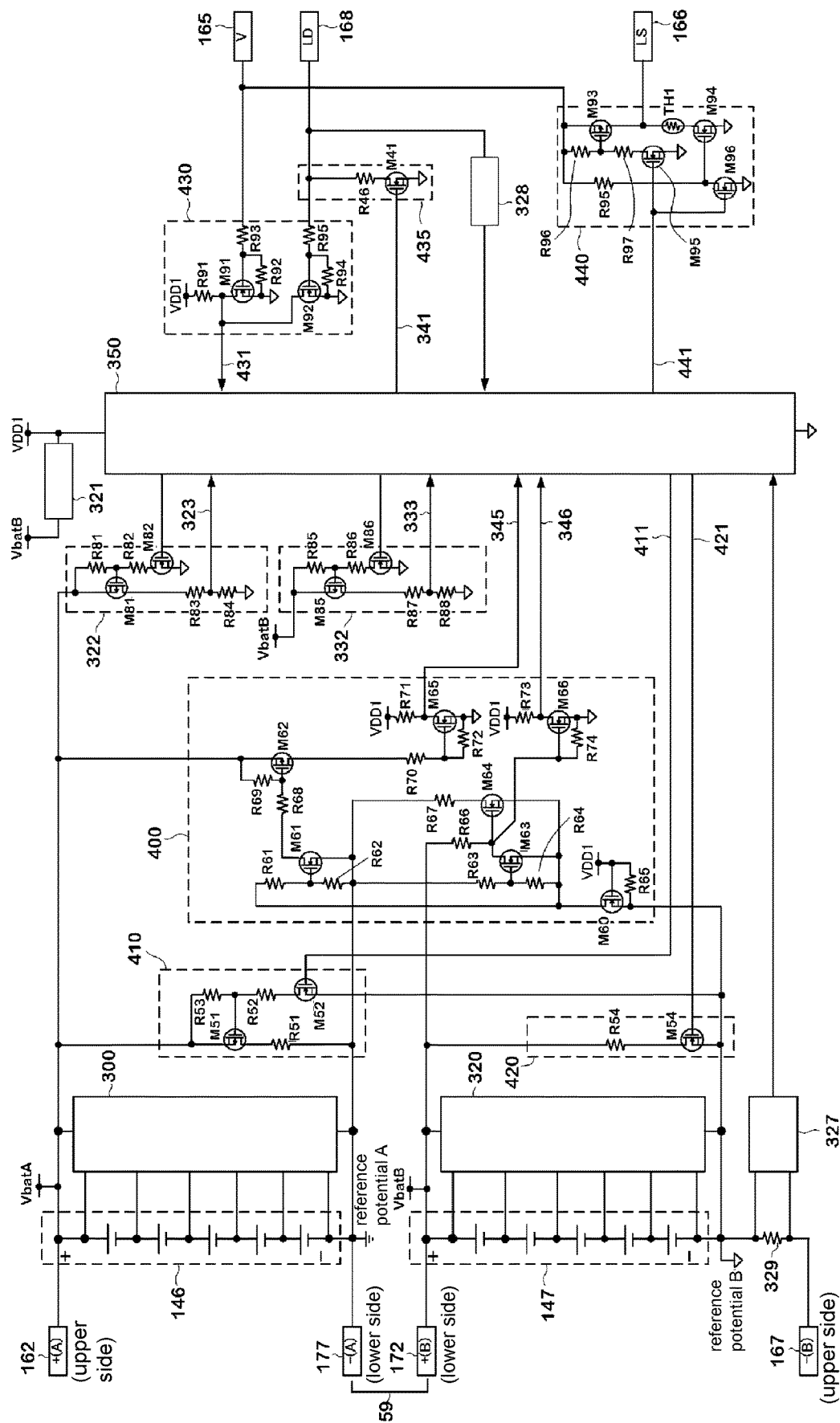

FIG. 15 is another circuit diagram illustrating a circuit part of a circuit configuration inside the battery pack 100 through which a control unit 350 detects the contact failure state.

Figure 16:
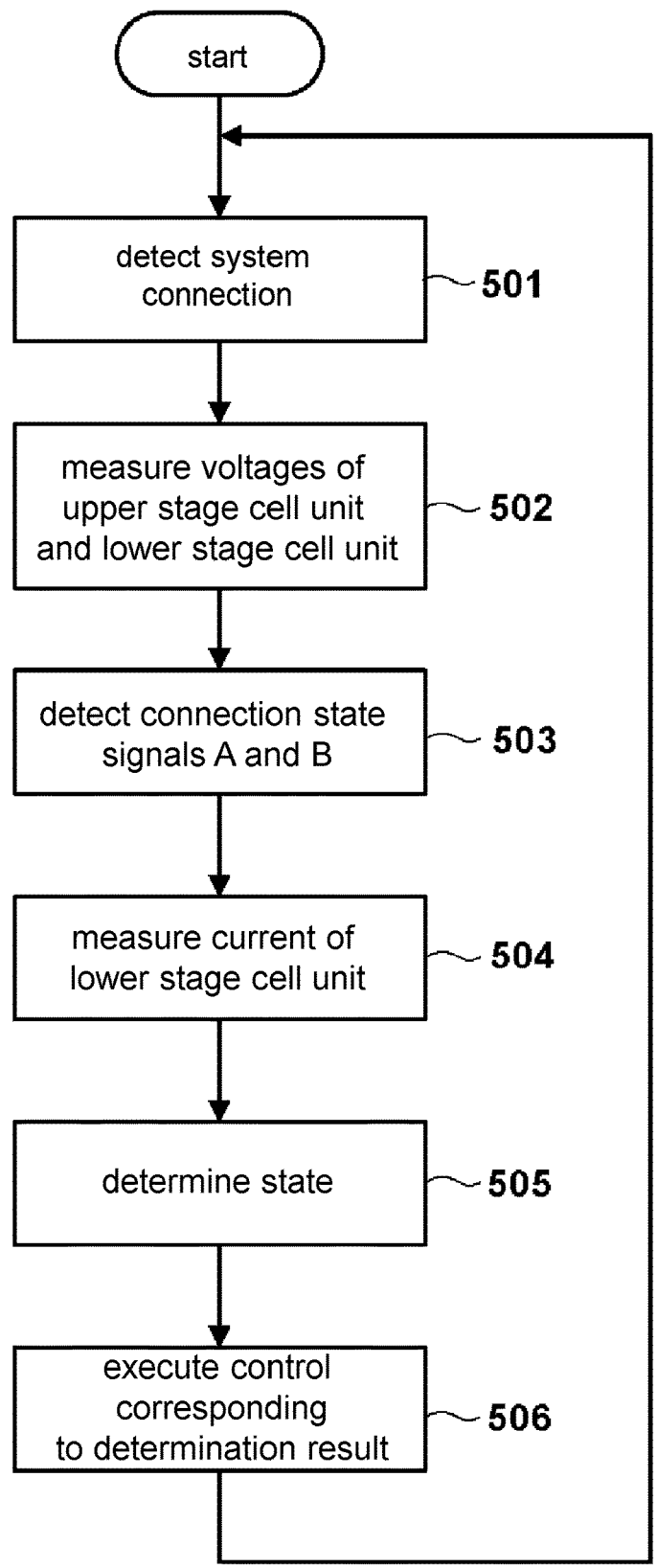

FIG. 16 is a flowchart showing a procedure in which a microcomputer of the control unit 350 determines nonreality/abnormality of a connection state of connection terminals of the battery pack 100.

FIG. 17 is a table showing determination of a connection state of the battery pack 100 performed by the microcomputer of the control unit 350, a way of determining a normality or an abnormality of a terminal connection state, and a corresponding operation with respect to a determination result.

Figure 18:
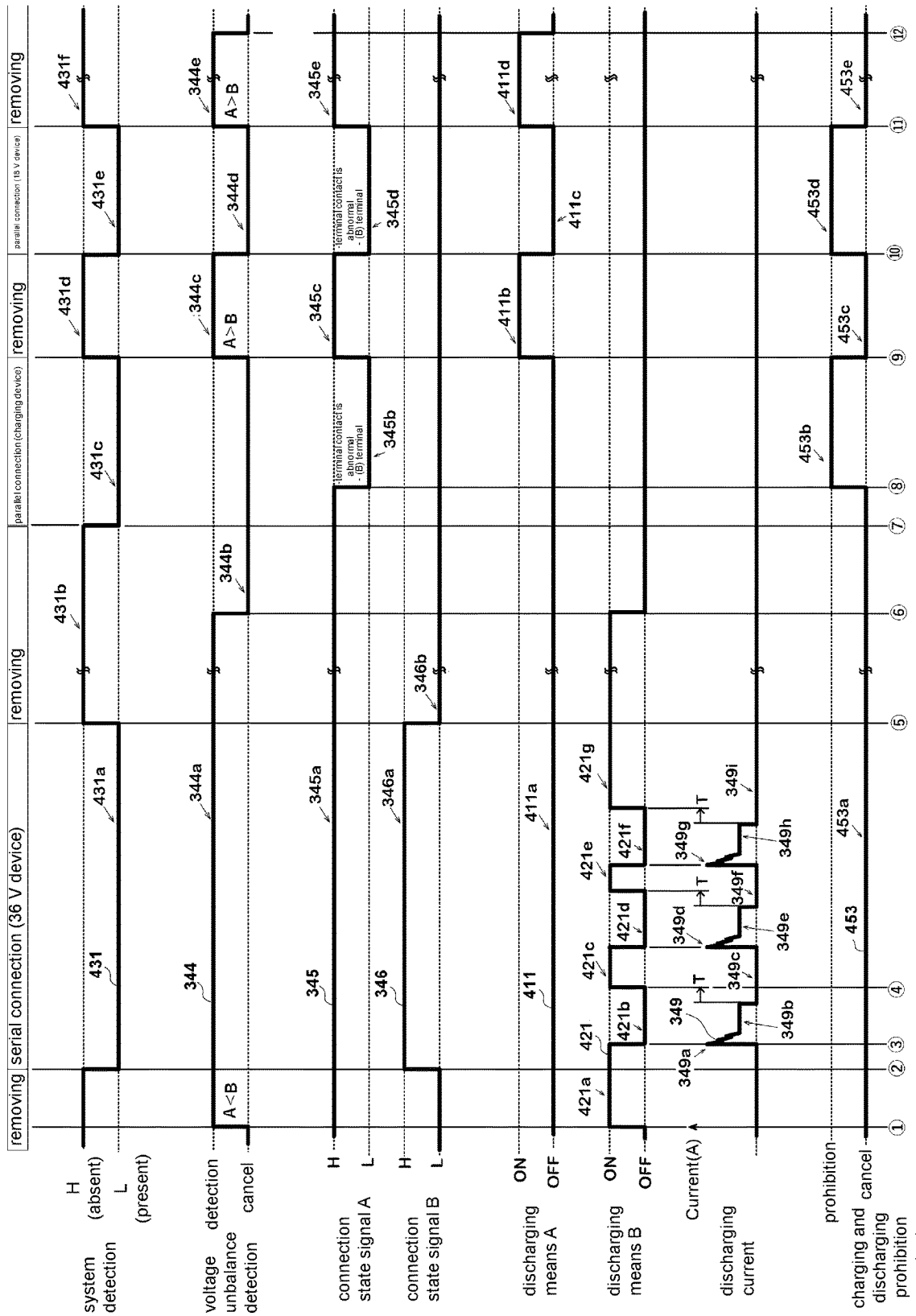

FIG. 18 is a timing chart for further describing operation of the battery pack 100.

Figure 19:
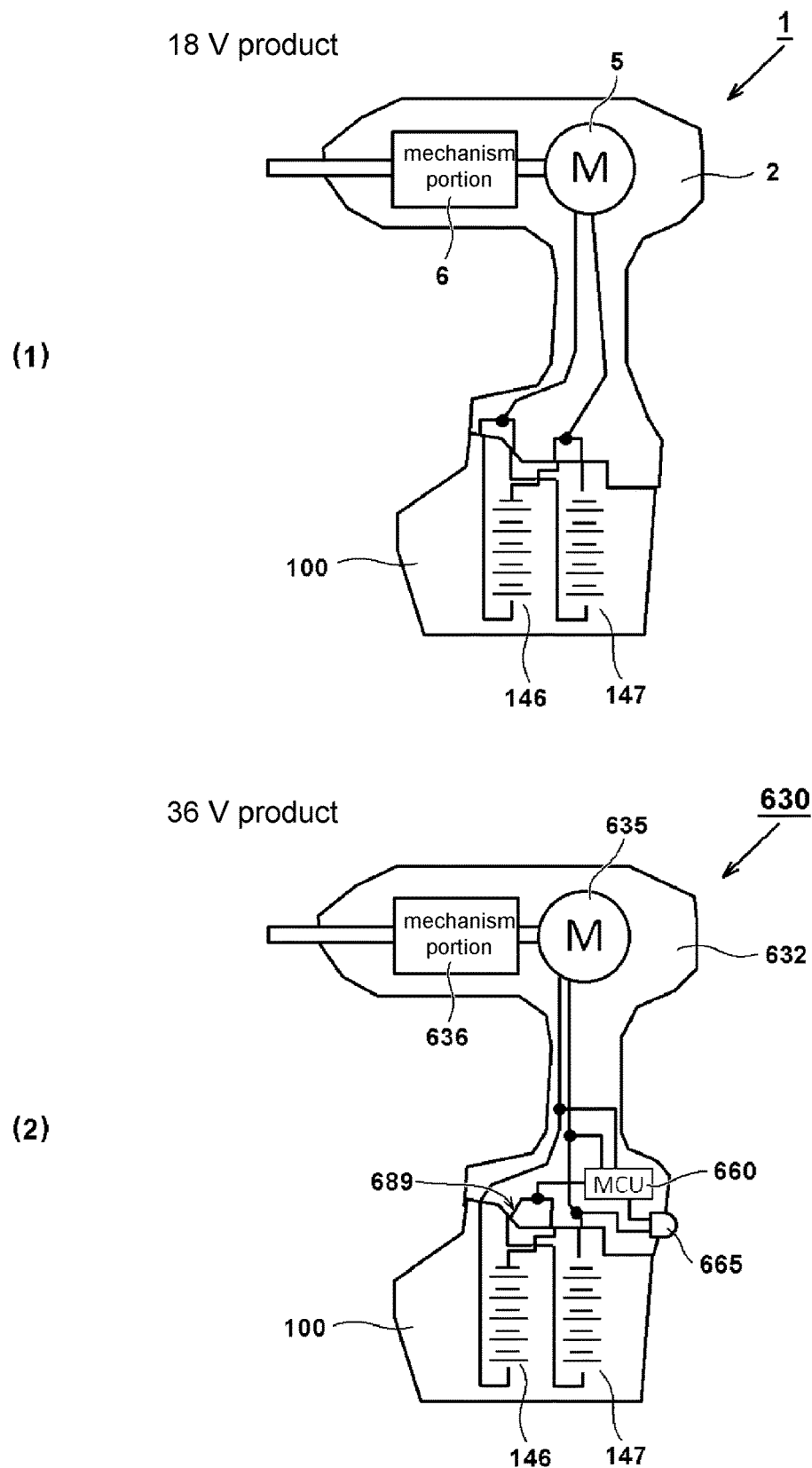

FIG. 19 is a schematic view illustrating a power tool according to a second example of the present disclosure.

Figure 20:
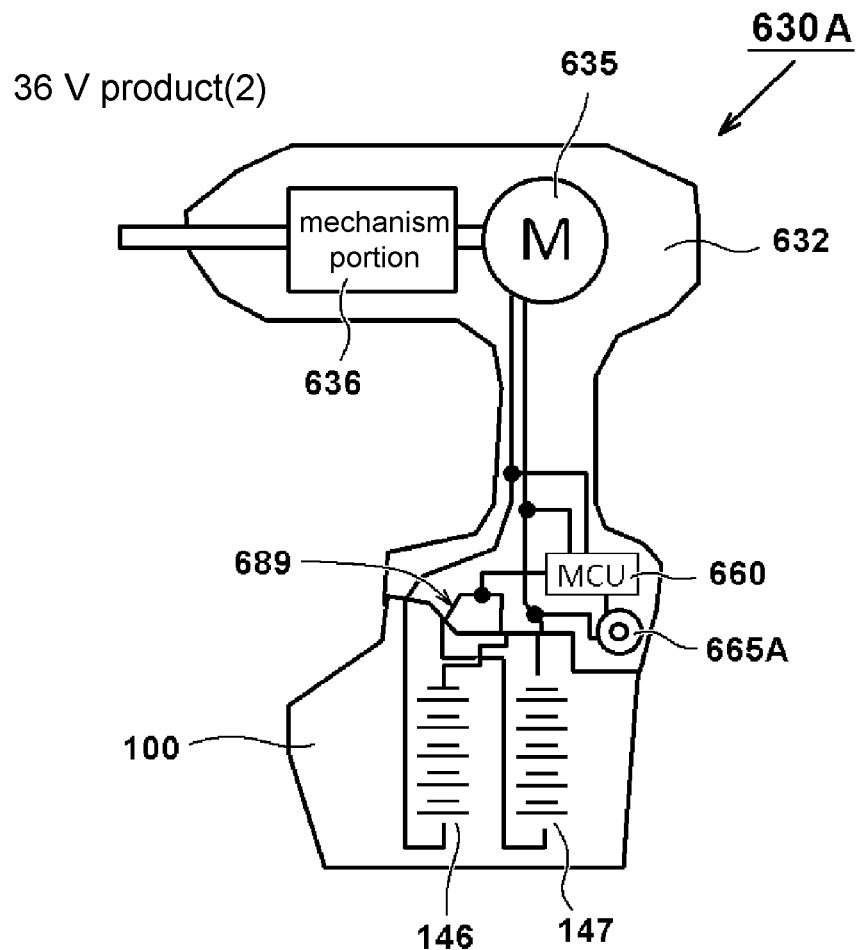

FIG. 20 is a schematic view illustrating a power tool 630A according to a modification example of the second example of the present disclosure.

DESCRIPTION OF EMBODIMENTS

Example 1

Hereinafter, examples of the present disclosure will be described based on the drawings. In the following diagrams, the same reference signs are applied to the same parts, and description thereof will not be repeated. In this specification, as an example of an electrical apparatus, a power tool that is operated by a battery pack will be described. In the description, a front-rear direction and a right-left direction on a main body side of the power tool are the directions indicated in FIG. 2, and the front-rear direction, the right-left direction, and an up-down direction when the battery pack is viewed in a single body are the directions indicated in FIG. 3 based on a mounting direction of the battery pack. For convenience of description, the mounting direction of the battery pack will be described as a direction based on a situation in which the battery pack side is moved without moving the power tool main body side.

Figure 1:
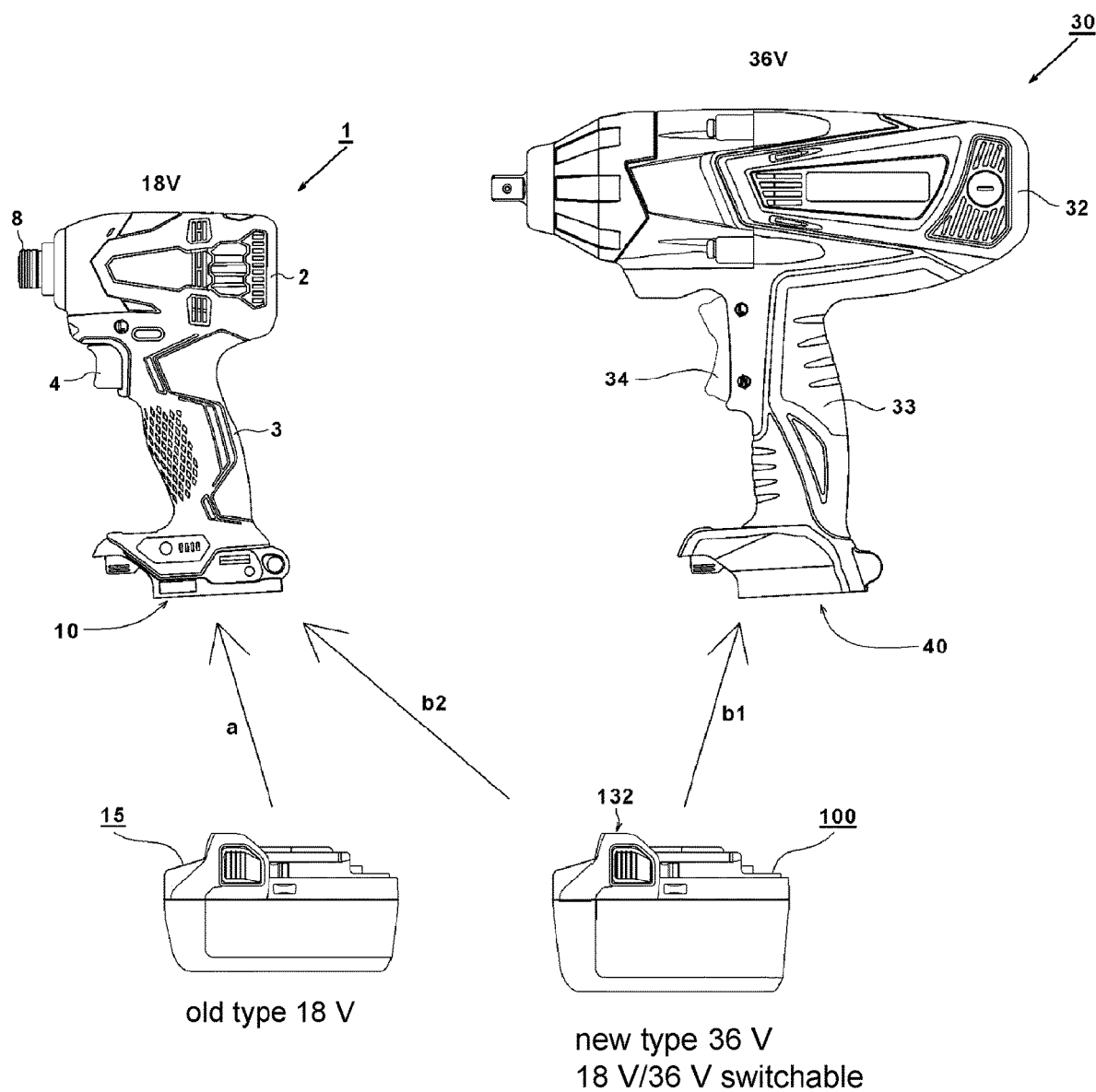
FIG. 1 is a view for describing a situation of mounting a battery pack according to the present disclosure in a power tool.

FIG. 1 is a view for describing a situation of mounting a battery pack according to the present example in a power tool. The power tool that is a form of an electrical apparatus has a battery pack, and a tip tool or a working device is driven using a rotation driving force of a motor. Various kinds of power tools have been realized, and both power tool main bodies 1 and 30 illustrated in FIG. 1 are referred to as impact tools. The power tool main bodies 1 and 30 are tools for performing tightening work by applying a rotation force or a striking force in an axial direction to a tip tool such as a bit or a socket wrench (not illustrated). The power tool main bodies 1 and 30 include housings 2 and 32 that are outer frames forming external shapes, and handle portions 3 and 33 are formed in the housing 2 and 32. Trigger-shaped operation switches 4 and 34 are provided in parts of the handle portions 3 and 33, that is, near places that the index finger reaches when a worker holds the power tool main bodies 1 and 30. Battery pack mounting portions 10 and 40 for mounting battery packs 15 and 100 are formed below the handle portions 3 and 33.

The power tool main body 1 is an electrical apparatus in the related art using the battery pack 15 adapted to a rated voltage of 18 V. The battery pack 15 is a battery pack in the related art and can be mounted in the battery pack mounting portion 10 of the electrical apparatus (power tool main body 1) supporting 18 V as in the combination indicated by the arrow a. Inside the battery pack 15, only one set of a cell unit constituted of five lithium ion battery cells of a rated voltage of 3.6 V connected in series is accommodated, or two sets of such cell units are accommodated and are connected to each other in parallel. Here, "a cell unit" indicates a unit in which a plurality of battery cells are electrically connected to each other. Examples of "a cell unit" include a connected body in which a plurality of battery cells are connected in series, a connected body in which a plurality of battery cells are connected in parallel, and a connected body in which a plurality of battery cells are connected in series and parallel. Here, a voltage of 18 V will sometimes be referred to as a low voltage in the sense that it is a relatively low voltage. Similarly, the power tool main body 1 or the electrical apparatus main body of a rated voltage of 18 V will sometimes be referred to as a low-voltage power tool main body or a low-voltage electrical apparatus main body. Similarly, the battery pack 15 of a nominal voltage of 18 V will sometimes be referred to as a low-voltage battery pack.

The power tool main body 30 is the electrical apparatus main body of a rated voltage of 36 V, and the battery pack 100 that can output 36 V as indicated by the arrow b1 is mounted in the battery pack mounting portion 40. Here, a voltage of 36 V will sometimes be referred to as a high voltage in the sense that it is a relatively high voltage. Similarly, the power tool main body 30 or the electrical apparatus main body of a rated voltage of 36 V will sometimes be referred to as a high-voltage power tool main body or a high-voltage electrical apparatus main body. Inside the battery pack 100, two sets of cell units having five lithium ion battery cells of a rated voltage of 3.6 V connected in series are accommodated, such that the battery pack 100 can be switched between an output of 18 V and an output of 36 V by changing a method of connecting the two sets of cell units. In the present example, the battery pack 100 is configured to support two voltages such that a low voltage and a high voltage can be output. Therefore, the battery pack 100 can be mounted in the power tool main body 1 supporting 18 V as indicated by the arrow b2 and can also be mounted in the power tool main body 30 supporting 36 V as indicated by the arrow b1. Here, the battery pack 100 that can output a low voltage and a high voltage in this manner will sometimes be referred to as a voltage changeable battery pack. In order to mount the battery pack 100 in the power tool main bodies 1 and 30 using different voltages as indicated by the arrows b1 and b2, it is important that shapes of rail portions or terminal portions of the battery pack mounting portions 10 and 40 be substantially the same shapes and that an output voltage of the battery pack 100 be switchable. At this time, it is important that an output voltage of the battery pack 100 reliably support a rated voltage of the electrical apparatus main body or the power tool main body to be mounted such that erroneous voltage setting does not occur.

Figure 2:
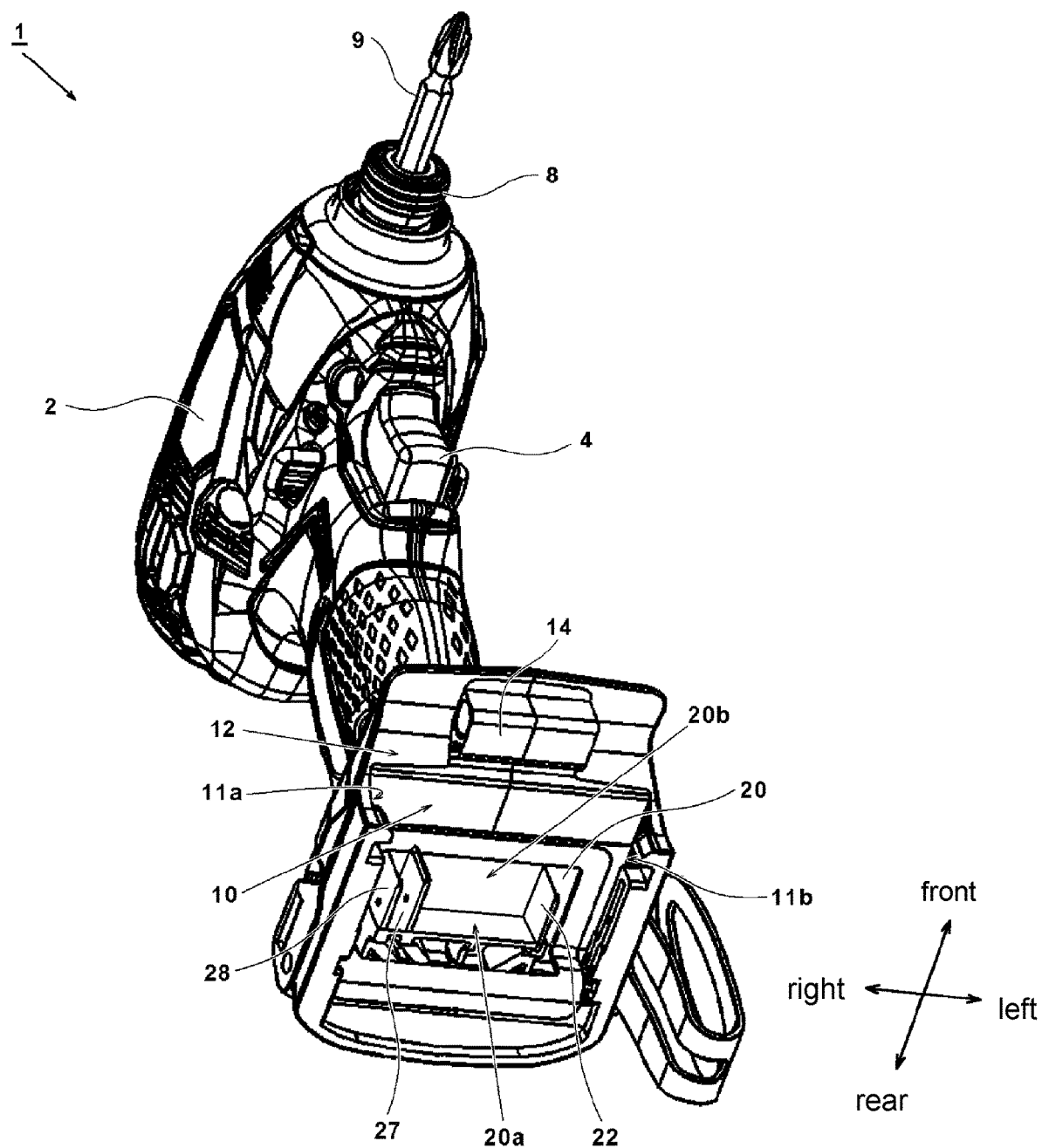
FIG. 2 is a perspective view illustrating a shape of a battery pack mounting portion 10 of a power tool main body 1 in FIG. 1.

FIG. 2 is a perspective view illustrating a shape of the battery pack mounting portion 10 of the power tool main body 1. The power tool main body 1 illustrated herein is an impact driver, in which a handle portion extending downward from a body part of the housing 2 is provided and the battery pack mounting portion 10 is formed on a lower side of the handle portion. A trigger switch 4 is provided in the handle portion. An anvil (not illustrated) serving as an output shaft is provided on the front side of the housing 2, and a tip tool holding portion 8 for mounting a tip tool 9 is provided at the tip of the anvil. Here, a Phillips-head screwdriver bit is mounted as the tip tool 9. This is not limited to only power tools, and all electrical apparatuses using a battery pack are configured to have a battery pack mounting portion 10 that is formed to correspond to the shape of the battery pack to be mounted, so that a battery pack that is not suitable for the battery pack mounting portion 10 cannot be mounted. In the battery pack mounting portion 10, rail grooves 11a and 11b extending in parallel to the front-rear direction are formed in inner wall parts on both right and left sides, and a terminal portion 20 is provided therebetween. The terminal portion 20 is manufactured through integrated molding using a non-conducting material such as a synthetic resin, and a plurality of metal terminals, for example, a positive electrode input terminal 22, a negative electrode input terminal 27, and an LD terminal (abnormality signal terminal) 28 are cast therein. In the terminal portion 20, a vertical surface 20a that constitutes an abutment surface in the mounting direction (front-rear direction) and a horizontal surface 20b are formed. The horizontal surface 20b constitutes a surface that is adjacent to and faces an upper stage surface 115 (which will be described below with reference to FIG. 3) when the battery pack 100 is mounted. A curved portion 12 that abuts a raised portion 132 (which will be described below with reference to FIG. 3) of the battery pack 100 is formed on the front side of the horizontal surface 20b, and a projection portion 14 is formed near the center of the curved portion 12 in the right-left direction. The projection portion 14 also serves as a screw stopper boss of a housing of the power tool main body 1 formed to be divided into two in the right-left direction and serves as a stopper for limiting relative movement of the battery pack 100 in the mounting direction.

Figure 3:
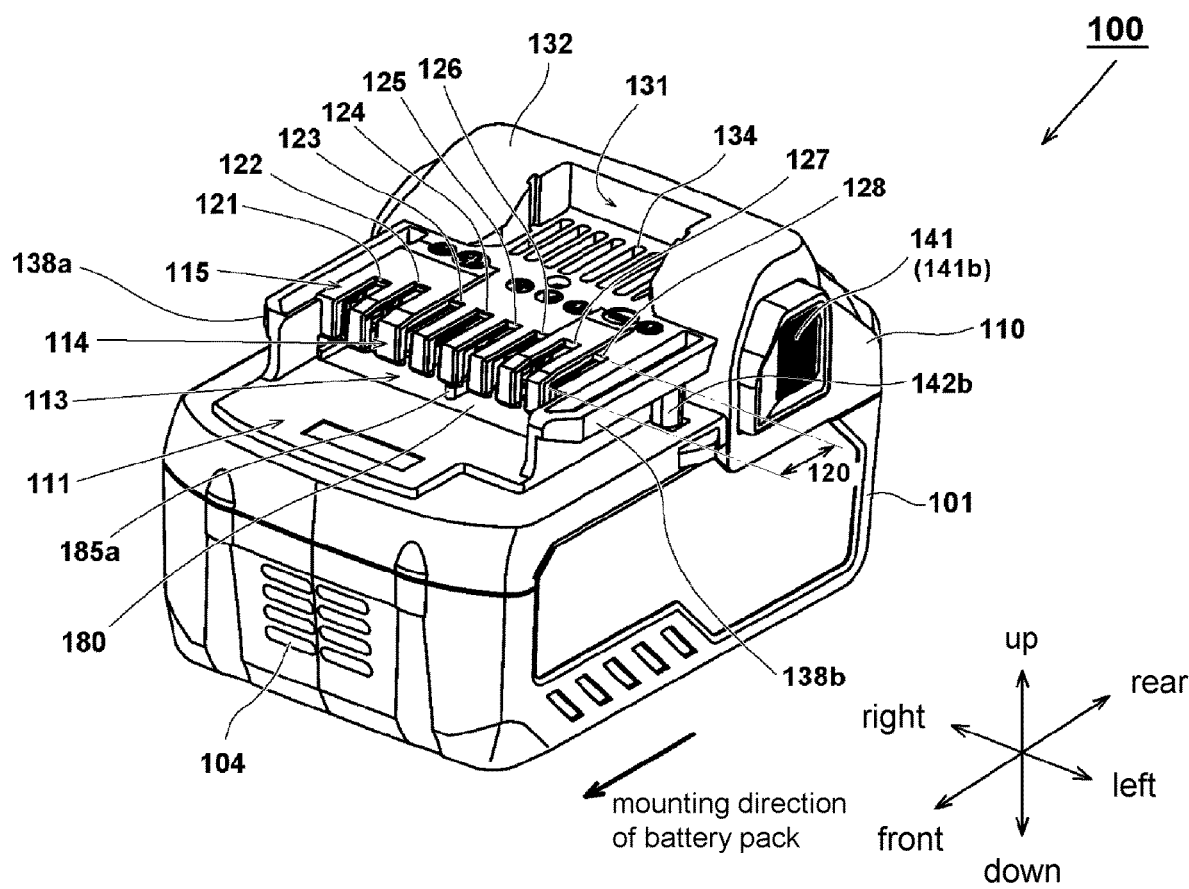
FIG. 3 is a perspective view of a battery pack 100 according to an example of the present disclosure.

FIG. 3 is a perspective view of the battery pack 100 according to the example of the present disclosure. The battery pack 100 can be attached to and detached from the battery pack mounting portions 10 and 40 (refer to FIG. 1), and the battery pack 100 is automatically switched between outputs of a low voltage (here, 18 V) and a high voltage (here, 36 V) in accordance with the terminal shape on the power tool main body 1 or 30 side. In addition, in order to have compatibility in attachment with a rated 18 V battery pack 15 (refer to FIG. 1) in the related art, the shape of the mounting part of the battery pack 100 is the same as that of the battery pack 15 in the related art. A casing of the battery pack 100 is formed to include a lower case 101 and an upper case 110 that can be divided in the up-down direction. The lower case 101 and the upper case 110 are made of members that do not conduct electricity, for example, a synthetic resin, and are fixed to each other using four screws (not illustrated). A mounting mechanism in which two rails 138a and 138b are formed to be attached to the battery pack mounting portion 10 is formed in the upper case 110. The rails 138a and 138b are formed such that the longitudinal direction becomes parallel to the mounting direction of the battery pack 100 and the rails 138a and 138b protrude in the right-left direction from the right and left side surfaces of the upper case 110. The rails 138a and 138b are formed to have shapes corresponding to the rail grooves 11a and 11b (refer to FIG. 2) formed in the battery pack mounting portion 10 of the power tool main body 1. In a state where the rails 138a and 138b are fitted into the rail grooves 11a and 11b, the battery pack 100 is fixed to the power tool main bodies 1 and 30 by being engaged with an engagement portion 142a (engagement portion on the right side, not shown in FIG. 3) and an engagement portion 142b that constitute claws of latches. When the battery pack 100 is detached from the power tool main bodies 1 and 30, latches 141 on both right and left sides are pushed such that the engagement portions 142a and 142b move inward and the engagement state is canceled. In this state, the battery pack 100 is moved to an opposite side in the mounting direction.

A flat lower stage surface 111 is formed on the front side of the upper case 110, and the upper stage surface 115 formed to be higher than the lower stage surface 111 is formed near the center. The lower stage surface 111 and the upper stage surface 115 are formed to have a stepped shape, and a connection part therebetween constitutes a stepped portion 114 (vertical surface). The front side part of the upper stage surface 115 from the stepped portion 114 constitutes a slot group disposition region 120. A plurality of slots 121 to 128 extending rearward from the stepped portion 114 on the front side are formed in the slot group disposition region 120. The slots 121 to 128 are cutout parts having a predetermined length in the battery pack mounting direction, and a plurality of connection terminals (which will be described below with reference to FIG. 4) that can be fitted into device side terminals of the power tool main bodies 1 and 30 or an external charging device (not illustrated) are arranged inside the cutout parts. In the slots 121 to 128, cutouts are formed on the upper surfaces parallel to the mounting direction and the vertical surfaces, such that the terminals on the power tool main body side can be inserted from the lower stage surface 111 side. In addition, an opening portion 113 that opens continuously in the lateral direction is formed on the lower side of the slots 121 to 128 and between the stepped portion 114 and the lower stage surface 111. In the opening portion 113, both right and left sides of a rib-shaped vertical wall portion 185a disposed in the middle and extending in the vertical direction are formed to have a flat surface shape, and a flat surface-shaped part is formed by a board cover 180. The board cover 180 is a component manufactured separately from the upper case 110.

In the slots 121 to 128, the slot 121 on a side close to the rail 138a on the right side of the battery pack 100 constitutes an insertion port of a charging positive electrode terminal (C-positive terminal), and a slot 122 constitutes an insertion port of a discharging positive electrode terminal (positive terminal). In addition, a slot 127 on a side close to the rail 138b on the left side of the battery pack 100 constitutes an insertion port of a negative electrode terminal (negative terminal). Generally, in the battery pack 100, the positive electrode side and the negative electrode side of the power terminal for transmitting power are disposed sufficiently apart from each other. When viewed from a vertical imaginary surface positioned at the center in the right-left direction, the positive electrode terminal is provided at a sufficiently far position on the right side, and the negative electrode terminal is provided at a sufficiently far position on the left side. A plurality of signal terminals for transmitting a signal used for controlling the battery pack 100, the power tool main bodies 1 and 30, and an external charging device (not illustrated) are disposed between the positive electrode terminal and the negative electrode terminal. Here, four slots 123 to 126 for signal terminals are provided in a power terminal group. The slot 123 is a preliminary terminal insertion port, and no terminal is provided in the present example. The slot 124 is an insertion port for a T terminal for outputting a signal that becomes identification information of the battery pack 100 to the power tool main body or the charging device. The slot 125 is an insertion port for a V terminal for inputting a control signal from an external charging device (not illustrated). The slot 126 is an insertion port for an LS terminal for outputting temperature information of the battery obtained by a thermistor (thermosensitive element) (not illustrated) that is provided in contact with the cell. The slot 128 for an LD terminal outputting an abnormality stoppage signal of a battery protection circuit (which will be described below) that is further included in the battery pack 100 is provided on the left side of the slot 127 constituting the insertion port of the negative electrode terminal (negative terminal).

The raised portion 132 is formed to be raised on the rear side of the upper stage surface 115. The external shape of the raised portion 132 has a shape that is raised upward from the upper stage surface 115, and a depressed stopper portion 131 is formed near the center thereof. The stopper portion 131 constitutes an abutment surface of the projection portion 14 (refer to FIG. 2) when the battery pack 100 is mounted in the battery pack mounting portion 10. If the projection portion 14 on the power tool main body 1 side is inserted until it abuts the stopper portion 131, a plurality of terminals (device side terminals) arranged in the power tool main body 1 and a plurality of connection terminals (which will be described below with reference to FIG. 4) arranged in the battery pack 100 come into contact with each other, and are thus in a conducting state. In addition, the engagement portion 142a (engagement portion on the right side, not shown in FIG. 3) and the engagement portion 142b of the latches 141 of the battery pack 100 are ejected in the right-left direction in lower portions of the rails 138a and 138b due to action of a spring and are interlocked with recessed portions (not illustrated) formed in the rail grooves 11a and 11b of the power tool main body 1, such that the battery pack 100 is prevented from falling off. A slit 134 (cooling air inlet) connected to the inside of the battery pack 100 is provided on the inner side of the stopper portion 131. In addition, in a state where this battery pack 100 is mounted in the power tool main body 1, the slit 134 is covered in a closed state such that it is not visible from the outside. The slit 134 is a vent-hole used for causing air for cooling to forcibly flow into the battery pack 100 when the battery pack 100 is coupled to the charging device (not illustrated) and is charged, and cooling air taken into the battery pack 100 is discharged to the outside through a slit 104 (exhaust venthole) provided in a front wall of the lower case 101.

Figure 4:
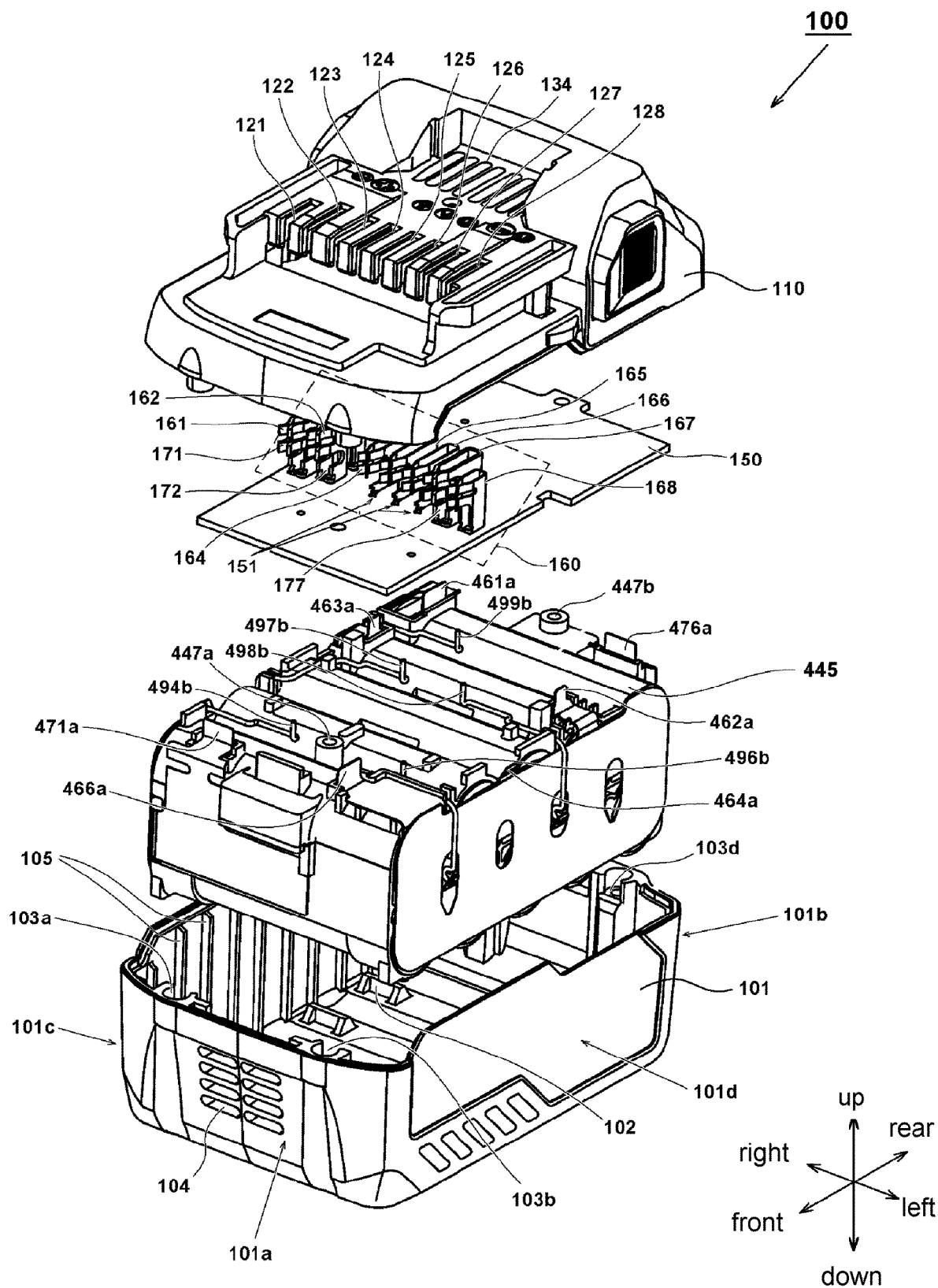
FIG. 4 is a perspective development view of the battery pack 100 in FIG. 3.

FIG. 4 is a perspective development view of the battery pack 100 in FIG. 3. The casing of the battery pack 100 is formed to include the upper case 110 and the lower case 101 that can be separated from each other in the up-down direction. Ten battery cells are accommodated in an internal space of the lower case 101. Two screw holes 103a and 103b for screwing to the upper case 110 are formed on the front wall surface of the lower case 101, and screws (not illustrated) pass through the screw holes 103a and 103b in a penetrating manner in the upward direction from below. Two screw holes 103c (not shown in the diagram) and 103d are also formed on a rear wall surface of the lower case 101. A plurality of battery cells (not illustrated) are fixed by a separator 445 constituted of non-conductors such as synthetic resins in a state of being stacked in two stages with five in each stage. The separator 445 holds the plurality of battery cells such that only both right and left sides constituting both end portions of the battery cells open.

A circuit board 150 is fixed to the upper side of the separator 445. In the circuit board 150, a plurality of connection terminals (161, 162, 164 to 168, 171, 172, and 177) are fixed through soldering, and the connection terminals and a circuit pattern (not illustrated) are electrically connected to each other. Moreover, various electronic elements (not illustrated herein) such as a battery protection IC, a microcomputer, a PTC thermistor, a resistor, a capacitor, a fuse, or a light emitting diode are mounted in the circuit board 150. Regarding the material of the circuit board 150, it is possible to use a single-layer substrate, a double-sided substrate, or a multi-layer substrate referred to as a printed board in which a pattern wiring is printed using a conductor such as a copper foil on a substrate realized by having a raw material impregnated with a resin having insulation properties. In the present example, a double-sided substrate is used, and a wiring pattern is formed on an upper surface (front surface and surface on the upper side shown in FIG. 4) of the circuit board 150 and a lower surface (rear surface). A slot group disposition region 160 is provided on the front side slightly from the center of the circuit board 150 in the front-rear direction, and the plurality of connection terminals (161, 162, 164 to 168, 171, 172, and 177) are fixed thereto side by side in the lateral direction.

The positive electrode terminals (161, 162, 171, and 172) and the negative electrode terminals (167 and 177) are disposed at places far apart from each other in the right-left direction, and three signal terminals (T terminal 164, V terminal 165, and LS terminal 166) are provided therebetween. In the present example, as a component for a power terminal, a component in which two sets of arm portions extending in the horizontal direction in total including one set of arm portions on the right and left sides on the upper side and one set of arm portions on the right and left sides on the lower side are provided is used. The detailed shape thereof will be described below with reference to FIG. 11. Regarding the signal terminals (164 to 166 and 168), a signal terminal component having one arm portion in the up-down direction can be used as it has been used in the related art without any change. However, in the present example, in order to achieve equivalent fitting states of the positive electrode terminals (161, 162, 171, and 172) and the negative electrode terminals (167 and 177) with respect to the device side terminals, a signal terminal component (which will be described below with reference to FIG. 11) having two arm portions on the upper and lower sides is also used on the signal terminal side.

An LD terminal 168 is provided on the left side of the negative electrode terminal pair (167 and 177). The LD terminal 168 is also formed to have two sets of arm portions on the upper side and the lower side. In all the signal terminals (164 to 166 and 168), leg portions respectively penetrate a plurality of attachment holes 151 formed in the circuit board 150 from the front surface to the rear surface and are fixed to the rear surface side through soldering. The present example also has a feature in a method of fixing three signal terminals (164 to 166), and details thereof will be described below with FIGS. 11 and 12. As described above, an electronic element (not illustrated) is mounted on the circuit board 150, and the plurality of connection terminals are fixed through soldering. Thereafter, the board cover 180 is provided, and the front surface of the circuit board 150 is solidified with a resin and is fixed to the separator 445 using screws (not illustrated) thereafter. In FIG. 4, illustration of the board cover 180 is omitted.

In the lower case 101, the upper surface opens and has a substantially rectangular parallelepiped shape. The lower case 101 constituted of a bottom surface, a front surface wall 101a extending in the vertical direction with respect to the bottom surface, a rear surface wall 101b, a right side wall 101c, and a left side wall 101d. The internal space of the lower case 101 has a shape preferable for accommodating the separator 445. In order to stably holding the separator 445, many fixing ribs 102 are formed on the inner side of the bottom surface, and in order to reinforce the wall surface, many ribs 105 are formed continuously in the vertical direction. The slit 104 is provided substantially in the middle of the front surface wall 101a. The slit 134 of the upper case 110 is used as an inlet port for allowing cooling air sent out from the charging device side to flow into the internal space of the battery pack 100 when charging is performed using the charging device, and the slit 104 of the lower case 101 is also used as a discharge port for cooling air.

An output from the battery cell side is connected to the circuit board 150 via connection drawer tabs 461a, 466a, 471a, and 476a having a plate shape and extending in the upward direction. In addition, end portions 494b and 496b to 499b of lead wires from intermediate connection points of the battery cells connected in series are disposed to extend in the upward direction and are soldered on the circuit board. Moreover, intermediate drawer tabs 462a and 463a from intermediate connection points of the battery cells connected in series are disposed to extend in the upward direction such that they are connected to the circuit board 150. Screw bosses 447a and 447b for fixing the circuit board 150 are formed on the upper side of the separator 445.

Figure 5:
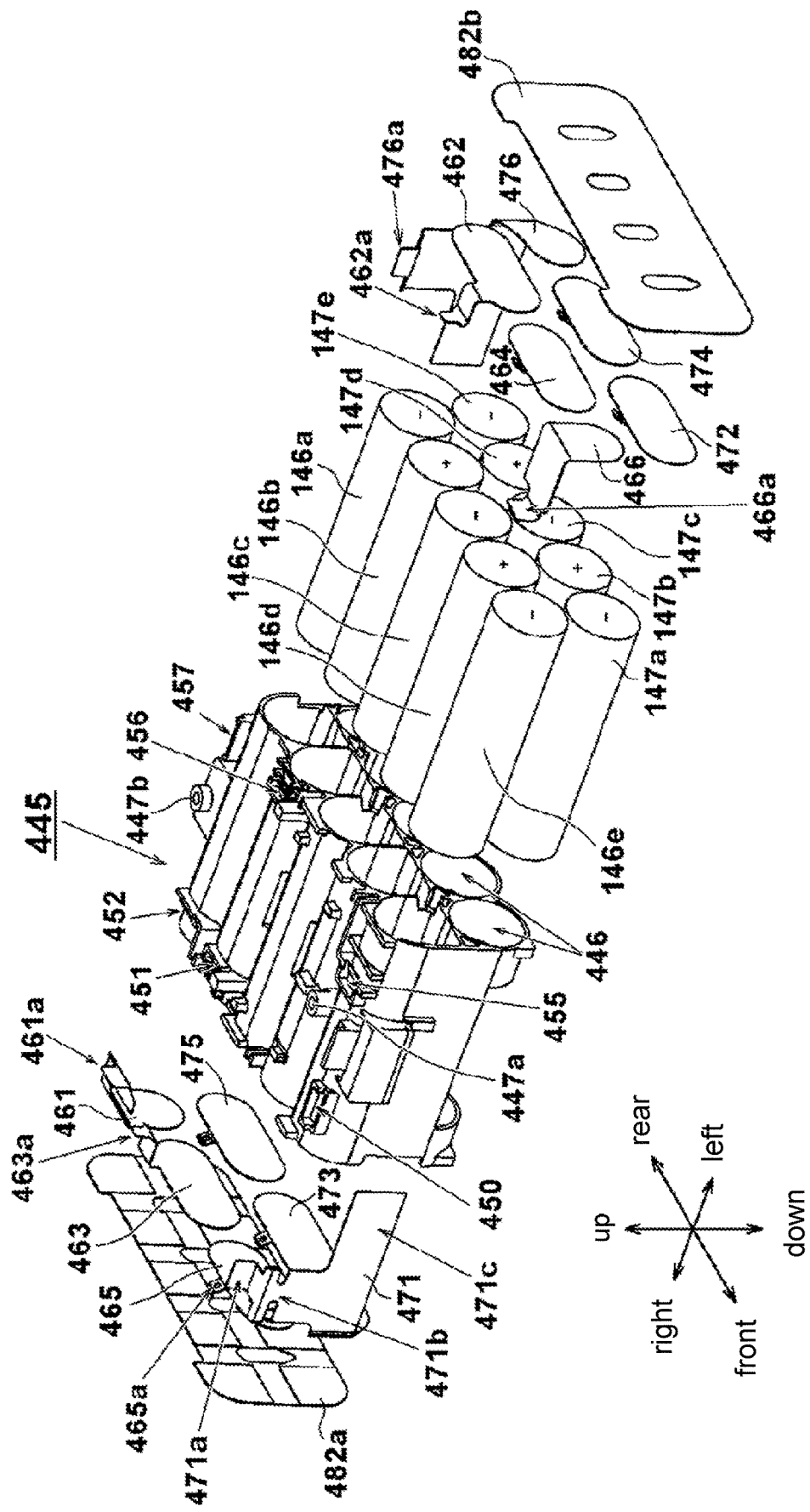
FIG. 5 is a perspective development view for describing a stacking situation and a wiring method for battery cells using a separator 445 FIG. 4.

Next, a stacking situation and a wiring method for battery cells using the separator 445 will be described using a perspective development view of FIG. 5. In the separator 445, ten battery cells 146a to 146e, and 147a to 147e are stacked five each in two stages on the upper and lower sides. FIG. 5 illustrates a state where the battery cells 146a to 146e, and 147a to 147e are taken out from the separator 445. However, at the time of assembly, the battery cells are inserted into cylindrical spaces 446 of the separator 445. The battery cells are connected to each other through the connection plates 462 to 465, and 472 to 475 between the terminals exposed on both right and left sides of the separator, and drawer plates 461, 466, 471, and 476 are connected to the battery cell. Thereafter, insulation sheet 482a, 482b are pasted on the connection plates 462 to 465, and 472 to 475 or the drawer plates 461, 466, 471, and 476 for insulation.

The battery cells are stacked such that axes thereof are parallel to each other, and adjacent cells are disposed such that directions thereof are alternately opposite to each other. The positive electrode terminals and the negative electrode terminals of adjacent battery cells are connected to each other using the metal connection plates 462 to 465, and 472 to 475. Both side terminals of the battery cells and the connection plates 462 to 465, and 472 to 475 are fixed through spot welding at a plurality of places. Here, five series-connection battery cells installed in the upper stage form an upper cell unit 146 (which will be described below with reference to FIG. 8), and five series-connection battery cells installed in the lower side form a lower cell unit 147 (which will be described below with reference to FIG. 8). Here, the upper side and the lower side of the cell unit are not physical positions indicating that the battery cells are on the upper stage or the lower stage inside the lower case 101. When two cell units are connected in series, a cell unit positioned on the ground side is referred to as "a lower cell unit", and a cell unit positioned on a high voltage side when being connected in series is referred to as "an upper cell unit", based on an electrical potential. In the battery pack of the present example, the upper cell unit 146 is disposed in the upper stage and the lower cell unit 147 is disposed in the lower stage. However, the method of disposing battery cells is not limited to this disposition, and battery cells may be divided into the front side and the rear side instead of being divided into the upper stage and the lower stage.

Regarding the battery cells 146a to 146e, and 147a to 147e, lithium ion battery cells (not illustrated) that have a so-called size of 18650 with a diameter of 18 mm and a length of 65 mm and can be charged and discharged a plurality of times are used. In the present example, in order to have a switchable output voltage from the battery pack 100, the forms of a series-connection voltage (high voltage side output) and a parallel-connection voltage (low voltage side output) of the plurality of cell units can be selected. Therefore, as long as the same number of cells are connected in series in each of the cell units, the number of cell units is arbitrary. The battery cells to be used are not limited to only the size of 18650, and they may be battery cells having a so-called size of 21700 or battery cells having other sizes. In addition, the shapes of the battery cells are not limited to only a cylindrical shape, and they may have a rectangular parallelepiped shape, a laminated shape, and other shapes.

The kind of the battery cells is not limited to only lithium ion batteries, and secondary batteries of an arbitrary kind such as nickel-hydride battery cells, lithium ion polymer battery cells, and nickel-cadmium battery cells may be used. Two electrodes are provided at both ends of the battery cell in the length direction. One of the two electrodes is a positive electrode and the other is a negative electrode. However, positions for providing the electrodes are not limited to only both ends side, and the electrodes may be arbitrarily disposed as long as a cell unit can be easily formed inside the battery pack.

The positive electrode of the upper cell unit 146 is connected to the circuit board 150 using the drawer plate 461 in which the drawer tab 461a is formed, and the negative electrode of the upper cell unit 146 is connected to the circuit board 150 using the drawer plate 466 in which the drawer tab 466a is formed. In a similar manner, the positive electrode of the lower cell unit 147 is connected to the circuit board 150 using the drawer plate 471 in which the drawer tab 471a is formed, and the negative electrode of the lower cell unit 147 is connected to the circuit board 150 using the drawer plate 476 in which the drawer tab 476a is formed. Tab holders 450 to 452, and 455 to 457 for holding tabs of the drawer plates 461, 466, 471, and 476 having a shape realized by folding a thin metal plate are formed on the upper surface of the separator 445. The tab holders 450 to 452, and 455 to 457 are tab holding portions formed to hold the drawer tabs 461a, 462a, 463a, 466a, 471a, and 476a that are folded into an L-shape. The tab holders 450 to 452, and 455 to 457 are integrally molded as recessed portions having a seat surface, a rear surface, and both side surfaces when the separator 445 is formed, and the drawer tabs 461a, 462a, 463a, 466a, 471a, and 476a are respectively fitted into these recessed portions. Two screw bosses 447a and 447b for screwing the circuit board 150 are formed in the upper portion of the separator 445. The right side of the drawer plates 461 and 471 and the connection plates 463, 465, 473, and 475 is covered with an insulation sheet 482a, and the left side of the drawer plates 466 and 476 and the connection plates 462, 464, 472, and 474 is covered with an insulation sheet 482b. The insulation sheet 482a is a non-conductive material, and its inner part is coated with a seal material.

Figure 6:
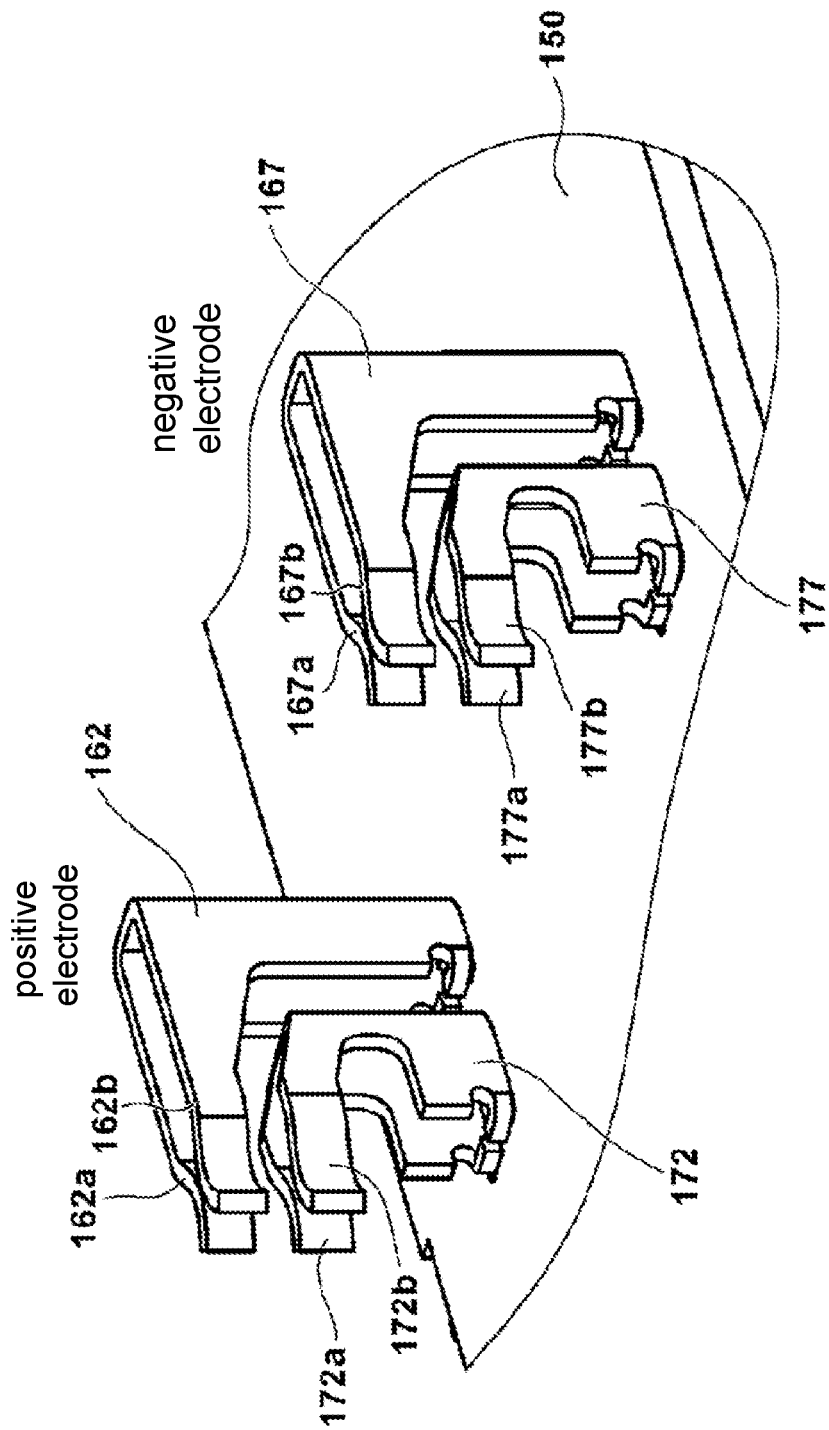
FIG. 6 is a view illustrating a shape of a single body of a positive electrode terminal pair (162 and 172) and a negative electrode terminal pair (167 and 177) of power terminals in FIG. 4 used for discharging.

Next, shapes of two sets of power terminals will be described using FIG. 6. FIG. 6 is a partial view of the circuit board 150 illustrated in FIG. 4 and illustrates only a positive electrode terminal pair (upper positive electrode terminal 162 and lower positive electrode terminal 172) and a negative electrode terminal pair (upper negative electrode terminal 167 and lower negative electrode terminal 177) fixed to the circuit board 150. In the positive electrode terminal for outputting, the upper positive electrode terminal 162 and the lower positive electrode terminal 172 electrically independent from each other are disposed side by side in the front-rear direction when viewed at the attachment position of the circuit board 150. These are the plurality of terminals (162 and 172) disposed close to each other and function as a switching terminal group used for switching between voltages. Each of the upper positive electrode terminal 162 and the lower positive electrode terminal 172 has an arm portion set (arm portions 162a and 162b and arm portions 172a and 172b) extending to the front side. Here, the arm portions 162a and 162b and the arm portions 172a and 172b have shapes positioned apart from each other in the up-down direction, and positions of fitting portions thereof in the front-rear direction are substantially the same. The positive electrode terminal pair (162 and 172) is disposed inside the single slot 122. The negative electrode terminal pair also has the same shape as the positive electrode terminal pair and is constituted of the upper negative electrode terminal 167 and the lower negative electrode terminal 177. The negative electrode terminal pair (167 and 177) is disposed inside the single slot 127. These are a plurality of terminals (167 and 177) disposed close to each other and function a switching terminal group used for switching between voltages. Inside the slot 127, an arm portion set of the upper negative electrode terminal 167 is disposed on the upper side, and an arm portion set of the lower negative electrode terminal 177 is disposed on the lower side of the arm portion set of the upper negative electrode terminal 167. The charging positive electrode terminal pair (upper positive electrode terminal 161 and lower positive electrode terminal 171: refer to FIG. 4) are disposed (not illustrated in FIG. 6) on the right side of the discharging positive electrode terminal pair (upper positive electrode terminal 162 and the lower positive electrode terminal 172). The shape of the charging positive electrode terminal pair (161 and 171) is the same as the upper positive electrode terminal 162 and the lower positive electrode terminal 172.

Figure 7:
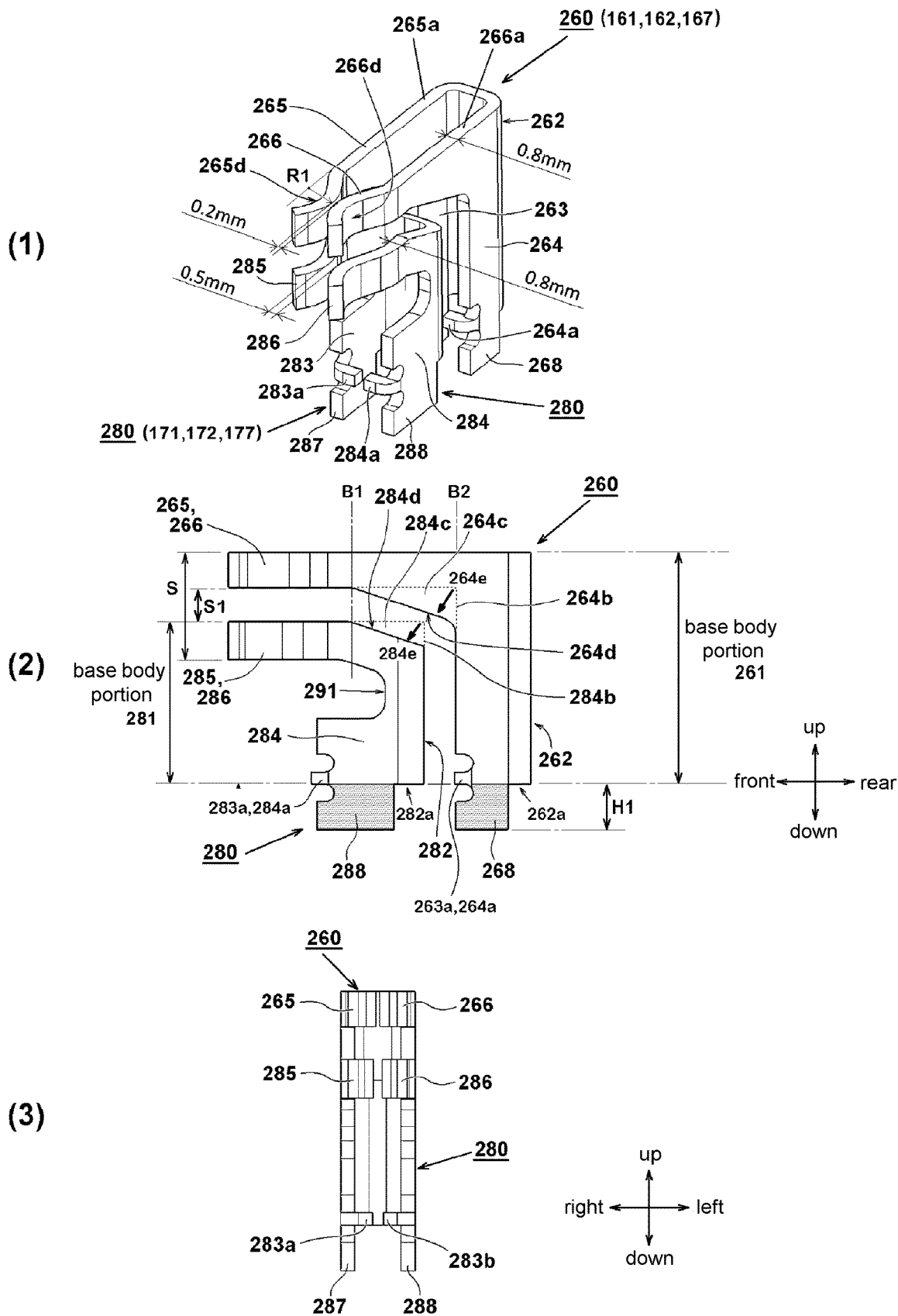
FIG. 7 is a view illustrating shapes of single bodies of the power terminals (161 and 171, 162 and 172, and 167 and 177) in FIG. 4, (1) of FIG. 7 is a perspective view of the entirety, (2) of FIG. 7 is a side view of the entirety, and (3) of FIG. 7 is a front view of the entirety.

FIG. 7(1) is a perspective view illustrating single bodies of an upper terminal component 260 and a lower terminal component 280. The upper terminal component 260 is a common component used for the upper positive electrode terminals 161 and 162 and the upper negative electrode terminal 167, and the lower terminal component 280 is a common component used for the lower positive electrode terminals 171 and 172 and the lower negative electrode terminal 177. The upper terminal component 260 and the lower terminal component 280 are formed by press-cutting a flat plate formed of a conductive metal through pressing and bending the cut plate into a U-shape. The upper terminal component 260 is folded such that a surface constituting a U-shaped bottom portion, that is, a bridge portion 262 becomes the upper side. The lower terminal component 280 is folded such that a bridge portion 282 becomes the rear side. The long arm portions 265 and 266 extending to the upper side of the lower terminal component 280 are formed in the upper terminal component 260. The bridge portion 262 has an orthogonal surface when viewed in the front-rear direction in which the arm portions 265 and 266 extend, and the surface become a vertical surface extending in the vertical direction.

The upper terminal component 260 has a right side surface 263 and a left side surface 264 that are formed by being folded into a U-shape to be parallel to each other, and the bridge portion 262 that constitutes the rear surface connecting those to each other. The arm portions 265 and 266 sandwiching the device side terminals therebetween inward from both right and left sides are provided on the front side of the right side surface 263 and the left side surface 264. A region of the front side portion on the left side surface 264 from the lower side to a position near the upper end extends in the vertical direction in a flat plane shape, and the arm portions 265 and 266 are formed to extend to the front side from a place near the upper end. The shape of the right side surface 263 is formed to have plane symmetry with the left side surface 264. The arm portion 265 is disposed to extend to the front side from the upper front side of the left side surface 264. In this manner, the arm portions 265 and 266 are formed to extend to the front side from the upper side part of the front side portion of a base body portion 261, that is, in a direction parallel to the mounting direction of the battery pack 100. The arm portions 265 and 266 face each other when viewed in the right-left direction and have spring properties through pressing such that the smallest gap parts, that is, fitting portions fitted into the device connection terminals approach a position where they almost come into contact with each other. Here, pressing denotes plastic working performed by using a press machine. A raw material such as a sheet metal is pressed to a die with a high pressure, is subjected to shearing such as cutting, punching, and drilling, and is further subjected to bending or drawing as necessary, and are thus sheared and formed to have a desired shape. In the present example, the upper terminal component 260 and the lower terminal component 280 are formed of flat plates having a thickness of 0.8 mm, for example. Accordingly, the upper positive electrode terminals 161 and 162 and the upper negative electrode terminal 167 have a high mechanical strength, so that a fitting pressure when being fitted into the device side terminals is enhanced. Heat treatment, plating treatment, or the like may be performed after pressing process.

The lower terminal component 280 is also manufactured in a similar manner and has a right side surface 283 and a left side surface 284 that are formed by being folded into a U-shape to be parallel to each other, and a base body portion 281 that constitutes the bridge portion 282 connecting those to each other. The arm portions 285 and 286 are formed on the front side from places near slender upper portions on the right side surface 283 and the left side surface 284. The arm portions 285 and 286 have shapes sandwiching the device side terminals therebetween inward from both right and left sides. A distance S between the upper end position of the arm portion set (265 and 266) on the upper side and the lower end position of the arm portion set (285 and 286) on the lower side is configured to be substantially equivalent to the width of the power terminal provided in the 18 V battery pack in the related art. Meanwhile, the arm portion set (265 and 266) on the upper side and the arm portion set (285 and 286) on the lower side are disposed to be away from each other by a predetermined distance Si in the up-down direction. A cutout portion 291 significantly cut out from the front side is formed below the arm portion set (285 and 286) on the lower side. The rear side of the lower terminal component 280 is fixed side by side with the right side surface 263 and the left side surface 264 of the upper terminal component 260 in the front-rear direction with a predetermined clearance therebetween such that they do not come into contact with each other.

In FIG. 7(2), parts of leg portions 267 and 268 are illustrated by applying hatching thereto, such that the area thereof becomes clear. In this specification, the base body portion 261 indicates a part exposed to the upper side from the front surface of the circuit board 150 to be attached, that is, a part excluding the arm portions 265 and 266. The base body portion 261 of the upper terminal component 260 is constituted of the right side surface 263, the left side surface 264, and the bridge portion 262. The leg portions 267 and 268 are connected to parts below the lower side portion of the base body portion 261. The right side surface 263 and the left side surface 264 have a substantially rectangular shape extending in the vertical direction and are formed such that the arm portions 265 and 266 extend to the front side in a part close to the upper end. Parts near the rear bases of the arm portions 265 and 266, that is, near a chain line B2 have a significant width (length in the up-down direction). The width is gradually reduced as it goes forward, and the width becomes uniform on the front side further beyond an imaginary line B1. The fitting portions 265*d* and 266*d* are bent into a curved surface shape having a predetermined radius R1 of curvature on the inner side in a top view. In this manner, the arm portions 265 and 266 are formed to extend forward from the upper front side portion of the U-shaped base body portion, and the arm portions 265 and 266 are formed to have spring properties in a non-contact state.

The leg portions 267 and 268 are inserted into the attachment hole (penetration hole) of the circuit board 150. The leg portions 267 and 268 protrude from an attachment surface (front surface) of the circuit board 150 to a surface (rear surface) on a side opposite to the attachment surface, and the leg portions 267 and 268 are soldered to the circuit board 150 on the rear surface. In addition, through soldering, the arm portions 265 and 266 are electrically connected to the battery cells, the electronic element, and the like mounted on the circuit board 150. Here, the leg portions 267 and 268 are formed to have a height H1 greater than the thickness of the circuit board 150 to an extent smaller than twice thereof. In the lower part of the rear side of the right side surface 263 and the left side surface 264, as indicated by the arrow 262*a*, the bridge portion 262 protrudes such that it is curved to the rear side, and this protruding part is used for positioning in the up-down direction when the upper terminal component 260 and the lower terminal component 280 are attached to the circuit board 150. Parts extending in projected shapes in the horizontal direction are formed on the front side of the lower part of the right side surface 263 and the left side surface 264, thereby forming bent portions 263*a* (not shown in the diagram) and 264*a* realized by folding the projected parts inward. In order to facilitate folding, substantially circular cutout portions are formed in crooked portions on the upper side and the lower side of the bent portions 263*a* and 264*a*. The bent portions 263*a* and 264*a* and a stepped portion 262*a* are formed to come into contact with the upper surface in the vicinity of the attachment hole of the circuit board 150 for positioning of the upper terminal component 260 in the up-down direction.

The base body portion 261 has a substantially L-shape standing upside down in a side view. Flat surface portions 265*a* and 266*a* in which the right side surface 263 and the left side surface 264 extend forward from parts near connection portions on the rear side in a flush surface shape are formed in the rear parts of the arm portions 265 and 266. Fitting portions 265*d* and 266*d* that are bent to expand outward at a large radius R1 of curvature are formed in tip parts of the arm portions 265 and 266. When curved surface parts of the fitting portions 265*d* and 266*d* on the inner side come into contact with the terminals of the power tool main bodies 1 and 30, the upper terminal component 260 is electrically conducted with the connection terminals on the power tool main bodies 1 and 30 side. The inner sides of the fitting portions 265*d* and 266*d* have a shape in which the battery pack 100 has a slight clearance in a state of being detached from the power tool main bodies 1 and 30. The front sides of the fitting portions 265*d* and 266*d* are formed such that the gap suddenly increases toward the front, thereby guiding the terminals on the power tool main bodies 1 and 30 side.

The lower terminal component 280 has the right side surface 283 and the left side surface 284 that are formed by being folded into a U-shape to be parallel to each other, and the bridge portion 282 that connects those to each other. The lower terminal component 280 is provided such that the arm portions 285 and 286 extend forward and obliquely upward from slender upper portions of the right side surface 283 and the left side surface 284. The widths of the arm portions 285 and 286 in the up-down direction are substantially uniform in the front-rear direction. The arm portions 285 and 286 are formed to extend in the horizontal direction on the front side of the imaginary line B1 and are obliquely disposed on the rear side of the imaginary line B1. A cutout portion 291 significantly cut out from the front side is formed below the arm portion set (285 and 286) of the lower terminal component 280. As a result of such formation, the lengths (length in the front-rear direction, that is, the front side of B2) of the arm portions 265 and 266 of the upper terminal component 260 become longer than the lengths (length in the front-rear direction, that is, the front side of the position of the arrow 291) of the arm portions 285 and 286 of the lower terminal component 280. Even in such arm portion sets having different lengths in the front-rear direction, it is preferable that the fitting pressure in the fitting portion of the upper terminal component 260 be the same as the fitting pressure of the lower terminal component 280. If the fitting pressures are not equalized, contact resistance with respect to the flat plate-shaped device side terminal on the power tool main bodies 1 and 30 side changes, so that there is a possibility that a slight difference in heat generation may be generated or the wear situation may vary due to usage for a long period of time. In the present modification example, in order to balance the fitting pressure by the upper terminal component 260 and the lower terminal component 280, the gap of the initial clearance in a non-mounting state of the battery pack is varied. That is, in a state where the battery pack 100 is not mounted in the power tool main body 1 or 30 (detached state), the smallest gap between the right and left arm portions 265 and 266 differs from the gap between the arm portions 285 and 286. Here, the gap between the arm portions 265 and 266 of the upper terminal component 260 is set to 0.2 mm. In contrast, the smallest gap between the arm portions 285 and 286 of the lower terminal component 280 is set to 0.5 mm.

In order to achieve a uniform fitting pressure, the shapes of the upper terminal component 260 and the lower terminal component 280 have also been devised. That is, as illustrated in FIG. 7(2), originally in the upper terminal component 260, a substantially right-angled inner angle as indicated by the dotted line 264b should be formed. Here, the contour of the dotted line 264b is extended in the direction of the arrow 264e to realize a shape in which a reinforcement surface 264c having an isosceles triangular shape in a side view is added. As a result, the contour of this inner angle part becomes oblique as indicated by the arrow 264d, and the attachment rigidity of the arm portions 265 and 266 of the upper terminal component is improved due to this shape change. In accordance with the shape change of the inner angle part of the upper terminal component 260, the shape of the outer angle part of the lower terminal component 280 is cut off in the direction of the arrow 284e from a part of the dotted line 284b to obtain a shape in which a cut-off portion 284c having an isosceles triangular shape in a side view is provided. As a result, the contour of this outer angle part becomes as indicated by the arrow 284d, and the rigidity of the arm portions 285 and 286 of the lower terminal component is deteriorated. In the contour part indicated by the arrow 264d and the arrow 284d, the contours are determined such that they are substantially parallel to each other in a side view and are apart from each other with a uniform gap therebetween. When the cut-off portion 284c is formed, the length of the bridge portion 282 in the up-down direction becomes short. However, since the lower terminal component 280 is small, the lower terminal component 280 has a sufficient strength compared to the upper terminal component 260. Therefore, the strength can be suitably balanced due to these shape changes. In this manner, in the upper terminal component 260, the shape of the inner angle part is changed by adding the reinforcement surface 264c. In the lower terminal component 280, the shape of the outer angle part is changed through strength adjustment by forming the cut-off portion 284c. Accordingly, the strength of both can be balanced, and the fitting pressures to the main body side terminals by the arm portions 265 and 266, and 285 and 286 can be substantially equivalent to each other.

FIG. 7(3) is a view of the upper terminal component 260 and the lower terminal component 280 viewed from the front. In a state when the battery pack 100 is not mounted, the smallest gap differs between the arm portion sets on the upper and lower sides. That is, the gap between the arm portions 285 and 286 on the lower side in the right-left direction is configured to be larger than the gap between the arm portions 265 and 266 on the upper side in the right-left direction. This has a relationship in which the lengths thereof are inversely proportional to the lengths of the arm portions 265 and 266 and the arm portions 285 and 286 in the mounting direction (front-rear direction) disposed vertically side by side. The long arm portions 265 and 266 face each other with a narrow gap therebetween in an initial state. On the contrary, the short arm portions 285 and 286 face each other with a wide gap therebetween.

As described above, as the power terminals, the upper terminal component 260 and the lower terminal component 280 having a plate thickness of 0.8 mm which is thick are used. Since only a very small current flows in the signal terminal component, similar to the battery pack 15 in the related art, they may be manufactured using a metal plate having a thickness of approximately 0.3 mm. In the present modification example, the rigidity of the power terminals in which a large current flow can be further improved, and the fitting situation can be favorably maintained not only during working but also over a long period of using time. In order to achieve substantially the same fitting pressures of the arm portion sets on the upper and lower sides, without being limited to only adjustment of the clearance of the fitting portions and change in shape near the attachment base, it can also be achieved by other changes, particularly, attachment of the plate thickness, selection of materials for the terminal components, and the like.

Next, the shape of the terminal portion 20 on the power tool main bodies 1 and 30 side and a connection state of the battery pack 100 and the connection terminals when the battery pack 100 is mounted in the power tool main bodies 1 and 30 will be described using FIG. 8. FIG. 8(1) is a view illustrating a state where the battery pack 100 is mounted in the 36 V power tool main body 30. As described above, ten battery cells are accommodated inside the battery pack 100. Five battery cells constitute the upper cell unit 146, and the remaining five battery cells constitute the lower cell unit 147. In the power tool main body 30, a drive portion 35 is operated when the upper positive electrode terminal 162 and the upper negative electrode terminal 167 are fitted. The drive portion 35 is a load device to which power is supplied from the battery pack 100. Here, a motor 5 (which will be described below with reference to FIG. 12) is provided. At this time, a short bar provided in the power tool main body 30 forms an electrical connection circuit indicated by the dotted line 59. Therefore, the upper cell unit 146 and the lower cell unit 147 are in a series-connection state. That is, the negative electrode of the upper cell unit 146 is connected to the positive electrode of the lower cell unit 147. The positive electrode of the upper cell unit 146 is connected as a positive electrode output of the battery pack 100, and the negative electrode of the lower cell unit 147 is connected as a negative electrode output. In this manner, a series-connection output of the upper cell unit 146 and the lower cell unit 147, that is, a rated voltage of 36 V is output.

FIG. 8(2) is a view illustrating a state where the battery pack 100 is mounted in the 18 V power tool main body 1. In the 18 V power tool main body 1, a positive electrode input terminal (which will be described below with reference to FIG. 10) having a size to the extent that it is fitted with the upper positive electrode terminal 162 and the lower positive electrode terminal 172 at the same time is provided. In a similar manner, a negative electrode input terminal (which will be described below with reference to FIG. 10) having a size to the extent that it is fitted with the upper negative electrode terminal 167 and the lower negative electrode terminal 177 at the same time is provided. That is, a parallel-connection state having a positive electrode output in a state where the positive electrodes of the upper cell unit 146 and the lower cell unit 147 are connected to each other and a negative electrode output in a state where the negative electrodes of the upper cell unit 146 and the lower cell unit 147 are connected to each other is realized. As a result, when the power tool main body 1 is connected, a rated voltage of 18 V is output automatically. In this manner, when the connection relationship with the switching terminal group (162, 167, 172, and 174) that switches the voltage of the battery pack 100 is changed, it is possible to switch an output voltage that can be obtained from the battery pack 100.

FIG. 9(1) is a perspective view of a terminal portion 50 of the power tool main body 30 of the present example, FIG. 9(2) is a perspective view of a single body of a short bar 59, and FIG. 9(3) is a view illustrating a method of connecting the terminal portion 50 and the power terminals of the battery pack 100. In the terminal portion 50 of the rated 36 V power tool main body 30, as a power input terminal, a terminal portion 52a of a positive electrode input terminal 52 and a terminal portion 57a of a negative electrode input terminal 57 for receiving power are formed to have a small size and are provided on the upper side. At the time of mounting, the terminal portion 52a of the positive electrode input terminal 52 is fitted to only the upper positive electrode terminal 162, and the terminal portion 57a of the negative electrode input terminal 57 is fitted to only the upper negative electrode terminal 167. Meanwhile, the short bars 59 (59a to 59c) for short-circuiting the lower positive electrode terminal 172 and the lower negative electrode terminal 177 are provided in the terminal portion of the power tool main body 30. As illustrated in FIG. 9(2), the short bar 59 is a short circuit element constituted of a metal conductive member and is a member bent into a " ⊐ " shape. A terminal portion 59b is formed on one end side of a connection portion 59a of the short bar 59 and is disposed on the lower side of the terminal portion 52a. A terminal portion 59c is formed on the other end side of the connection portion 59a of the short bar 59, and the terminal portion 59c is disposed on the lower side of the terminal portion 57a. The terminal portion 59b is fitted into the lower positive electrode terminal 172, and the terminal portion 59c is fitted into the lower negative electrode terminal 177. The short bar 59 is fixed such that it is cast in a synthetic resin base 51 (which will be described below with reference to FIG. 7) together with a different device side terminal such as the positive electrode input terminal 52 or the negative electrode input terminal 57. At this time, the short bar 59 does not come into contact with other metal terminals (52, 54 to 58). In addition, since the short bar 59 is used for only causing the lower positive electrode terminal 172 and the lower negative electrode terminal 177 to be short-circuited, there is no need for the short bar 59 to be wired to the control circuit or the like of the power tool main body.

The positive electrode input terminal 52 is formed to have a terminal portion 52a that is a part fitted into the upper positive electrode terminal 162 and formed to have a flat plate shape, a wiring portion 52c for soldering a lead wire performing wire connection with respect to the circuit board side on the power tool main body 30 side, and a coupling portion (not shown in the diagram) that connects the terminal portion 52a and the wiring portion 52c to each other and constitutes a part cast in the synthetic resin base 51. The negative electrode input terminal 57 is similar to the positive electrode input terminal 52 as well. The height of the terminal portion 57a is approximately half compared to other terminal portions (54a to 56a and 58a) or to the extent of a size smaller than the half. Other terminal portions (54a to 56a and 58a) are terminals for transmitting a signal (for outputting a signal) and is connected to a control circuit board on the power tool main body 30 side through a lead wire (not illustrated) via wiring portions 54c to 56c and 58c. Recessed portions 51b and 51c to be pinched by the housing are provided on the front side and the rear side on the synthetic resin base 51 of the terminal portion 50.

In FIG. 9(3), when the battery pack 100 is mounted, if the battery pack 100 is relatively moved in the insertion direction with respect to the power tool main body 30, the positive electrode input terminal 52 and the terminal portion 59b are inserted thereinto through the same slot 122 (refer to FIG. 3) and are fitted into the upper positive electrode terminal 162 and the lower positive electrode terminal 172, respectively. At this time, the positive electrode input terminal 52 is press-fitted between the arm portions 162a and 162b of the upper positive electrode terminal 162 such that a space between the fitting portions of the upper positive electrode terminal 162 is widened, and the terminal portion 59b of the short bar 59 is press-fitted such that a space between the arm portions 172a and 172b of the lower positive electrode terminal 172 is widened. Similarly, the negative electrode input terminal 57 and the terminal portion 59c are inserted thereinto through the same slot 127 (refer to FIG. 3) and are fitted into the upper negative electrode terminal 167 and the lower negative electrode terminal 177. At this time, the terminal portion 57a of the negative electrode input terminal 57 is press-fitted between the arm portions 167a and 167b of the upper negative electrode terminal 167 such that a space between the fitting portions is widened. Moreover, the terminal portion 59c of the short bar 59 is press-fitted such that a space between arm portions 177a and 177b of the lower negative electrode terminal 177 is widened.

The plate thicknesses of the terminal portions 52a, 57a, 59b, and 59c are slightly greater than an initial clearance (clearance when the battery pack 100 is not mounted) of the fitting portion of each arm portion. Therefore, a predetermined fitting pressure acts on a fitting point of each of the terminal portions 52a, 57a, 59b, and 59c with respect to the upper positive electrode terminal 162, the lower positive electrode terminal 172, the upper negative electrode terminal 167, and the lower negative electrode terminal 177. As a result of such connection, the device side terminals (terminal portions 52a, 57a, 59b, and 59c) of the power tool main body 30 and the power terminals (upper positive electrode terminal 162, lower positive electrode terminal 172, upper negative electrode terminal 167, and lower negative electrode terminal 177) of the battery packs favorably come into contact with each other in a state where electrical contact resistance is reduced. In this manner, the power tool main body 30 has the third terminal (52a) that is inserted into the single slot (122) and is connected to only the first terminal (162) of the first and second terminals (162 and 172), and the fourth terminal (59b) that is inserted into the single slot (122) and is connected to only the second terminal (172). When the battery pack 100 is connected to the power tool main body 30, the first and third terminals (162 and 52a) are connected to each other inside the single slot 121 and become a first potential, and the second and fourth terminals (172 and 59b) are connected to each other and become a second potential different from the first potential. Similarly, since the pair of negative electrode terminals (167 and 177) side is also in a connection state, the connection form in FIG. 9(3) is realized, so that an output of series-connection of the upper cell unit 146 and the lower cell unit 147, that is, a rated voltage of 36 V is output from the battery pack 100.

Meanwhile, when the battery pack 100 is mounted in the 18 V power tool main body 1 in the related art, a connection relationship is established as in FIG. 10. When the battery pack 100 is attached to the power tool main body 1, the terminal portion 22a of the positive electrode input terminal 22 is press-fitted such that both opening end portions of the upper positive electrode terminal 162 and the lower positive electrode terminal 172 are widened. Then, a region of a part of the terminal portion 22a of the positive electrode input terminal 22 on the upper side comes into contact with the upper positive electrode terminal 162, and a region of a part thereof on the lower side comes into contact with the lower positive electrode terminal 172. In this manner, two positive electrode terminals (162 and 172) are in a short-circuited state by causing the terminal portion 22a to be fitted into the arm portions 162a and 162b of the upper positive electrode terminal 162 and the arm portions 172a and 172b of the lower positive electrode terminal 172 at the same time. In a similar manner, a terminal portion 27a of the negative electrode input terminal 27 press-fitted such that both opening end portions of the upper negative electrode terminal 167 and the lower negative electrode terminal 177 are widened. Then, a region of a part of the terminal portion 27a of the negative electrode input terminal 27 on the upper side comes into contact with the upper negative electrode terminal 167, and a region of a part thereof on the lower side comes into contact with the lower negative electrode terminal 177. In this manner, two negative electrode terminals (167 and 177) are in short-circuited state by causing the terminal portion 27a to be fitted into the arm portions 167a and 167b of the upper negative electrode terminal 167 and the arm portions 177a and 177b of the lower negative electrode terminal 177 at the same time, and an output of parallel-connection of the upper cell unit 146 and the lower cell unit 147, that is, a rated voltage of 18 V is output to the power tool main body 1. The terminal portion 22a of the positive electrode input terminal 22 and the terminal portion 27a of the negative electrode input terminal 27 are formed of a metal plate having a uniform thickness. Therefore, it is important that a fitting pressure due to the arm portions of the upper positive electrode terminal 162 and the upper negative electrode terminal 167, and a fitting pressure due to the arm portions of the lower positive electrode terminal 172 and the lower negative electrode terminal 177 be equivalent to each other.

As described above, in the battery pack 100 of the present example, since the output of the battery pack 100 is automatically switched when the battery pack 100 is mounted in either the 18 V power tool main body 1 or the 36 V power tool main body 30, a convenient battery pack 100 supporting a plurality of voltages can be realized. This voltage switching is not performed on the battery pack 100 side but is automatically performed depending on the shape of the terminal portion on the power tool main bodies 1 and 30 side. Therefore, there is no possibility of occurrence of erroneous voltage setting. In addition, since there is no need to provide a dedicated voltage switching mechanism such as a mechanical switch on the battery pack 100 side, it is possible to realize a long-life battery pack with a simple structure and less possibility of malfunction. Since the short bar 59 causing the lower positive electrode terminal 172 and the lower negative electrode terminal 177 to be short-circuited can be mounted within the same space as the existing terminal portion 20 of the 18 V battery pack, it is possible to realize a voltage switchable battery pack having a compatible size with those in the related art. Moreover, when charging is performed using an external charging device, charging can be performed by the connecting method as in FIG. 10(2). Therefore, there is no need to prepare a charging device that performs charging of both a high voltage and a low voltage.

When the battery pack 100 is charged using an external charging device (not illustrated), charging can be performed using the same charging device as that for the 18 V battery pack in the related art. In such a case, the terminal of the charging device has the shape equivalent to that in FIG. 10(1). However, instead of the discharging positive electrode terminals (162 and 172), the charging positive electrode terminal (upper positive electrode terminal 161 and lower positive electrode terminal 171) are connected to the positive electrode terminals of the charging device (not illustrated). At this time, the connection situation is also substantially equivalent to the connection relationship illustrated in FIG. 10(2). In this manner, charging is performed using an 18 V charging device in a state where the upper cell unit 146 and the lower cell unit 147 are connected in parallel. Therefore, in a case of charging the battery pack 100 of the present example, there is an advantage that a new charging device does not have to be prepared.

Next, the shape of components used for three terminals (164 to 166), that is, a signal terminal component 240 will be described using FIG. 11. The signal terminal component 240 is manufactured by pressing one metal plate. From a base body portion 241 realized by bending a thin metal plate such that a bridge portion 242 constituting a U-shaped bottom part becomes a vertical surface on the rear side, the arm portion set (arm portion base portions 245 and 246) extends to the front side. The arm portion base portion 245 is formed to apart as an arm portion sets on the upper and lower sides (arm portions 251 and 253), and since a cutout groove 246b extending in the horizontal direction is formed, the arm portion base portion 246 is formed to apart as an arm portion sets on the upper and lower sides (252 and 254). A metal plate used in pressing is a flat plate having a thickness of 0.3 mm and it may be thinner than the plate thickness of 0.5 mm of the upper terminal component 260 and the lower terminal component 280 used for the power terminals. The arm portion sets on the upper side and the lower side are formed to have the same shape as each other, and the length in the front-rear direction, the width in the up-down direction, the plate thickness, and the like are the same as each other. The fitting portions (251d, 253d, and the like) are formed in each of the arm portion set (arm portions 251 and 252) on the upper side and the arm portion set (arm portions 253 and 254) on the lower side. However, the upper and lower shapes curved for the fitting portions are also the same as each other, and the right and left arm portions have plane-symmetrical shapes. Meanwhile, attachment positions of leg portions 249 and 250 are disposed to significantly deviate in the front-rear direction. The shape of the lower part of the base body portion 241 is different on the right and left, so that a right side surface 243 and a left side surface 244 have asymmetrical shapes. The leg portion 249 is disposed to significantly deviate forward compared to a position of a leg portion 250 in the related art, and the leg portions 249 and 250 are significantly distanced away from each other in the front-rear direction. In this manner, since the leg portion 249 and the leg portion 250 are disposed to deviate forward and rearward instead of being side by side adjacent to each other in the right-left direction, an extension portion 243a significantly extending forward is formed near a lower side of the right side surface 243, and the leg portion 249 is formed to extend in the downward direction from a front end part. Each of the leg portion 249 and the leg portion 250 is fixed to the circuit board 150 by penetrating the penetration hole (not illustrated) formed in the circuit board 150 from the front surface to the rear surface side and soldering the part protruding to the rear surface side, and the arm portion set (arm portions 251 and 252) on the upper side and the arm portion set (arm portions 253 and 254) on the lower side are electrically connected to the electronic element mounted in the circuit board 150.

A bent portion 243b that limits the insertion amount of the circuit board 150 in the attachment hole 151 (refer to FIG. 4) and is folded in the left direction is formed above the leg portion 249. Cutout portions 243c and 249a that are cut out into semicircular shapes in order to facilitate folding are formed on the upper side and the lower side of bent parts of the bent portion 243b. Stepped portions 250a and 250b formed on the front side and the rear side of the leg portion 250 are used for positioning of the leg portion 250 on the rear side with respect to the circuit board 150. The stepped portion 250a is formed by causing the lower part of the left side surface 244 to extend forward, and the stepped portion 250b is formed by utilizing the lower side portion of the bridge portion 242 curving in a U-shape. In this manner, when the stepped portions 250a and 250b abut the front surface of the circuit board 150, the attachment position of the leg portion 250 in the up-down direction can be determined. The attachment positions of the leg portions 249 and 250 in the front-rear direction are regulated by the position of the attachment hole 151 (refer to FIG. 4) in the circuit board 150.

FIG. 11(2) is a view of a single body of the signal terminal component 240 viewed from the front lower side. As it can be seen from this diagram, since a cutout groove 245b extending in the horizontal direction is formed on the front side of the arm portion base portion 245, the arm portion set is separated as the upper and lower arm portions (arm portions 251 and 253). In addition, the leg portion 249 on the right side is disposed to significantly deviate forward compared to the leg portion 250 on the left side. As a result, even if a force is applied to four arm portions 251, 252, 253, and 254 in the upward direction or the downward direction, the signal terminal component 240 can be firmly held in the circuit board. An external force applied to the arm portions 251, 252, 253, and 254 is applied such that the arm portion set is pushed to the rear side when the battery pack 100 is mounted in the power tool main bodies 1 and 30, and this force acts in a direction of tilting the signal terminal component 240 rearward. On the contrary, when the battery pack 100 is detached from the power tool main bodies 1 and 30, it becomes a force pushing the arm portion set to the front side, and this force acts in a direction tilting the signal terminal component 240 forward. In this manner, an external force that is applied when the battery pack 100 is mounted and detached can be effectively received by causing the positions of the leg portions 249 and 250 to deviate in the front-rear direction, and the attachment rigidity of the signal terminal component 240 can be strengthened drastically, so that durability of the battery pack 100 can be enhanced. Moreover, the arm portion set is also formed apart in two stages on the upper side and the lower side. Therefore, even if various vibrations are received or an external force is received during an operation of the power tool, a favorable contact state with respect to the terminals on the power tool main body side can be maintained due to four contact regions of the arm portions. Here, "a contact region" indicates a region with which the arm portions 251, 252, 253, and 254 of the signal terminal component 240 and the input terminals (for example, the positive electrode input terminal 52 and the negative electrode input terminal 57) come into contact when the battery pack 100 is mount in the power tool main body. Meanwhile, since the number of attachment holes and the number of soldering places in the circuit board 150 required when this signal terminal component 240 is manufactured are the same as those in the related art, increase in manufacturing cost can be suppressed.

The signal terminal component 240 of the present example exhibits another effect in addition to improvement in rigidity. In the signal terminal component in the related art (not illustrated), leg portions to be soldered to the circuit board and to be electrically and mechanically attached are provided at two places. However, the leg portions are arranged in the right-left direction, and there are many cases where the space between the leg portions is small and solder parts are connected to each other, so that it is not possible to perform wiring in which a signal pattern passes through a space between the right and left leg portions. In the battery pack 100 of the present example, one leg portion 249 of the signal terminal component 240 is disposed on the front side and the other leg portion 250 is disposed on the rear side, such that both the leg portions are disposed apart from each other. Accordingly, the distance between the leg portions of the signal terminal component 240 increases, so that it is possible to easily lay a plurality of wirings or to perform wiring of thick pattern in which a main current flows. Such a signal terminal component 240 is preferable when it is desired to achieve a high function in the battery pack 100 of the present example, that is, the battery pack in the related art and to promote miniaturization in voltage ratio. Particularly, when a voltage switching function is realized after the voltage is raised, the number of electronic elements to be mounted in the circuit board 150 increases. Here, there is a need to achieve efficient pattern wiring and to thicken the wiring in which the main current flows. In the present example, the circuit board 150 larger than that used in the related art is used, so that the electronic elements are mounted not only on the rear side of the connection terminal group but also in the front region.

FIG. 12 is a circuit diagram illustrating a state where the battery pack 100 of the present example is connected to the power tool main body 1 in the related art. The power tool main body 1 in the related art is configured to include the positive electrode input terminal 22, the negative electrode input terminal 27, and the LD terminal 28 on the device side. The trigger switch 4 and a DC motor 5 are connected to places between the positive electrode input terminal 22 and the negative electrode input terminal 27. A switching element M101 constituted of a semiconductor is provided between the motor 5 and the negative electrode input terminal 27. A drain-to-source of the switching element M101 is connected to a power supply path of the motor 5, and a gate is connected to the positive electrode input terminal 22 via a resistor R101. In addition, the gate of the switching element M101 is connected to the LD terminal 28 via a resistor R102. In general, the LD terminal 28 on the battery pack 100 side is in a high impedance state. At this time, a positive voltage is applied to the gate of the switching element M101 via the resistor R101, and the switching element M101 is thus in the conducting state. At this time, if the LD terminal 168 drops to a ground potential due to a discharging prohibition signal 341 from the battery pack 100 side, the potential of the gate of the switching element M101 becomes a voltage realized by dividing the voltage of the positive electrode input terminal 22 using the resistors R101 and R102, and this partial potential becomes a potential for blocking a source-to-drain of the switching element M101. As a result, the power supply path to the motor 5 is blocked, and therefore rotation of the motor 5 stops. The potential of this LD terminal 168 is switched in accordance with control of a control unit 350 on the battery pack 100 side, and switching is executed when in a state where the voltage of the battery cell has dropped to a predetermined value, that is, a so-called over-discharge state, when the current flowing in the battery cell exceeds the regulated upper limit value, when the temperature of the battery cell exceeds the upper limit value, and the like.

As illustrated in FIG. 4, the battery pack 100 is configured to have an upper positive electrode terminal (upper positive) 162, a lower positive electrode terminal (lower positive) 172, an upper negative electrode terminal (upper negative) 167, and a lower negative electrode terminal (lower negative) 177. In addition, the battery pack 100 has the LD terminal 168 as a signal terminal. In addition to those, other signal terminal groups (T terminal 164, V terminal 165, and LS terminal 166) are provided in the battery pack 100. However, illustration thereof is omitted herein. The output of the upper cell unit 146 is connected to the upper positive electrode terminal 162 and the lower negative electrode terminal 177. That is, the positive electrode (positive output) of the upper cell unit 146 is connected to the upper positive electrode terminal 162, and the negative electrode (negative output) of the upper cell unit 146 is connected to the lower negative electrode terminal 177. In a similar manner, the positive electrode (positive output) of the lower cell unit 147 is connected to the lower positive electrode terminal 172, and the negative electrode (negative output) of the lower cell unit 147 is connected to the upper negative electrode terminal 167.

In each of the upper cell unit 146 and the lower cell unit 147, five lithium ion battery cells are connected in series. A protection IC 300 is connected to the upper cell unit 146. When both end voltages of each of the battery cells in the upper cell unit 146 are input to the protection IC 300, the protection IC 300 executes a cell balancing function, a cascade connecting function, and a disconnection detecting function, in addition to an over-charging protecting function and an over-discharging protecting function. The protection IC 300 is a commercially available integrated circuit serving as "a lithium ion battery protection IC". The protection IC 300 has a built-in power source circuit for obtaining power to operate the protection IC from the voltage of the upper cell unit 146. In addition, when the voltages of the battery cells in the upper cell unit 146 drop to be smaller than a predetermined value and are thus in an over-discharged state, a signal (high signal) 305 indicating over-discharge of the protection IC 300 is output to the control unit 350. When the voltages of the battery cells in the upper cell unit 146 have reached a predetermined value or larger at the time of charging and are thus in an over-charged state, a signal (high signal) 306 indicating over-charge is output to the control unit 350.

The protection IC 320 is connected to the lower cell unit 147. Here, the control unit 350 is further provided in the circuit of the lower cell unit 147, that is, in the circuit between the lower positive electrode terminal 172 and the upper negative electrode terminal 167. That is, the protection circuit provided in parallel with the upper cell unit 146 is constituted of only the protection IC 300. In contrast, the protection circuit provided in parallel with the lower cell unit 147 is constituted of the protection IC 320 and the control unit 350. The control unit 350 includes a microcontroller unit (MCU, a so-called "microcomputer"). Outputs (over-discharge signal 305 and overcharge signal 306) from the protection IC 300, outputs (over-discharge signal 325 and overcharge signal 326) from the protection IC 320, and a signal from a cell temperature detection means 331 are input to the control unit 350. For example, the microcomputer of the control unit 350 includes a voltage detection circuit referred to as an analog front end (AFE) measuring a value of a current flowing from an output voltage of a current detection circuit 327 to the lower cell unit 147. Driving power of the control unit 350 is generated by a power source circuit 321 connected to the lower cell unit 147, and a drive power source (VDD1) is supplied to the control unit 350.

A shunt resistor 329 is provided on the ground side of the lower cell unit 147, but no shunt resistor is provided on the upper cell unit 146 side. This is because a current value can be measured using only the shunt resistor 329 when the upper cell unit 146 and the lower cell unit 147 are connected in series. Meanwhile, when the upper cell unit 146 and the lower cell unit 147 are connected in parallel, an actual measurement current value on the upper cell unit 146 side cannot be measured. However, the control unit 350 may perform monitoring such that a current value of the upper cell unit 146 is equivalent to the lower cell unit 147. A shunt resistor and a voltage detection circuit may be configured to be provided on the ground side of the upper cell unit 146, such that a current value on the lower cell unit 147 side is also directly monitored by the microcomputer of the control unit 350.

The control unit 350 monitors a current value and a cell temperature and monitors states of the upper cell unit 146 and the lower cell unit 147, thereby integrally controlling both operation situations. For example, when the temperatures of the cell units 146 and 147 are monitored, if a difference between the temperatures is equal to or larger than the threshold value, the control unit 350 may determine that a contact failure of the connection terminals has occurred and may perform control to stop charging/discharging. In addition, when the power tool main body 1 needs an emergency stop, the discharging prohibition signal 341 is emitted and the potential of the LD terminal 168 is changed, so that the operation on the power tool main body 1 side is stopped via the LD terminal 28. The most important matter in monitoring these using the control unit 350 is the amperage flowing in the battery cells included in the upper cell unit 146 and the lower cell unit 147. In recent power tools, it has become possible to extract a large current from the battery pack 100 as the performance of battery cells is improved and the capacity is increased. However, from the viewpoint of the life-span and heat generation, it is preferable that battery cells be limited to a predetermined amperage (current upper limit value or smaller). Therefore, in order to particularly monitor the currents flowing in the battery cells, the control unit 350 monitors the current value using the shunt resistor 329 and the current detection circuit 327 interposed in the middle of a power supply line of the lower cell unit 147.

Monitoring of current values is useful to detect a contact failure of the connection terminals (161, 167, 171, and 177) at the time of charging. When the battery pack 100 is connected to an external charging device (not illustrated) and constant current charging control is performed, the charging current flowing in the upper cell unit 146 and the lower cell unit 147 becomes a predetermined current value. For example, when a charging current of 12 A flows due to the charging device, a charging current of 6 A flows ideally in each of the upper cell unit 146 and the lower cell unit 147. However, when a contact failure has occurred between any of the connection terminals (161, 167, 171, and 177) and the device side terminals on the charging device side, a current flowing in the cell unit connected to the connection terminal in which the contact failure has occurred is zero or significantly drops, and the total current of 12 A flows on the remaining cell unit side. Here, the microcomputer determines whether or not the detection value of the current detection circuit 327 is within a range of a normal current. When the detection value is extremely small (for example, near 0 A) or extremely large (for example, 10 A or larger), the microcomputer configured to determine that an abnormality has occurred in any part of connection of the plurality of cell units and to stop charging of the charging device. As described above, when charging of the battery pack 100 is performed using the external charging device, the control unit 350 determines whether an abnormality has occurred in connection of the plurality of cell units due to a charging current, and when the control unit 350 determines that an abnormality has occurred, a charging stoppage signal is transmitted (output) to the external charging device via the LS terminal 166.

Regarding a management protection circuit of the lower cell unit 147 constituted of the protection IC 320, the control unit 350, the power source circuit 321, the current detection circuit 327, and the like, a circuit configured to be integrated in one chip as "a battery management IC" may be used. Meanwhile, regarding the protection IC 300 for the upper cell unit 146, the same protection IC widely used in the battery pack 15 in the related art (refer to FIG. 1) can be used, such as a protection IC commercially available as "a battery protection IC" for five cells. The operation of the protection IC 320 is substantially similar to that of the protection IC 300. When a state where the voltages of the battery cells in the lower cell unit 147 have dropped to a predetermined lower limit value (over-discharged state) is detected, the over-discharge signal 325 is sent out to the control unit 350. In addition, while the battery pack 100 is mounted in an external charging device (not illustrated) and charging is performed, when the protection IC 320 detects that the voltages of the battery cells have exceeded a predetermined upper limit value, the overcharge signal 326 indicating an over-charged state is sent out to the control unit 350. The control unit 350 sends out a charging stoppage signal to the charging device (not illustrated) via the LS terminal 166 (refer to FIG. 4). As described above, since a battery cell protection circuit is mounted in each of the upper cell unit 146 and the lower cell unit 147, a cell balancing function through detailed battery monitoring can be realized.

In the present example, the protection circuit of the upper cell unit 146 includes only the protection IC 300 and includes no microcomputer. In contrast, in addition to the protection IC 300, the control unit 350 including a microcomputer is provided in the protection circuit of the lower cell unit 147. Furthermore, the power source circuit 321 generates power for operating the control unit 350 using electric power of the lower cell unit 147. Since the battery pack 100 of the present example is an 18 V/36 V voltage switchable type, if a microcomputer is mounted on the protection circuit on the upper cell unit 146 side, the ground potential of the control unit 350 changes at the time of series-connection and at the time of parallel-connection of two cell units. Meanwhile, if the power source circuit 321 is provided on the lower stage side, the ground potential of the power source circuit 321 does not change. Here, in the present example, the control unit 350 having a microcomputer mounted therein is provided in the circuit of the lower cell unit 147 instead of the circuit of the upper cell unit 146. Due to this disposition of a microcomputer, the control unit 350 including a microcomputer can be stably operated with an output voltage of a rated 18 V/36 V switchable type.

When the control unit 350 including a microcomputer is provided in only the circuit on one cell unit side, a problem of imbalance in power consumption between two cell units occurs. Although power consumption of the control unit 350 is extremely small, power consumption on the lower cell unit 147 side is greater than power consumption on the upper cell unit 146 side. If an imbalance state of power consumption continues for a long time, the potential on the lower cell unit 147 side becomes lower than the upper cell unit, which is not preferable. Particularly, the reason is that when the upper cell unit 146 and the lower cell unit 147 are connected in parallel and a rated voltage of 18 V is output, a circulation current flows due to voltage imbalance between the cell units immediately after the parallel-connection state. Therefore, in the present example, a current consumption control means 310 having a function of adjusting the consumption current amount with respect to the lower cell unit 147 is provided in the circuit of the upper cell unit 146 having less power consumption. The current consumption control means 310 is interposed on one side of two cell units having less power consumption, that is, in parallel with the upper cell unit 146. The current consumption control means 310 is mounted in the circuit board 150 (refer to FIG. 4) as a load circuit separate from the integrated protection IC 300. The current consumption control means 310 is an example of "a consumption current control unit" in the present disclosure.

The current consumption control means 310 is controlled to be operated in conjunction with operation of the control unit 350. The microcomputer included in the control unit 350 can switch between retention and cancellation of the power source voltage (reference voltage VDD1) applied to itself and has an ordinary operation state (normal mode) and an operation stoppage state (so-called sleep state). While the microcomputer of the control unit 350 retains the reference voltage VDD1, the protection IC 300 is also in an operation state by switching the state of a ground line 301 utilized as a control signal. In the present example, the circuit of the current consumption control means 310 has been devised. The current consumption control means 310 is configured to allow a current for adjusting power consumption to flow therein in conjunction with a state where the microcomputer of the control unit 350 is holding the reference voltage VDD1. Moreover, the current consumption control means 310 switches the state of the ground line 301. As a result, when the control unit 350 starts up, the protection IC 300 also starts up at the same time in conjunction therewith. Since the power source circuit 321 of the control unit 350 is a common circuit also serving as the protection IC 320, when the microcomputer starts up, the protection IC 320 also starts up at the same time. Due to the current consumption control means 310, the consumption currents consumed by a cell set (lower cell unit 147) to which the control unit 350 is connected and the other cell set (upper cell unit 146) become the same as each other.

The current consumption control means 310 is an electric circuit configured to include a plurality of switching elements M31 to M33 such as FETs, and a plurality of resistors (resistors R31 to R35). Regarding a basic circuit configuration, the resistors R31 and R34 constituting two dummy loads in series-connection are connected to a part between both terminals of the cell unit 146, and the circuit is switched between ON and OFF by the switching element M32. A source terminal of the switching element M32 is connected to the positive electrode of the upper cell unit 146, and a drain terminal is connected to the resistor R31. A gate terminal of the switching element M32 is connected to a connection point between the resistors R32 and R35. One end of the resistor R32 is connected to the source terminal of the switching element M32, and the other end is connected to the gate terminal. One end of the resistor R35 is connected to the gate terminal of the switching element M32, and the other end is connected to the drain terminal of the switching element M33. The switching element M33 inputs the power source voltage (VDD1) of the microcomputer included in the control unit 350 to a gate signal and performs switching between ON and OFF in conjunction with the power source voltage VDD1. The source terminal of the switching element M33 is subjected to grounding, and the resistor R33 is connected to a part between the source terminal and the gate terminal. The resistor R33 is provided such that the switching element M33 is stably switched in accordance with a voltage change of the gate signal. Regarding such a current consumption control means 310, when the power source voltage VDD1 of the microcomputer is OFF, the gate potential of the switching element M33 is 0 V. The same signal as the gate signal of the switching element M33 is also input to the protection IC 320. Consequently, the switching element M33 is in an OFF state. When the switching element M33 is in the OFF state, the switching element M32 is also in the OFF state. Accordingly, current paths to the dummy load side by the resistors R31 and R34 are blocked, so that power consumption by the current consumption control means 310 is zero. In order to cause the protection IC 300 to be also OFF at the time of this state, the switching element M31 that inputs the potential at the connection point between the resistors R31 and R32 as a gate signal (operation signal 302) is further provided. The drain terminal of the switching element M31 is connected to the ground line 301 of a built-in power source (not illustrated) of the protection IC 300, and the source terminal is connected to the negative electrode of the upper cell unit 146. The operation signal 302 is a signal indicating an operation state of the current consumption control means 310 and indicates that the current consumption control means 310 is in an operation state at the time of a low level, that is, the microcomputer of the control unit 350 is also operated. Meanwhile, when the current consumption control means 310 is not in an operation state, that is, when the microcomputer of the control unit 350 is stopped, the operation signal 302 becomes low and the ground line 301 is in a high impedance state, so that the protection IC 300 is stopped.

The negative potential (reference potential A) of the upper cell unit 146 becomes the ground potential at the time of parallel-connection of the upper cell unit 146 and the lower cell unit 147 but is equivalent to the positive potential of the lower cell unit 147 at the time of series-connection. In this connection state, the potential of the upper cell unit 146 is not applied to the resistor R31 because the switching element M31 is OFF, so that the ground line 301 is not connected and is in a high impedance state. Meanwhile, when the switching element M32 is ON and a current flows in the dummy load, partial voltages of the resistors R31 and R32 flow to the gate terminal of the switching element M31. Therefore, the switching element M31 is ON. Consequently, the ground line 301 is connected to the reference potential A. Therefore, power is supplied to the built-in power source inside the protection IC 300, so that the protection IC 300 starts up. In a connection form as described above, power consumed by the microcomputer on the lower cell unit 147 side can also be consumed inside the circuit of the upper cell unit 146 by the current consumption control means 310. Moreover, in accordance with switching between movable operation and stoppage of the current consumption control means 310, start-up and stoppage control of the protection IC 300 itself can also be performed together. Thus, the microcomputer of the control unit 350 can control start-up and stoppage of the protection circuit of the lower cell unit 147 and the protection circuit of the upper cell unit 146 in conjunction therewith.

The state of the microcomputer of the control unit 350 includes three stages, such as a normal mode, a sleep mode, and a shut-down mode. The normal mode is a state where the microcomputer is starting up at all times. The sleep mode is a mode in which the microcomputer intermittently starts up by itself and repeats operation of stoppage for 49 milliseconds after a start-up for 1 millisecond. The shut-down mode is a state where the power source voltage VDD1 is not supplied at all and is a state where the microcomputer is completely stopped. The microcomputer is operated when the battery pack 100 is mounted or not mounted in the power tool main body 1. However, when the battery pack 100 is not mounted, or when the power tool is not used for a certain period of time or longer even if the battery pack 100 is mounted, for example, when another trigger operation is not performed for approximately two hours after a trigger operation has ended, the microcomputer is in the sleep state. Even in this sleep state, the current consumption control means 310 is operated in conjunction with a start-up of the microcomputer. In addition, the protection IC 300 also starts up via the current consumption control means 310. When the trigger switch 4 of the power tool main body 1 is pressed and a current flows in the motor 5, the microcomputer of the control unit 350 detects increase in current value detected by the current detection circuit 327 and returns to the normal state.

In the present example, in the case of a configuration in which a microcomputer is included in only one protection circuit of a plurality of cell units, increase in potential difference between the plurality of cell units caused by being neglected for a long period of time in a state where the battery pack is detached has been resolved by adding the current consumption control means 310 performing power consumption as much as that in the microcomputer for the protection circuits of other cell units in which no microcomputer is provided. Therefore, balance of a consumption current in each of the plurality of cell units can be adjusted, and thus it is possible to realize a battery pack in which voltage balance for every cell unit is not deteriorated even after being stored for a long period of time.

A residual quantity display means 335 for displaying the battery residual quantity is provided in the battery pack 100.

When a switch (not illustrated) for displaying a residual quantity is pressed, the battery voltage is displayed by the number of emitting diodes of a plurality of light emitting diodes (not illustrated). The battery residual quantity displayed by the residual quantity display means 335 may be displayed based on both end voltages of one cell unit of the upper cell unit 146 and the lower cell unit 147 or may be displayed based on the lowest voltage value of ten battery cells.

An output of an upper cell unit voltage detection circuit 322 connected to the upper positive electrode terminal 162 is input to the control unit 350. This output indicates the potential of the upper cell unit 146 when the battery pack 100 is not mounted in the power tool main bodies 1 and 30 or a charging device (not illustrated). Meanwhile, when the battery pack 100 is mounted in the power tool main body 1 for a low voltage (18 V), since the upper positive electrode terminal 162 and the lower positive electrode terminal 172 are connected to each other, the positive electrodes in the upper cell unit 146 and the lower cell unit 147 have the same potentials, and the negative electrodes have the same potentials. From this, the microcomputer included in the control unit 350 can determine whether the battery pack 100 is in a non-mounted state, is mounted in a low voltage device main body, or is mounted in a high voltage device by comparing the potential of the upper positive electrode terminal 162 and the potential of the lower positive electrode terminal 172. In order to detect the potential of the lower positive electrode terminal 172, it is preferable that the control unit 350 be configured to be able to acquire the positive potential of a battery cell 147a in the uppermost stage of the battery cells in the lower cell unit 147. In this manner, the microcomputer provided in the circuit of the lower cell unit 147 can determine whether the upper cell unit 146 and the lower cell unit 147 of the battery pack 100 are in a series-connection state (state of being mounted in a 36 V device) or in a parallel-connection state (state of being mounted in an 18 V device). In this manner, the microcomputer can also monitor the voltage value on the upper cell unit 146 side exceeding a range (voltage in the lower cell unit 147) in which the power source voltage is acquired, and therefore the microcomputer can determine the connection state of the voltage switchable battery pack 100 and perform optimal control corresponding to the determined connection state.

The LD terminal 168 is a terminal for transmitting a signal for stopping the power tool main body 1 from the battery pack 100 side or a signal for stopping an operation of an electrical apparatus using a battery pack (not illustrated) as a power source. In order to change the state of the LD terminal 168, the control unit 350 switches the gate signal (discharging prohibition signal 341) input to a switching element M41 of a semiconductor from an ordinary low state ("discharging allowed" from the battery pack 100) to a high state ("discharging prohibited" from the battery pack 100). For example, the switching element M41 is a P-type field effect transistor (FET). The drain side is connected to the LD terminal 168, and the source side is subjected to grounding. Accordingly, during a normal time of the switching element M41 (when the discharging prohibition signal 341 is low), the LD terminal 28 is in a high impedance state, and the potential of the LD terminal 28 is substantially equivalent to the voltage of the positive electrode input terminal 22 on the power tool main body 1 side. Meanwhile, when the discharging prohibition signal 341 is switched to a high state in accordance with control from the control unit 350, the source-to-drain of the switching element M41 is subjected to grounding due to conduction. Therefore, the potential of the LD terminal 28 on the power tool main body 1 side drops to the ground potential. As a result, due to deterioration in the gate potential of the switching element M101 on the power tool main body 1 side, that is, the partial potential caused by partial resistors R101 and R102, the source-to-drain of the switching element M101 is in a non-conducting state, so that the power circuit of the power tool main body 1 is blocked and rotation of the motor 5 is inhibited. In this manner, since rotation of the motor 5 of the power tool main body 1 can be inhibited in response to the discharging prohibition signal 341 emitted by the control unit 350 of the battery pack 100, the control unit 350 can quickly stop operation of the power tool or the electrical apparatus at the time of occurrence of an event in which power supply from the battery pack 100 has to be halted, for example, an excessive current at the time of discharging, deterioration in cell voltage at the time of discharging (over-discharging), and an abnormal rise of the cell temperature (excessive temperature), so that it is possible to protect not only the battery pack 100 but also the power tool main body 1.

FIG. 13 is a circuit diagram of the battery pack 100 of the present example and is a view illustrating a state where the battery pack 100 is connected to an 18 V power tool main body 1A with a main body side microcomputer. Here, the internal configuration on the battery pack 100 side is completely the same as that illustrated in FIG. 12, and only the configuration on the power tool main body 1A side differs. No microcomputer is included on the power tool main body 1 side illustrated in FIG. 12. However, in recent power tools, the use of a control unit 60 having a microcomputer for controlling the motor 5 has increased. The power tool main body 1A includes a power source circuit 61, and the control unit 60 is operated using a uniform low voltage (reference voltage VDD2) generated by the power source circuit 61. The control unit 60 includes a microcomputer and monitors or controls various states inside the power tool main body 1A using the microcomputer. In the present example, a DC motor 35 is provided in a power path between the positive electrode input terminal 22 and the negative electrode input terminal 27, and the operation switch 34 for turning on and off the rotation of the motor 35 is provided in the circuit thereof. In addition, a battery voltage detection circuit 62 is provided, and a voltage from the battery pack applied to the motor 35 is measured and is output to the control unit 60. Moreover, a switch (SW) state detection circuit 63 detecting whether the operation switch 34 is in a connection state (ON state) or in a blockage state (OFF state) is provided, and the signal is output to the control unit 60. The switching element M101 (semiconductor) and a shunt resistor R111 are inserted between the motor 35 and the negative electrode input terminal 27. For example, the switching element M101 is a field effect transistor (FET), and the gate signal thereof is sent by the control unit 60. Both end voltages of the shunt resistor R111 are detected by a current detection circuit 64, and a value thereof is output to the control unit 60. In this circuit diagram, the motor 35 is illustrated as a DC motor with a brush. However, a configuration of driving a three-phase brushless motor using a known inverter circuit may be adopted. In such a case, rotation of the motor 35 may be stopped by connecting the switching element M101 in series in a power path input to an inverter circuit (not illustrated), or causing the control unit 60 in place of the switching element M101 to control a switching element (not illustrated) included in an inverter circuit.

The LD terminal 28 of the power tool main body 1A is connected to the control unit 60 via a resistor R112. Moreover, the reference voltage VDD2 is connected to the control unit 60 side of the resistor R112 via a resistor R113. Therefore, when the LD terminal 28 is in a high impedance state, a voltage close to the reference voltage VDD2 is applied to an input line 65 of the control unit 60, and when the LD terminal 28 drops to the ground potential, the partial voltages of the resistors R113 and R112, that is, a voltage drastically lower than the reference voltage VDD2 is transmitted (output) to an input port of the control unit 60 through the input line 65. The control unit 60 detects a change in the potential of this input line 65, controls the gate signal of the switching element M101, and controls allowance or stoppage of power supply to the motor 35.

In this manner, on the power tool main body 1A side, a circuit for stopping the motor 35 is provided in accordance with a discharging prohibition signal input via the LD terminals 168 and 28. However, when the control unit 60 is provided on the power tool main body 1A side, instead of a configuration in which the control unit 350 on the battery pack 100 side monitors an overcurrent and stops the motor 5 on the power tool main body 1A side, it is preferable that the control unit 60 on the power tool main body 1A side directly monitor an overcurrent using the current detection circuit 64. When the control unit 350 on the battery pack 100 side monitors an overcurrent, an average control condition (threshold value for an overcurrent) that can be applied to a plurality of power tool main bodies has to be set. However, when the control unit 60 on the power tool main body 1A side monitors an overcurrent, an optimal control condition (high threshold value for an overcurrent) can be set for the power tool main body 1A. Therefore, the control unit 350 can avoid output limitation of the power tool due to the set average control condition (low threshold value for an overcurrent). Avoidance of this output limitation is particularly effective for new power tools to be released in the future, and it is possible to realize control in which capability of a new power tool main body 1A is maximized.

In the present example, the control unit 350 on the battery pack 100 side determines whether or not the control unit 60 having a microcomputer is included on the power tool main body 1 or 1A side where the battery pack 100 is mounted and changes a condition for overload protection on the battery pack 100 side in accordance with a determination result. Specifically, as in FIG. 12, when no microcomputer is included on the power tool main body 1 side, an overcurrent limit value at the time of a low voltage output is set to a threshold value for the power tool main body 1A with no microcomputer, for example, 20 A (default value). A range of this default value may be suitably set in accordance with the capacity or the performance of battery cells to be used. Since this overcurrent limit value is equivalent to a value set for the battery pack 15 in the related art, the power tool main body 1A with no microcomputer in the related art can be driven using the battery pack 100 of the present example. Meanwhile, when a microcomputer is included on the power tool main body 1A side, the overcurrent limit value at the time of a low voltage output is not set for the battery pack 100 side, and the microcomputer of the control unit 60 on the power tool main body 1A side takes charge of monitoring an overcurrent value. As a result, the control unit 60 can monitor an optimal current along the characteristics of the using motor 5 or the configuration characteristics of the power tool main body 1A and the like, and therefore it is possible to avoid a problem that the capability of the power tool main body 1A may not be able to be effectively exhibited due to excessively limited the overcurrent limit value on the battery pack 100 side. In addition, the power tool main body 1A can maximize the capability of the battery pack 100, and thus a high-output power tool can be realized. In this manner, changing the condition for overload protection on the battery pack 100 side between the low voltage side and a high voltage side denotes that the control unit 60 on the power tool main body side can perform overload protection that is optimal for the power tool main body 1A while there is still room for a higher output and further improvement in low voltage power tool main bodies to be newly released in the future.

In order to determine whether or not the control unit 60 having a microcomputer is included on the power tool main body 1 or 1A side, an LD terminal voltage detection circuit 328 for detecting a value of a voltage applied to the LD terminal 28 is newly provided. The LD terminal voltage detection circuit 328 is connected to the LD terminal 168 through a connection line 342, and the LD terminal voltage detection circuit 328 outputs an output corresponding to a terminal voltage to the control unit 350. The microcomputer included in the control unit 350 determines whether or not the control unit 60 including a microcomputer is present on the power tool main body side by measuring the LD terminal voltage after the battery pack 100 is mounted and while the discharging prohibition signal 341 is not emitted. In a case of the power tool main body 1 having no microcomputer, as it can be seen from the circuit diagram in FIG. 12, the power tool main body 1 is in a state where a voltage substantially equivalent to the voltage applied to the positive electrode input terminal 22 is applied to the LD terminal 28. Since the microcomputer of the control unit 350 detects a voltage of the upper positive electrode terminal 162 using the upper sell unit voltage detection circuit 322, the microcomputer can determine whether or not a microcomputer is included in the power tool main body 1 by comparing the voltage of the upper positive electrode terminal 162 and the LD terminal voltage. Meanwhile, as it can be seen from the circuit diagram in FIG. 13, in a case of the power tool main body 1A having a microcomputer, a voltage substantially equivalent to the reference voltage VDD2 (for example, 5 V or 3.3 V) for driving a microcomputer is applied to the LD terminal 28. Thus, the microcomputer of the control unit 350 can easily determine that a microcomputer is included in the power tool main body 1 by only detecting the LD terminal voltage without comparing it with the voltage of the upper positive electrode terminal 162 using the upper sell unit voltage detection circuit 322. As described above, since the connection line 342 and the LD terminal voltage detection circuit 328 are provided, the control unit 350 can easily determine whether a tool is an electronic control supporting tool including a low voltage-driven control unit such as a microcomputer on the power tool main body or the electrical apparatus main body side, or a non-supporting tool. In addition, the control unit 350 can change a control parameter, for example, the overload protection condition for monitoring the battery cells in accordance with determination results. Here, the value for the control parameter to be changed may be stored in advance in a non-volatile memory included in the microcomputer, such that any stored value is read out and set in accordance with the determination results.

FIG. 14 is a circuit diagram of a state where the battery pack 100 is mounted in the power tool main body 30 that can support a high load. Regarding a feature point of the power tool main body 30 that can support a high load, the power tool main body 30 has terminals (positive electrode input terminal 52, negative electrode input terminal 57, and terminal portions 59b and 59c of short bar 59) on the device side respectively corresponding to the positive electrode terminals (162 and 172) and the negative electrode terminals (167 and 177) of the battery pack 100. The short bar 59 is a metal component having the terminal portion 59b on one side and having the terminal portion 59c on the other side. When the battery pack 100 is mounted on the power tool main body 30 side, the lower positive electrode terminal 172 and the lower negative electrode terminal 177 is short-circuited due to the short bar 59. In addition, the positive electrode input terminal 52 of the power tool main body 30 is connected to the upper positive electrode terminal 162, and the negative electrode input terminal 57 is connected to the upper negative electrode terminal 167. In this manner, an output of the upper cell unit 146 and the lower cell unit 147 in series-connection, that is, a rated voltage of 36 V can be obtained using the shapes of two divided main body side terminals. The configuration on the power tool main body 30 side is substantially the same as the internal configuration of the power tool main body 1A illustrated in FIG. 13. A motor 45 is a rated 36 V motor. However, similar to the motor 35 illustrated in FIG. 13, a brushless DC motor may be driven using an inverter circuit. The switching element M101 is provided in series with the power circuit for the motor 45. The ON and OFF state of the switching element M101 is controlled based on the gate signal output from the control unit 60. Rotation of the motor 45 is stopped by turning off the switching element M101. In the high voltage power tool main body 30 as well, the procedure of sending out the discharging prohibition signal 341 from the battery pack 100 side is completely the same as those of the circuits illustrated in FIGS. 12 and 13. That is, when the control unit 350 on the battery pack 100 side is controlled, the source-to-drain of the switching element M41 is conducted, and when the LD terminal 168 drops to the ground potential, the state is transmitted (output) to the input port of the microcomputer included in the control unit 60. Therefore, the control unit 60 can detect the state as a discharging prohibition signal from the battery pack 100 side. However, in the 36 V power tool main body 1, discharge prohibited control due to an overcurrent is configured to be performed by the control unit 60 on the tool main body side, such that the battery pack 100 side is not involved in monitoring related to an overcurrent, or the threshold value for stoppage due to an overcurrent is sufficiently raised to a value close to the limit value for the battery cells so that the microcomputer of the control unit 350 does not have to be practically involved in monitoring the current value. As a result, it is possible to achieve both a higher output of the battery pack 100 and maintenance of compatibility with the battery pack 15 in the related art.

Next, another function of the battery pack 100 will be described using FIG. 15. FIG. 15 illustrates a circuit configuration in the battery pack 100 focusing on a circuit for the control unit 350 detecting a contact failure state. Here, a lower voltage detection circuit 332, a connection state detection means 400, an upper cell unit discharging means (discharging circuit) 410, a lower cell unit discharging means (discharging circuit) 420, a system detection circuit 430, and a charging stoppage circuit 440 are added to the circuit diagram illustrated in FIGS. 12 to 14. Regarding the connection state detection means 400, the upper cell unit discharging means 410, and the lower cell unit discharging means 420, although the upper cell unit 146 and the lower cell unit 147 are illustrated separately for the sake of illustration, the basic circuit configuration is the same as those in FIGS. 12 to 14. However, it should be noted that parts not related to the features illustrated in FIG. 15 are omitted in parts illustrated in FIGS. 12 to 14.

The protection IC 300 for an upper cell unit 146 is connected to the upper cell unit 146 (cell set A), and the protection IC 320 for a lower cell unit 147 is connected to the lower cell unit 147 (cell set B). The control unit 350 configured to include a microcomputer controls adjustment thereof. Here, the connection state detection means 400 is provided, so that the configuration is characterized by addition of a function in which when there is a cell unit that is not charged or discharged due to a contact failure between a power connection terminal on the battery pack 100 side and the device side terminal on the electrical apparatus main body side or the connection terminal of an external charging device (not illustrated), the microcomputer of the control unit 350 detects this and stops charging or discharging. In the present example, two cell units (146 and 147) are included, and each of the cell units is provided with the charging/discharging connection terminals (161 or 162, 177, 171 or 172 and 167). The connection state of each cell unit is switched between series-connection and parallel-connection in accordance with a terminal wiring form of an opponent device connected to the charging/discharging terminal. At the time of mounting an external charging device, the charging positive electrode terminal pair (161 and 171) is used in place of the discharging positive electrode terminal pair (162 and 172). Since the upper positive electrode terminals 161 and 171 are connected to each other via a self-controlled protector, the potentials are the same as each other. Therefore, in FIG. 15, for convenience of description, these are not discriminated and will be described as the upper positive electrode terminal 162 and the lower positive electrode terminal 172. Here, in a case of discharging of an output in the series-connection state (rated voltage of 36 V), no currents flow at all when there is a contact failure between the charging/discharging connection terminal and the connection terminal on the power tool main body side, so that the power tool does not operate. Therefore, a worker can easily notice occurrence of the poor connection state, so that the battery pack 100 can be detached from the power tool main bodies 1 and 30 and can be mounted again after removing waste or the like.

A problem occurs in a case of discharging or charging of an output in the parallel-connection state (rated voltage of 18 V). In this case, even if a contact failure occurs in any of the charging/discharging connection terminal and the connection terminal on the power tool main body side, there is a possibility that discharging from one of two cell units (146 and 147) on the battery pack 100 side or charging to one side continues. If the terminal is connected to only this cell unit and the poor connection state of the other cell unit continues, extreme voltage imbalance occurs between the upper cell unit 146 and the lower cell unit 147, which is not preferable. Here, the microcomputer monitors the voltages of the upper cell unit 146 and the lower cell unit 147 detected by the upper cell unit voltage detection circuit 322 and the lower cell unit voltage detection circuit 332 and detects whether or not poor connection has occurred in any of the connection terminals (162, 167, 172, and 177) using output signals (connection state signal A345 and connection state signal B346) of the connection state detection means 400. The contact failure state that has to be detected as described above occurs when the upper cell unit 146 and the lower cell unit 147 are in a parallel-connection state. Therefore, when an opponent device in which the battery pack 100 is mounted is the 18 V power tool main body 1, there are four connection points having a possibility of a contact failure, such as the positive electrode input terminal 22 (refer to FIG. 6) and the upper positive electrode terminal 162, the positive electrode input terminal 22 and the lower positive electrode terminal 172, the negative electrode input terminal 27 (refer to FIG. 6) and the upper negative electrode terminal 167, and the negative electrode input terminal 27 and the lower negative electrode terminal 177.

First, the microcomputer included in the control unit 350 measures the voltage of the upper positive electrode terminal 162 and the voltage of the lower positive electrode terminal 172 using the upper cell unit voltage detection circuit 322 and the lower cell unit voltage detection circuit 332 and monitors the difference therebetween. Here, when a gate signal is sent out from the microcomputer and a switching element M82 is turned on, the upper cell unit voltage detection circuit 322 inputs voltages divided by two partial resistors R81 and R82 between the drain terminal of the switching element M82 and the positive potential (VbatA) of the upper cell unit 146 to the gate signal of a switching element M81. Consequently, the switching element M81 shifts from a blockage state to the connection state, so that the positive potential (VbatA) of the upper cell unit 146 and a reference potential B (here, the negative potential of the lower cell unit 147) are conducted. Then, the intermediate potentials of the partial resistors R83 and R84 interposed therebetween are input to the microcomputer of the control unit 350 as an upper cell unit voltage 323. The microcomputer can measure the voltage value with respect to the reference potential B using a built-in analog front end (AFE).

When a gate signal is sent out from the microcomputer and the switching element M86 is turned on, the lower cell unit voltage detection circuit 332 inputs voltages divided by two partial resistors R85 and R86 between the drain terminal of the switching element M86 and the positive potential (VbatB) of the lower cell unit 147 to the gate signal of a switching element M85. Consequently, the switching element M85 shifts from a blockage state to the connection state, so that the positive potential (VbatB) of the lower cell unit 147 and the reference potential B (negative potential of the lower cell unit 147) are conducted. Then, the intermediate potentials of the partial resistors R87 and R88 interposed therebetween are input to the microcomputer of the control unit 350 as a voltage detection 333 of the upper cell unit. The microcomputer can measure the voltage value with respect to the reference potential B using the built-in analog front end (AFE). As described above, the microcomputer measures voltages of the upper cell unit 146 and the lower cell unit 147. However, in order to reduce the power consumption as much as possible at this time, the microcomputer turns on the switching elements M82 and M86 only when the voltages are measured. The voltages detected by the upper cell unit voltage detection circuit 322 do not have potentials with respect to the reference potential A but have relative potentials with respect to the reference potential B. The voltages detected by the lower cell unit voltage detection circuit 332 are also relative potentials with respect to the reference potential B. When the lower negative electrode terminal 177 differs from the upper negative electrode terminal 167 in potential, for example, in a state where a contact failure has occurred on the negative electrode terminal side (177 and 178), even when the potentials on the positive electrode side are determined to be equivalent to each other, there may be a case where both end voltages of the upper cell unit 146 and both end voltages of the lower cell unit 147 differ from each other. A circuit provided to check the presence or absence of a contact failure occurring in any of the positive electrode terminal and the negative electrode terminal is the connection state detection means 400.

The connection state detection means 400 can detect a contact failure of the positive electrode terminal. The connection state detection means 400 cannot detect power shutdown caused by a contact failure on any side of the negative electrode terminals (upper negative electrode terminal 167 and negative electrode input terminal 27, or lower negative electrode terminal 177 and negative electrode input terminal 27 illustrated in FIG. 6). When the power tool main body 1 to which the battery pack is connected is an 18 V device, when viewed from the microcomputer of the control unit 350, even in a state where only a voltage of a cell unit on one side is applied, there are cases where the voltage of the cell unit on the other side on the negative electrode terminal side where a contact failure has occurred is detected to have the same potential. For example, even when the voltage between both electrodes of the upper cell unit 146 is 18.0 V and the voltage between both electrodes of the lower cell unit 147 is 17.9 V differing from each other, if the reference potential A of the upper cell unit 146 is lower than the reference potential B of the lower cell unit 147 by 0.1 V, both the upper cell unit voltage detection circuit 322 and the lower cell unit voltage detection circuit 332 become 18.0 V being equivalent to each other.

In the connection state detection means 400, if a predetermined difference is generated between the potentials (reference potential A and reference potential B) of two cell units (146 and 147) on the negative electrode side, a switching element M60 is switched. The microcomputer can detect the abnormality state as the switching element M60 is switched. For example, when the voltage of the upper cell unit 146 is high and the voltage of the lower cell unit 147 is low, partial voltages of two partial resistors R61 and R62 provided between the reference potential A of the upper cell unit 146 and the reference potential B of the lower cell unit 147 are added to the gate terminal of a switching element M61. Here, when there is no potential difference between the reference potential A and the reference potential B, the switching element M61 remains off. When the potential difference becomes a predetermined value or larger, the switching element M61 is turned on. One end side of the partial resistor R61 is connected to the negative electrode of the lower cell unit 147. However, the switching element M60 is provided therebetween. The switching element M60 is a switching circuit for connecting or blocking the circuits with respect to the partial resistors R61 and R62 and the partial resistors R63 and R64. When the microcomputer inputs the drive signal VDD1 to the gate signal, the drive signal VDD1 is supplied, and when the microcomputer starts up, the switching element M60 is turned on in association therewith. When the microcomputer is shut down, the switching element M60 is in a blockage state. The resistor R65 is a grounding resistor for causing the gate-to-source to have 0 V when the gate signal of the switching element M60 is open.

When the switching element M61 is turned on, partial voltages due to the resistors R68 and R69 of the reference potential A of the upper cell unit 146 are applied to the gate signal of a switching element M62. Therefore, the partial voltages due to R70 and R72 of the positive potential (VbatA) of the upper cell unit 146 are input to the gate signal of a switching element M65. The drain terminal of the switching element M65 is connected to VDD1 via a resistor R71, and the source side is subjected to grounding to the reference potential B. Therefore, in a state where the switching element M65 is turned off, the connection state signal A345 is in a high state. As the switching element M65 is turned on, the connection state signal A345 becomes low. The connection state signal A345 is a signal indicating that a contact failure has occurred on the negative electrode terminal side. It becomes high in a normal state (good contact state in the negative electrode terminal). When the connection state signal A345 is low, this means that the potentials of the cell units on the negative side are not aligned. Therefore, the microcomputer of the control unit 350 immediately stops charging or discharging.

Next, an operation performed when the voltage of the upper cell unit 146 becomes low and the voltage of the lower cell unit 147 becomes low will be described. This situation occurs discharging is performed from only the upper cell unit 146 side due to a contact failure in the upper negative electrode terminal 167 and the negative electrode input terminal 27 (refer to FIG. 6) and only the voltage of the upper cell unit 146 is dropping when a power tool is operated and discharging is performed from the battery pack 100, for example, in a state of being connected to the 18 V power tool main body 1. In this state, since the positive electrode side terminals (162 and 172) are commonly connected to the positive electrode input terminal 22 and have the same potential, the reference potential A becomes relatively higher than the reference potential B. Consequently, the switching elements M61, M62, and M65 remain off, but partial voltages of the resistors R63 and R64 constituting the gate voltages of the switching element M63 become equal to or larger than a predetermined value or larger. Accordingly, the switching element M63 is turned on. Partial voltages due to the resistors R66 and R74 between the lower positive electrode terminal 172 of the lower cell unit 147 and the reference potential B is applied to the gate terminal of the switching element M63. However, the drain terminal of the switching element M63 is connected to the voltage division point thereof, and the source terminal of the switching element M64 is connected to the source terminal of the switching element M63. Therefore, when the switching element M63 is turned on, the switching element M64 is turned on and the switching element M66 is turned on as well. The switching element M64 is provided such that the voltage of each of the cell units can be detected when the battery pack 100 is detached. A resistor R67 having a small value is input to the switching element M64. In this manner, since the negative potential of the upper cell unit 146 and the negative potential of the lower cell unit 147 can be compared to each other via the switching element M64, balance in the cell units can be monitored even when the battery pack 100 is not connected. The negative electrode terminal (177) of the upper cell unit 146 is connected to the drain terminal of the switching element M64 via the resistor R67 and the switching element M64. When the switching element M66 is turned on, VDD1 and the reference potential B are conducted via the resistor R73, so that the connection state signal B346 is switched from a high state to a low state. Regarding the connection state signal B346, when the battery pack is not mounted, the switching element M63 is not turned on. The switching element M66 is turned on regardless of detection of the switching element M64, and the connection state signal B346 becomes low. The connection state signal B346 of which the voltage is normally output in parallel-connection also becomes low. As described above, the connection state detection means 400 can recognize a contact failure state on the negative electrode terminals (167 and 177) side at the time of connection for 18 V.

Even in a state where the battery pack 100 is detached, that is, even when the upper positive electrode terminal 162 and the lower positive electrode terminal 172 are in an open state (non-conducting state) and the upper negative electrode terminal 167 and the lower negative electrode terminal 177 are similarly in an open state (non-conducting state), the connection state signal A345 and B346 can be detected. When the drive voltage VDD1 is supplied from the power source circuit 321 and the microcomputer of the control unit 350 starts up in this state, the source-to-drain is conducted due to the voltage applied to the signal of the gate terminal of the switching element M60, and the negative electrode side of the upper cell unit 146 and the negative electrode side of the lower cell unit 147 are conducted through the parallel-connection circuits of the partial resistors R61 and R62, and R63 and R64. As a result, the ground potentials of the upper cell unit 146 and the lower cell unit 147 are aligned. In this state, since M61 and M63 are in an OFF state and the switching elements M62 and M65 are also turned off, the connection state signal A345 becomes high. Meanwhile, the switching element M64 maintains the OFF state, but the battery voltage (VbatB) of the lower cell unit 147 is connected to the gate terminal of the switching element M66 via the partial resistor R66. Therefore, the switching element M66 is turned on due to the partial voltages of the partial resistors R66 and R74. Therefore, the connection state signal B346 becomes low. Hereinabove, operation of the connection state detection means 400 has been described.

The circuit illustrated in FIG. 15 includes the system detection circuit 430 for detecting whether the battery pack 100 is connected to any device, that is, an external charging device (not illustrated) or the electrical apparatus main body (for example, the power tool main bodies 1 and 30 illustrated in FIG. 1). The output of the system detection circuit 430 is input to the control unit 350. When the battery pack 100 is detached, the system detection signal 431 becomes high, and when the battery pack 100 is mounted in an external charging device (not illustrated) or the electrical apparatus main body, the system detection signal 431 becomes low. In the switching element M92, the LD terminal voltage is input to the gate signal, and a grounding resistor R94 is provided in the gate-to-source. Here, the source terminal of the switching element M92 is subjected to grounding on the negative electrode side of the lower cell unit 147. As described in FIGS. 12 and 13, when the electrical apparatus such as the power tool main bodies 1 and 30 is mounted, the voltage of the LD terminal 168 becomes high. As a result, connection of the drain-to-source of the switching element M92 is turned on. Therefore, the system detection signal 431 drops to the ground potential (reference potential B) and becomes low.

In the V terminal 165 as well, the presence or absence of connection is detected by a similar method. When an external charging device (not illustrated) is connected, a drive voltage (for example, 5 V) for a control unit of the external charging device is applied to the V terminal 165. Therefore, in the system detection circuit 430, it is possible to determine whether or not the terminal is connected to the external charging device by detecting the presence or absence of a voltage of the V terminal 165. Here, in a switching element M91, the V terminal voltage is input to the gate signal via a resistor R93. A grounding resistor R92 is provided in the gate-to-source. Here, the source terminal of the switching element M92 is subjected to grounding on the negative electrode side of the lower cell unit 147, and the drain terminal is connected to the input port of the microcomputer and the drive voltage (VDD1) via the partial resistor R91.

Here, in the diagram, the drain terminals of the switching elements M91 and M92 are connected to the common input port as the system detection signal 431. The inputs may be input via an OR circuit, may be provided in two input ports on the microcomputer side such that they individually connect the drain terminals of the switching elements M91 and M92, or may sequentially detect outputs of two switching elements M91 and M92 in time series through one input port by providing a switching circuit.

As described above, the microcomputer of the control unit 350 can determine whether the battery pack 100 is mounted in the electrical apparatus or mounted in a charging tool, or is in a non-mounting state by providing the system detection circuit 430 and detecting whether or not the voltage value of the V terminal 165 or the LD terminal 168 is high. When the battery pack 100 is in a non-mounting state, voltages of both the V terminal 165 and the LD terminal 168 becomes zero. When the battery pack 100 is mounted in the electrical apparatus, the microcomputer voltage on the main body side or the battery voltage is applied to the LD terminal signal, so that it can be detected. In addition to the LD terminal, or when the microcomputer voltage of the external charging device is applied to only the V terminal 165, it is possible to determine that the battery pack 100 is connected to the external charging device. However, when the battery pack 100 is connected to the power tool main body or the electrical apparatus main body that does not utilize the LD terminal 168, detection using the system detection circuit 430 cannot be performed. In such a case, the presence of absence of mounting can be detected when the power tool or the electrical apparatus is operated using the current detection circuit 327 or at the time of charging. When the microcomputer voltage of the opponent device (power tool main body or external charging device) is applied to both the V terminal 165 and the LD terminal 168, the microcomputer of the control unit 350 can determine that the battery pack 100 is connected to the opponent device but cannot identify whether the device is the electrical apparatus main body or the external charging device. In such a case, it may be determined whether the device is the charging device or the electrical apparatus main body based on a current value detected by the current detection circuit 327. When a uniform charging current is flowing, it can be determined as the external charging device, and it also can be determined whether the device is the external charging device or the electrical apparatus main body by determining the direction of the current. As described above, in any case, the microcomputer can correctly detect the system connection state.

A discharging stoppage circuit 435 and an LD terminal voltage detection circuit 328 are further provided in the LD terminal 168. The discharging stoppage circuit 435 includes a switching element M41 for short-circuiting between the LD terminal and the reference potential B via the resistor R46. The microcomputer of the control unit 350 shifts the discharging prohibition signal 341 from a low state to a high state when operation of the power tool has to be stopped due to an abnormality. Since the discharging prohibition signal 341 is the gate signal of the switching element M41, when the discharging prohibition signal 341 becomes high, the potential of the LD terminal 168 is subjected to grounding via the resistor R46, thereby being a low potential. The LD terminal voltage detection circuit 328 has already been described with reference to FIGS. 12 and 13, and duplicate description thereof will be omitted herein.

The charging stoppage circuit 440 is provided to transmit (output) a signal for stopping charging operation of an external charging device via the LS terminal 166 through control of the microcomputer of the control unit 350. Since an LS signal is used with respect to the charging device, it is not used when being connected to the power tool main bodies 1 and 30. Generally, the charging stoppage signal 441 is low. However, when the microcomputer on the battery pack 100 side determines that charging operation has to be stopped at the time of charging, in order to transmit (output) the determined result to the charging device, the charging stoppage signal 441 is switched from a low state to a high state. When the microcomputer of the control unit 350 switches the charging stoppage signal 441 to a high state, both the switching elements M95 and M96 in which the charging stoppage signal 441 is input to the gate signal are turned on. When the switching element M95 is turned on, the V terminal 165 and the reference potential B are conducted, the partial voltages of resistors R96 and R97 interposed therebetween are transmitted (output) to the gate terminal of the switching element M93, and the switching element M93 is conducted. In addition, since the switching element M96 is turned on, the gate potential of the switching element M94 drops to the ground (reference potential B). Therefore, the source-to-drain of the switching element M94 is blocked. As a result, the output of the thermistor TH1 is blocked from being in a state (normal state) where the output is transmitted (output) from the LS terminal 166 to a charging device (not illustrated). Meanwhile, since the switching element M93 is turned on, the LS terminal 166 has the same potential as the V terminal 165, that is, becomes high. A partial resistor (not illustrated) dividing the power source voltage of 5 V on the charging device side is provided in the LS terminal 166. When the battery pack 100 is not connected to the charging device, a partial voltage of approximately 3 V is output to the LS terminal on the charging device side. When the battery pack 100 is mounted in the charging device, a value lower than 3 V is transmitted (output) to the LS terminal 166 in a normal state (normal charging). However, when an abnormality state (state where charging has to be stopped) occurs on the battery pack 100 side, the microcomputer of the control unit 350 sets the LS terminal voltage to a value higher than 3 V. As a result, an external charging device stops charging by detecting that the state of the LS terminal 166 has become high.

The battery pack 100 has a voltage adjustment means for balancing voltages when a difference between voltages of the upper cell unit 146 and the lower cell unit 147 is detected by the control unit 350. The voltages are balanced by discharging the cell units having a high voltage. A discharging means A410 is a discharging means included in the circuit of the upper cell unit 146, and the discharging means B420 is a discharging means included in the circuit of the lower cell unit 147. Each discharging means can perform discharging at an arbitrary timing and for an arbitrary period by sending out a discharge execution signal A411 or a discharge execution signal B421 from the microcomputer of the control unit 350. The discharging means A410 is configured to include a discharging dummy resistor R51, and the dummy resistor R51 is connected to the positive electrode and the negative electrode of the upper cell unit 146 and consumes power by converting a current into heat. Here, as the dummy resistor R51, for example, a resistor of 2 kΩ is used. When an actual voltage of the upper cell unit 146 is 20 V, a current of 10 mA flows in the resistor. Therefore, the potential on the upper cell unit 146 side is decreased while taking a long period of time such as several days to one week approximately and is thus can be adjusted to be the same as the lower cell unit 147. The switching element M51 is a switch for connecting or blocking the resistor R51, and partial voltages of the resistor R52 and R53 are input to the gate terminal of the switching element M51. The resistor R52 is connected to the reference potential B of the lower cell unit 147 via the switching element M52. A discharging execution signal A411 from the control unit 350 is input to the gate terminal of the switching element M52.

The discharging means B420 is configured to include a discharging dummy resistor R54, and the dummy resistor R54 is connected to the positive electrode and the negative electrode of the lower cell unit 147. The value of the dummy resistor R54 or the operation principal are the same as the discharging means A410 side. The switching element M54 is a switch for connecting or blocking the resistor R54, and a discharge execution signal B421 from the control unit 350 is directly input to the gate terminal.

Next, a procedure in which the microcomputer of the control unit 350 determines normality/abnormality of the connection state of the connection terminal of the battery pack 100 will be described using a flowchart of FIG. 16. The procedure illustrated in FIG. 16 can be executed via software using a program stored in the microcomputer of the control unit 350 in advance. When the microcomputer starts up, the program is executed together with other control programs, and the execution continues until the microcomputer is shut down. First, the microcomputer determines whether or not the battery pack 100 is connected to the electrical apparatus main body such as a power tool main body or an external charging device using the system detection circuit 430 (Step 501). When the battery pack 100 is connected, the system detection signal 431 becomes low, and when the battery pack 100 is not connected, the system detection signal 431 becomes high. Next, the microcomputer measures a voltage detection 323 of the upper cell unit voltage detection circuit 322 and a voltage detection 333 of the lower cell unit voltage detection circuit 332 and compares the measurement results thereof (Step 502). Next, the microcomputer detect two output signals of the connection state detection means 400, that is, the connection state signal A345 and the connection state signal B346 (Step 503). Next, the microcomputer measures a current flowing in the lower cell unit 147 from the output of the current detection circuit 327 (Step 504). Next, the microcomputer determines a normality or an abnormality of the connection state of the battery pack 100 and the terminal connection state using the detection results in Steps 501 to 504 and performs operation in accordance with the determination result (Steps 505 and 506). FIG. 17 collectively shows the way of determination in Step 506 and a corresponding operation at that time.

FIG. 17 is a table showing determination of the connection state of the battery pack 100 performed by the microcomputer of the control unit 350, a way of determining a normality or an abnormality of a terminal connection state, and a corresponding operation with respect to a determination result. Here, determination divided into modes as indicated in No. 1 to 11 is performed. However, the number of determination sections may further increased or may be further simplified to 11 sections or fewer. As indicated in Step 501 of FIG. 16, first, the microcomputer determines whether or not there is system connection. Here, it is possible to determine the system connection based on whether the output of the system detection circuit 430 is low (L: system detection is present) or high (H: system detection is absent). Therefore, first, it is classified whether the determination belongs to mode No. 1 to 8 or No. 9 to 11. Here, system detection absence (H) indicates that the battery pack 100 is in a state of being detached from the electrical apparatus main body or the external charging device.

In Step 502 of FIG. 16, the microcomputer determines whether or not there is system connection. Here, when voltages of the upper cell unit 146 and the lower cell unit 147 are equal to each other or within a predetermined range (within ±0.5 V), one condition for determining that the state of the battery pack 100 is normal is satisfied. Next, in Step 503 of FIG. 16, the microcomputer detects the connection state signals A345 and B346. The connection state signal A345 becomes high (H) during a normal time and becomes low (L) at the time of an abnormality. Therefore, when there is a combination including L (here, No. 8), it is immediately determined at that moment that the state is the abnormality state. This state corresponds to a case where only the upper cell unit 146 is charged or only the lower cell unit is discharged. The connection state signal B346 is a determination signal that becomes high (H) during the series-connection state and becomes low (L) during the parallel-connection state or a detached state when the connection state signal A345 is high (H) indicating the normal state.

When system detection is H (absent), if the voltage between cell units is within ±0.5 V, as indicated in mode No. 9, the determination result is "non-connection (battery pack 100)/normal (state of electrode)", and the microcomputer of the control unit 350 stands by without doing anything. In addition, when system detection is H (absent), and when voltage between cell units is 1 V or higher, if the voltage A of the upper cell unit 146 is higher than the voltage B of the lower cell unit 147, as indicated in mode No. 10, the determination result is determined as "non-connection/abnormality in cell set voltage balance (A>B)". At this time, the discharging means A410 is operated to discharge the upper cell unit 146, and the voltage balance between the cell units is adjusted. As a result of this adjustment, when voltage imbalance between the cell units is within ±0.5 V, discharging operation performed by the discharging means A410 is canceled. In a similar manner, when system detection is H (absent), and when the voltage A of the upper cell unit 146 is lower than the voltage B of the lower cell unit 147, as indicated in mode No. 11, the determination result is determined as "non-connection/abnormality in cell set voltage balance (A<B)". At this time, the discharging means B420 is operated to discharge the lower cell unit 147, and the voltage balance between the cell units is adjusted. As a result of this adjustment, when voltage imbalance between the cell units is within ±0.5 V, discharging operation performed by the discharging means B420 is canceled.

When system detection is L (present), and when the connection state signal B346 is H (high), it indicates that the battery pack is connected to a 36 V device and the cell units are in series-connection. When being connected to a 36 V device, the potential of the upper cell unit 146 on the negative electrode side becomes higher than the potential of the lower cell unit on the negative electrode side. Therefore, the switching element M63 of the connection state detection means 400 is turned on, and the switching element M66 is turned off. Accordingly, the connection state signal B346 becomes high (H). Therefore, the pattern thereof corresponds to any one of No. 1 to 3. In such a case, the microcomputer determines whether the potential difference between the upper cell unit 146 and the lower cell unit 147 is within a first predetermined value, for example, within ±0.5 V. Here, hunting may occur when the first predetermined value (=detection range) is zero or close to zero. Therefore, an allowance range is set. Here, since the voltage of the cell unit is 18.0 V, the first predetermined value is set to approximately 0.5 (V). When the potential difference is within ±0.5 V, as indicated in mode No. 1, the state is "series-connection (36 V)/normal". Therefore, the microcomputer of the control unit 350 does not perform control for adjusting a voltage and stands by. When the potential difference between the upper cell unit 146 and the lower cell unit 147 is equal to or larger than a second predetermined value, for example, when there is a difference of 1 V or greater, the state is determined as "series-connection (36 V)/abnormality in cell set voltage balance". This is a case where a voltage of the upper cell unit (cell set A) 146 in mode No. 2 is high and a voltage of the lower cell unit (cell set B) 147 in mode No. 3 is high. In the case of mode No. 2, the control unit 350 sets the discharge execution signal A411 to be high and operates the discharging means A410, thereby performing adjustment (discharging of the upper cell unit 146) of a voltage. In a similar manner, in the case of mode No. 3, the control unit 350 sets the discharge execution signal B421 to be high and operates the discharging means B420, thereby performing adjustment (discharging of the lower cell unit 147) of a voltage. In mode No. 2 or 3, when the potential difference between the upper cell unit 146 and the lower cell unit 147 becomes a first potential difference (here, within 0.5 V), operation of the discharging means A410 or the discharging means B420 is stopped. In addition, when a state where a significant discharging current by the current detection circuit 327, that is, a trigger of the power tool is pushed or a situation in which operation of the electrical apparatus has started is detected, operation of the discharging means A410 or the discharging means B420 is temporarily canceled.

When system detection is L (present), and when the connection state signal B346 is L (that is, parallel-connection), the microcomputer determines whether the potentials of the upper cell unit 146 and the lower cell unit 147 are the same as each other. In a case when there is no potential difference (0 V), as indicated in mode No. 4, the state is "parallel-connection (18 V)/normal", the microcomputer of the control unit 350 does not perform control for adjusting a voltage and stands by. When the potential difference between the upper cell unit 146 and the lower cell unit 147 is equal to or larger than the second predetermined value, for example, when there is a difference of 1 V or greater, the state is determined as "parallel-connection (18 V)/abnormality in cell set voltage balance". This is a case where a voltage of the upper cell unit (cell set A) 146 in mode No. 5 is high and a voltage of the lower cell unit (cell set B) 147 in mode No. 6 is high. In the case of mode No. 5, the control unit 350 sets the discharge execution signal A411 to be high and operates the discharging means A410, thereby performing adjustment (discharging of the upper cell unit 146) of a voltage. In a similar manner, in the case of mode No. 6, the control unit 350 sets the discharge execution signal B421 to be high and operates the discharging means B420, thereby performing adjustment (discharging of the lower cell unit 147) of a voltage. In mode No. 5 or 6, when the system detection is switched from L to H during voltage adjustment, that is, when the battery pack 100 is detached, the discharging operation in mode No. 5 or 6 is stopped. In addition, when the potential difference between the upper cell unit 146 and the lower cell unit 147 becomes the first potential difference (here, within 0.5 V), operation of the discharging means A410 or the discharging means B420 is stopped. Moreover, when a state where a significant discharging current by the current detection circuit 327, that is, a trigger of the power tool is pushed or a situation in which operation of the electrical apparatus has started is detected, operation of the discharging means A410 or the discharging means B420 is temporarily canceled.

There are cases where while being in a parallel-connection state, the voltages of the upper cell unit 146 and the lower cell unit 147 may appear to be equivalent to each other due to a contact failure of the negative terminal side of the cell units. That is mode No. 7, and in such a case, both the connection state signal A345 and the connection state signal B346 become high (H). At a glance, this case is the same as the combination of mode No. 1. However, as described above, the microcomputer of the control unit 350 monitors the voltage of the upper cell unit 146 through the upper cell unit voltage detection circuit 322 (refer to FIG. 12). In a similar manner, the microcomputer of the control unit 350 monitors the voltage of the upper cell unit 146 via the lower cell unit protection IC 320 (refer to FIG. 12). Therefore, even if both the connection state signal A345 and the connection state signal B346 are high (H), the microcomputer can determine whether the state corresponds to mode No. 1 or 7 with reference to the result of determining whether the connection is in a series-connection state or a parallel-connection state. When the microcomputer determines that the state corresponds to mode No. 7, the state is "parallel-connection (18 V)/abnormality in negative terminal contact/normality in positive terminal contact". Therefore, the microcomputer of the control unit 350 transmits (outputs) a signal to the device side connected via the LD terminal 168 or the LS terminal 166 and stops operation of charging/discharging. This state corresponds to a case where only the upper cell unit 146 is discharged or a case where only the lower cell unit is charged. In mode No. 7, when the system detection signal detects H (absent), operation stoppage of charging/discharging is canceled.

FIG. 18 is a timing chart for further describing operation of the battery pack 100. The horizontal axis indicates the lapse of time (unit: second). The uppermost field indicates states of the connection state or the mounting state of the battery pack 100, and the lowermost field indicates the time to perform a state change of the battery pack 100 with circled numbers 1 to 12. Here, the chart shows that the detached battery pack 100 is mounted in the 36 V power tool main body 30 at the circled number 2, is detached again at the circled number 5, is mounted in an external charging device at the circled number 7, is detached from the external charging device at the circled number 9, is connected to the 18 V power tool main body 1 at the circled number 10, and is detached again at the circled number 11.

The system detection signal 431 indicates the output signal of the system detection circuit 430 included inside the battery pack 100. The system detection circuit 430 has two states such as high (H) and low (L). When the battery pack 100 is mounted in any device, that is, the power tool main bodies 1 and 30 or an external charging device (not illustrated), the state becomes low as indicated by the arrows 431*a*, 431*c*, and 431*e*, and when the battery pack 100 is detached, the state becomes high as indicated by the arrows 431*b*, 431*d*, and 431*f*.

The voltage imbalance detection signal 344 indicates that any voltage of the upper cell unit 146 and the lower cell unit 147 is higher by a predetermined amount, that is, by 0.5 V or higher. When imbalance is detected, the state becomes high, and when imbalance is not detected, the state becomes low. Here, during a period between the circled number 1 to the circled number 6, as indicated by the arrow 344*a*, the state indicates that the voltage A of the upper cell unit 146 is lower than the voltage B of the lower cell unit 147 by 0.5 V or more. During periods between the circled number 9 to the circled number 10 and between the circled number 11 to the circled number 12, as indicated by the arrows 344*c* and 344e, the state indicates that the voltage A of the upper cell unit 146 is higher than the voltage B of the lower cell unit 147 by 0.5 V or more. During periods between the circled number 6 to the circled number 9 and between the circled number 10 to the circled number 11, the difference between the voltage A of the upper cell unit 146 and the voltage B of the lower cell unit 147 is settled within a predetermined range, that is, lower than 0.5 V. As indicated by the arrows 344b and 344d, the voltage imbalance detection signal 344 becomes low.

The connection state signal A345 and the connection state signal B346 are output signals of the connection state detection means 400 indicated in the circuit diagram of FIG. 14. These are input to the microcomputer of the control unit 350. As described above in FIG. 14, generally, the connection state signal A345 is high (H) as indicated by the arrows 345a, 345c, and 345e, and it becomes low (L) when a contact failure occurs on the negative electrode terminal side at the time of parallel-connection. Here, the chart shows that a contact failure has occurred on the negative electrode terminal side at the timing of the circled number 8 and at the timing of the circled number 10, and in such a case, the connection state signal A345 becomes low (L) as indicated by the arrows 345b and 345d. The connection state signal B346 becomes high (H) at the time of the series-connection state and becomes low (L) at the time of the parallel-connection state or a detached state when the connection state signal A345 is high (H) indicating that it is in a normal state. Therefore, it becomes high (H) in a state as indicated by the arrow 346a, and it becomes low (L) in a state other than that as indicated by the arrow 346b.

The discharge execution signal A411 of the discharging means A is a signal for instructing operation of the discharging means A410 in FIG. 14. When the discharge execution signal A411 is high as indicated by the arrows 411b and 411d, the discharging means A410 is operated (ON), and when it is low as indicated by the arrows 411a and 411c, the discharging means A410 is not operated (OFF). The discharging means B420 is a signal for instructing operation of the discharging means B420 in FIG. 14. When the discharge execution signal B421 is high, the discharging means B420 is operated (ON), and when it is low, the discharging means B420 is not operated (OFF). The discharging current 349 is an output of the current detection circuit 327 illustrated in FIG. 14, the vertical axis indicates the current value. When the trigger switch of the power tool is pushed, and the motor rotates, as indicated by the arrows 349a, 349d, and 349g, a significant start-up current flows. Thereafter, as indicated by the arrows 349b, 349e, and 349h, a substantially uniform current flows. When a worker returns the trigger switch to the original position, as indicated by the arrow 349c, 349f, and 349i, the current becomes substantially zero. The values of the discharging current 349 are merely examples. Actual current waveforms may vary for each power tool main body. Moreover, the values may also vary significantly depending on the work contents.

When the microcomputer of the control unit 350 detects that the discharging current 349 has flowed three times as in the diagram, the microcomputer stops the operations while the discharging means A410 and the discharging means B420 are in operation. In description with reference to the example in FIG. 16, after the circled number 1, the voltage A of the upper cell unit 146 is lower than the voltage B of the lower cell unit 147 due to the voltage imbalance detection signal 344. Therefore, as indicated by the arrow 421a, the discharging means B420 is turned on (operation state). Meanwhile, as indicated by the arrow 411a, the discharging means A410 remains OFF (non-operation). While the discharging means B420 is in operation, when the microcomputer of the control unit 350 detects operation of the trigger switch at the timing of the circled number 3, as indicated by the arrow 421b, the microcomputer immediately stops operation of the discharging means B420. Then, after operation of the trigger lever is canceled, when a certain time T has elapsed, as indicated by the circled number 4, the discharging means B420 is turned on again (operation state). In a similar manner, as indicated even by the arrows 421c and 421e, the discharging means B420 is turned on (operation state) when the predetermined time T has elapsed after operation of the trigger lever is canceled. In the example of FIG. 16, the situation in which the discharging means B420 side is operated with the relationship of voltage A>voltage B has been described. However, even in the situation in which the discharging means A410 side is operated with the relationship of voltage A>voltage B, the discharging means A420 is turned on (operation state) when the predetermined time T has elapsed after operation of the trigger lever is canceled. The discharging means B420 is operated during a period from the circled number 5 to the circled number 6. During periods from the circled number 9 to the circled number 10 and from the circled number 11 to the circled number 12, the discharging means A410 is operated. However, at this time, the battery pack 100 is in a detached state, the control unit 350 is not affected by devices other than the battery pack 100, and voltage adjustment operation is performed.

The charging/discharging prohibition signal 453 is an output for prohibiting operation of the power tool main bodies 1 and 30 or a charging device (not illustrated) to which the battery pack 100 is connected. The charging/discharging prohibition signal 453 with respect to the power tool main bodies 1 and 30 is the discharging prohibition signal 341 in FIG. 14, and the charging/discharging prohibition signal 453 with respect to the charging device (not illustrated) is the charging stoppage signal 441 in FIG. 14. Here, at the circled number 8, in order to instruct the charging device to stop charging, as indicated by the arrow 453b, the charging/discharging prohibition signal 453 is sent out. At the circled number 10, in order to instruct the 18 V power tool main body 1 to prohibit discharging, as indicated by the arrow 453d, the charging/discharging prohibition signal 453 is sent out.

As described above, in the present example, the voltages of the upper cell unit 146 and the lower cell unit 147 included in the battery pack 100 are compared, such that discharging of the cell on the high voltage side is performed. Therefore, the voltages of the cell units can be equally maintained. In addition, even during discharging or charging of the cell units in the parallel-connection state, occurrence of a contact failure between the connection terminals can be detected, and therefore discharging or charging can be promptly stopped at the time of occurrence of a contact failure.

Example 2

Next, using Example 2, a second example of the present disclosure will be described. In the first example, voltage imbalance between the upper cell unit 146 and the lower cell unit 147 inside the battery pack 100 is detected by the microcomputer of the control unit 350 inside the battery pack 100. In the second example, the microcomputer of the electrical apparatus main body side is configured to detect the voltage imbalance. FIG. 19 is a schematic view illustrating the power tool according to the second example of the present disclosure. The power tool 1 in FIG. 19(1) is a power tool operated with a rated voltage of 18 V, and a load device by the motor 5 is operated due to an output of parallel-connection power of the battery pack 100. Here, the voltage in which the upper cell unit 146 and the lower cell unit 147 are connected in parallel is applied to the motor 5, and the mechanism portion 6 is driven.

A power tool 630 in FIG. 19(2) is configured to include a control unit (device side control unit) having a microcomputer 660. A microcomputer (MCU) 660 monitors a voltage, that is, a voltage between the positive electrode of the upper cell unit 146 and the negative electrode of the lower cell unit 147 supplied to a motor 635. Moreover, the microcomputer 660 is configured to be able to measure an intermediate potential of the upper cell unit 146 and the lower cell unit 147. This intermediate potential may be realized by inputting a potential of a short bar 689 to the microcomputer 660. In this manner, the microcomputer 660 can compare the voltage of the upper cell unit 146 and the voltage of the lower cell unit 147 to each other by measuring the intermediate potentials and can detect whether or not voltage imbalance between the cell units is present. When the difference between the voltages is equal to or larger than a predetermined value, it is possible to determine that an abnormality has occurred in connection of the plurality of cell units. Moreover, the difference between the voltages of the upper cell unit 146 and the lower cell unit 147 becomes equal to or larger than the predetermined threshold value (for example, 1 V or higher), the microcomputer 660 stops and prohibits operation of the motor 635, so that supply of power from the battery pack 100 to the load device (motor 635) is stopped or limited. In addition, as an alarm indicating a discharging stop, a worker is notified of occurrence of an abnormality by causing an LED 665 to flicker. In FIG. 19(2), as a notification means for indicating discharging stop, that is, operation stop of the power tool, the LED 665 that issues a notification using light is used. However, as indicated in a power tool 630A in FIG. 20, a buzzer means 665A that issues a notification by audio may be used.

Hereinabove, the present disclosure has been described based on the examples. However, the present disclosure is not limited to the examples described above, and various changes can be made within a range not departing from the gist thereof. For example, in the example described above, an 18 V/36 V voltage switchable battery pack has been described. However, switchable voltages and voltage ratios are not limited thereto only, and other voltage ratios may be adopted. In addition, the circuit configurations of the upper cell unit voltage detection circuit 322, the lower cell unit voltage detection circuit 332, the connection state detection means 400, the discharging means A410, and the discharging means B420 are not limited to only those described above, and an equivalent function may be realized by different circuit configurations.

The invention claimed is:

1. A battery pack comprising:
a plurality of cell units that are constituted of a plurality of battery cells connected in series;
a control unit; and
a plurality of connection terminals,
wherein a connection state of the plurality of cell units is switchable,
wherein the control unit is configured to stop a charging/discharging of the battery pack or output signal for stopping a charging/discharging of the battery pack to an electrical apparatus main body when a voltage imbalance between the plurality of cell units or a contact failure of the plurality of connection terminals occurs,
wherein a pair of positive electrode terminals and a pair of negative electrode terminals that are provided, such that a first cell unit of the plurality of cell units is connected to one positive electrode terminal of the pair of positive electrode terminals and to one negative electrode terminal of the pair of negative electrode terminals and a second cell unit of the plurality of cell units is connected to other positive electrode terminal of the pair of positive electrode terminal and to other negative electrode terminal of the pair of negative electrode terminals, and
wherein when the battery pack is connected to a high-voltage electrical apparatus main body, the first cell unit and the second cell unit are in a series-connection state, and when the battery pack is connected to a low-voltage electrical apparatus main body, the first cell unit and the second cell unit are in a parallel-connection state.

2. The battery pack according to claim 1:
wherein in a case of any one of the following processes (1) to (3), the control unit is configured to determine that the voltage imbalance or the contact failure has occurred and stop the charging or discharging of the battery pack,
(1) when a difference between temperatures of the cell units becomes equal to or larger than a threshold value,
(2) when a difference between currents flowing in the plurality of cell units becomes equal to or larger than a threshold value, and
(3) when the current flowing in one cell unit at a time of a parallel-connection state in which the plurality of cell units are connected to each other in parallel becomes equal to or larger than a predetermined value.

3. The battery pack according to claim 1,
wherein a protection circuit that is provided for each cell unit and monitors voltages of the battery cells is provided, and the control unit is connected to the protection circuit and monitors load states of the battery cells.

4. The battery pack according to claim 1,
wherein the control unit detects a connection state between the connection terminals and device side terminals of an electrical apparatus main body in which the battery pack is mounted, and when there is a cell unit that is not charged or discharged due to a contact failure between the connection terminals and the device side terminals, the control unit stops a charging/discharging of the battery pack or outputs a signal for stopping a charging/discharging of the battery pack.

5. The battery pack according to claim 1, further comprising:
at least one of a system detection circuit and first and second voltage detection circuits, wherein the system detection circuit detects whether the battery pack is mounted in an electrical apparatus main body or an external charging device in order to detect a contact failure between the device side terminals of the electrical apparatus main body in which the battery pack is mounted and the connection terminals, and the first and second voltage detection circuits detect a voltage value with respect to a lower potential side ground of each of the plurality of cell units.

6. The battery pack according to claim 5, further comprising:
a connection state detection circuit that detects the presence or absence of a contact failure in any of the positive electrode terminals and the negative electrode terminals in the battery pack by comparing negative side potentials of the plurality of cell units.

7. The battery pack according to claim 1,
wherein an LD terminal of the battery pack is connected to a ground via a switching element, and the control unit causes the switching element to be in a conducting state by controlling a gate signal of the switching element, such that the LD terminal is subjected to grounding to the ground to stop an operation of the electrical apparatus main body in which the battery pack is mounted.

8. The battery pack according to claim 1,
wherein a thermistor and a switching element are connected to a part between an LS terminal and the ground, and when the control unit controls the gate signal of the switching element, the LS terminal of the battery pack blocks transmission of an output of the thermistor and sends out a high signal instead from the LS terminal to stop operation of a connected charging device.

9. An electrical apparatus comprising:
a battery pack mounting portion in which the battery pack according to claim 1 is mounted,
wherein a working device is operated by driving a motor using power from the battery pack.

10. The electrical apparatus according to claim 3, comprising:
a device main body that has a load device to which power is supplied from the battery pack; and
a device side control unit that controls power supplied from the battery pack to the load device,
wherein the control unit stops or limits a power supply from the battery pack to the load device or issues a notification of occurrence of an abnormality when an abnormality has occurred in connection between the plurality of cell units.

11. The electrical apparatus according to claim 10,
wherein the device side control unit detects a voltage of each of the plurality of cell units, and when a difference between the voltages becomes equal to or larger than a predetermined value, the control unit determines that an abnormality has occurred in connection between the plurality of cell units.

12. The battery pack according to claim 1,
wherein the first cell unit and the second cell unit are configured to be able to be selectively switched to at least two connection states of a parallel-connection state, a series-connection state, and a blockage state, and
wherein the control unit is configured to be able to detect a connection state of any of the first cell unit and the second cell unit, and
wherein the battery pack has a connection state detection circuit that is connected to a positive electrode side of the first cell unit, a negative electrode side of the first cell unit, a positive electrode side of the second cell unit, a negative electrode side of the second cell unit, and the control unit.

13. The battery pack according to claim 12,
wherein the control unit and the connection state detection circuit are configured to detect connection states of the first cell unit and the second cell unit by comparing at least two potentials of a potential on the positive electrode side of the first cell unit, a potential on the negative electrode side of the first cell unit, a potential on the positive electrode side of the second cell unit, and a potential on the negative electrode side of the second cell unit.

14. The battery pack according to claim 12,
wherein the control unit executes the following process (1) or (2) based on an abnormality state corresponding to the connection states of the first cell unit and the second cell unit,
(1) stopping of a charging/discharging of the battery pack or outputting of a signal for stopping a charging/discharging of the battery pack, and
(2) adjusting of a voltage balance between the first cell unit and the second cell unit.

15. The battery pack according to claim 14,
wherein when the abnormality state is the voltage imbalance between the first cell unit and the second cell unit, the control unit executes the process (2) regardless of the connection state, and when the abnormality state is a contact failure of terminals of the first cell unit and the second cell unit while the first cell unit and the second cell unit are in the parallel-connection state, the control unit executes the process (1).

16. The battery pack according to claim 15,
wherein when an electrical apparatus main body is operated while the process (2) is executed in a state where the battery pack is connected to the electrical apparatus main body, the control unit stops the operation of the process (2).

17. A high-voltage electrical apparatus main body, comprising:
a battery pack mounting portion configured to connect with a battery pack, and
a plurality of device side terminals,
wherein the battery pack comprises:
a plurality of cell units,
a control unit, and
a plurality of connection terminals configured to connect to the plurality of device side terminals,
wherein a connection state of the plurality of cell units is switchable,
wherein the control unit is configured to stop a discharging of the battery pack or output signal for stopping a discharging of the battery pack to the high-voltage electrical apparatus main body when a voltage imbalance between the plurality of cell units or a contact failure of the connection terminals occurs,
wherein the battery pack has a pair of positive electrode terminals and a pair of negative electrode terminals, such that a first cell unit of the plurality of cell units is connected to one positive electrode terminal of the pair of positive electrode terminals and to one negative electrode terminal of the pair of negative electrode terminals and a second cell unit of the plurality of cell units is connected to the other positive electrode terminal of the pair of positive electrode terminals and to the other negative electrode terminal of the pair of negative electrode terminals, and
wherein when the battery pack is connected to the high-voltage electrical apparatus main body, the first cell unit and the second cell unit are in a series-connection state by forming an electrical connection circuit between the plurality of device side terminals and the plurality of connection terminals.

18. The high-voltage electrical apparatus main body according to claim 17, further comprising:

a body side control unit; and a motor configured to drive by power from the battery pack, wherein the plurality of device side terminal has a signal terminal, wherein when the signal terminal receives a signal for stopping a discharging of the battery pack from the battery pack, the body side control unit is configured to stop the motor.

19. A low-voltage electrical apparatus main body, comprising:

a battery pack mounting portion configured to connect with a battery pack, and a plurality of device side terminals, wherein the battery pack comprises:

a plurality of cell units, a control unit, and a plurality of connection terminals configured to connect to the device side terminals, wherein a connection state of the plurality of cell units is switchable, wherein the control unit is configured to stop a discharging of the battery pack or output signal for stopping a discharging of the battery pack to the low-voltage electrical apparatus main body when a voltage imbalance between the plurality of cell units or a contact failure of the connection terminals occurs, wherein the battery pack has a pair of positive electrode terminals and a pair of negative electrode terminals, such that a first cell unit of the plurality of cell units is connected to one positive electrode terminal of the pair of positive electrode terminals and to one negative electrode terminal of the pair of negative electrode terminals and a second cell unit of the plurality of cell units is connected to the other positive electrode terminal of the pair of positive electrode terminals and to the other negative electrode terminal of the pair of negative electrode terminals, and wherein when the battery pack is connected to the low-voltage electrical apparatus main body, the first cell unit and the second cell unit are in a parallel-connection state by forming an electrical connection circuit between the plurality of device side terminals and the plurality of connection terminals.

20. The low-voltage electrical apparatus main body according to claim 19, further comprising:

a body side control unit; and a motor configured to drive by power from the battery pack, wherein the plurality of device side terminal has a signal terminal, wherein when the signal terminal receives a signal for stopping a discharging of the battery pack from the battery pack, the body side control unit is configured to stop the motor.

\* \* \* \* \*